(12) United States Patent
Oh et al.

(10) Patent No.: US 11,057,684 B2
(45) Date of Patent: *Jul. 6, 2021

(54) BROADCAST TRANSMISSION DEVICE AND OPERATING METHOD THEREOF, AND BROADCAST RECEPTION DEVICE AND OPERATING METHOD THEREOF

(71) Applicant: LG ELECTRONICS INC., Seoul (KR)

(72) Inventors: Sejin Oh, Seoul (KR); Woosuk Ko, Seoul (KR); Sungryong Hong, Seoul (KR); Kyoungsoo Moon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/866,128

(22) Filed: May 4, 2020

(65) Prior Publication Data

US 2020/0275164 A1 Aug. 27, 2020

Related U.S. Application Data

(63) Continuation of application No. 15/109,526, filed as application No. PCT/KR2014/013081 on Dec. 30, 2014, now Pat. No. 10,694,260.

(Continued)

(51) Int. Cl.
*H04N 21/6437* (2011.01)
*H04N 21/2381* (2011.01)
(Continued)

(52) U.S. Cl.
CPC ....... *H04N 21/6437* (2013.01); *H04L 1/0041* (2013.01); *H04L 1/0083* (2013.01);
(Continued)

(58) Field of Classification Search
CPC .......... H04N 21/6437; H04N 21/2381; H04N 21/6112; H04N 21/6125; H04N 21/4305; H04N 21/8547

See application file for complete search history.

(56) References Cited

U.S. PATENT DOCUMENTS 9,225,443 B2 12/2015 Lee et al.
2003/0112878 A1 6/2003 Kloper
(Continued)

FOREIGN PATENT DOCUMENTS

CN 103283220 A 9/2013
JP 2006-229606 A 8/2006
(Continued)

OTHER PUBLICATIONS

Ludy et al., "Layered Coding Transport (LCT) Building Block," The Internet Society RFC 3451, Network Working Group, retrieved from URL:https://tools.ietf.org/pdf/rfc3451.pdf, Dec. 2002 (retrieved on Aug. 7, 2017), pp. 1-29.

*Primary Examiner* — Yassin Alata
(74) *Attorney, Agent, or Firm* — Birch, Stewart, Kolasch & Birch, LLP

(57) ABSTRACT

A digital broadcast receiver for receiving a broadcast signal, includes a tuner configured to receive the broadcast signal carrying a transport packet, wherein the transport packet consists of at least one packet payload and at least one packet header; a frequency deinterleaver configured to frequency deinterleave symbols of a signal frame in the broadcast signal based on addresses generated by checking a range of a deinterleaving sequence that is generated based on a main sequence and a symbol offset, wherein the signal frame includes a first symbol for signaling data and a second symbol for service data; and a processor configured to extract the at least one packet header, wherein a first extension header is included in the at least one packet (Continued)

header, further the first extension header includes timestamp information having a 64-bit format depending on a specific value also included in the first extension header.

20 Claims, 52 Drawing Sheets

Related U.S. Application Data

(60) Provisional application No. 61/923,186, filed on Jan. 2, 2014.

(51) Int. Cl.
*H04N 21/61* (2011.01)
*H04L 29/06* (2006.01)
*H04L 1/00* (2006.01)
*H04N 21/43* (2011.01)
*H04N 21/8547* (2011.01)

(52) U.S. Cl.
CPC ..... *H04L 65/4076* (2013.01); *H04N 21/2381* (2013.01); *H04N 21/4305* (2013.01); *H04N 21/6112* (2013.01); *H04N 21/6125* (2013.01); *H04N 21/8547* (2013.01); *H04L 65/607* (2013.01); *H04L 65/608* (2013.01)

(56) References Cited

U.S. PATENT DOCUMENTS

| | | |
|---|---|---|
| 2006/0184790 A1 | 8/2006 | Oliveira et al. |
| 2007/0002851 A1 | 1/2007 | Paila et al. |
| 2012/0189010 A1 | 7/2012 | Lee et al. |
| 2012/0230243 A1 | 9/2012 | Lee et al. |
| 2012/0307842 A1 | 12/2012 | Petrov et al. |
| 2013/0167184 A1 | 6/2013 | Hong et al. |
| 2013/0308505 A1 | 11/2013 | Hong et al. |
| 2014/0098745 A1 | 4/2014 | Balasubramanian et al. |
| 2014/0115647 A1 | 4/2014 | Kim et al. |

FOREIGN PATENT DOCUMENTS

| | | |
|---|---|---|
| JP | 2006-333350 A | 12/2006 |
| JP | 2008-508762 A | 3/2008 |
| JP | 2010-505327 A | 2/2010 |
| JP | 2010-154574 A | 7/2010 |
| JP | 2010-213261 A | 9/2010 |
| JP | 2012-520648 A | 9/2012 |
| JP | 2013-518495 A | 5/2013 |
| WO | WO 2007/002851 A2 | 1/2007 |
| WO | WO 2011/105082 A1 | 9/2011 |
| WO | WO 2012/177041 A2 | 12/2012 |
| WO | WO 2013/111630 A1 | 8/2013 |

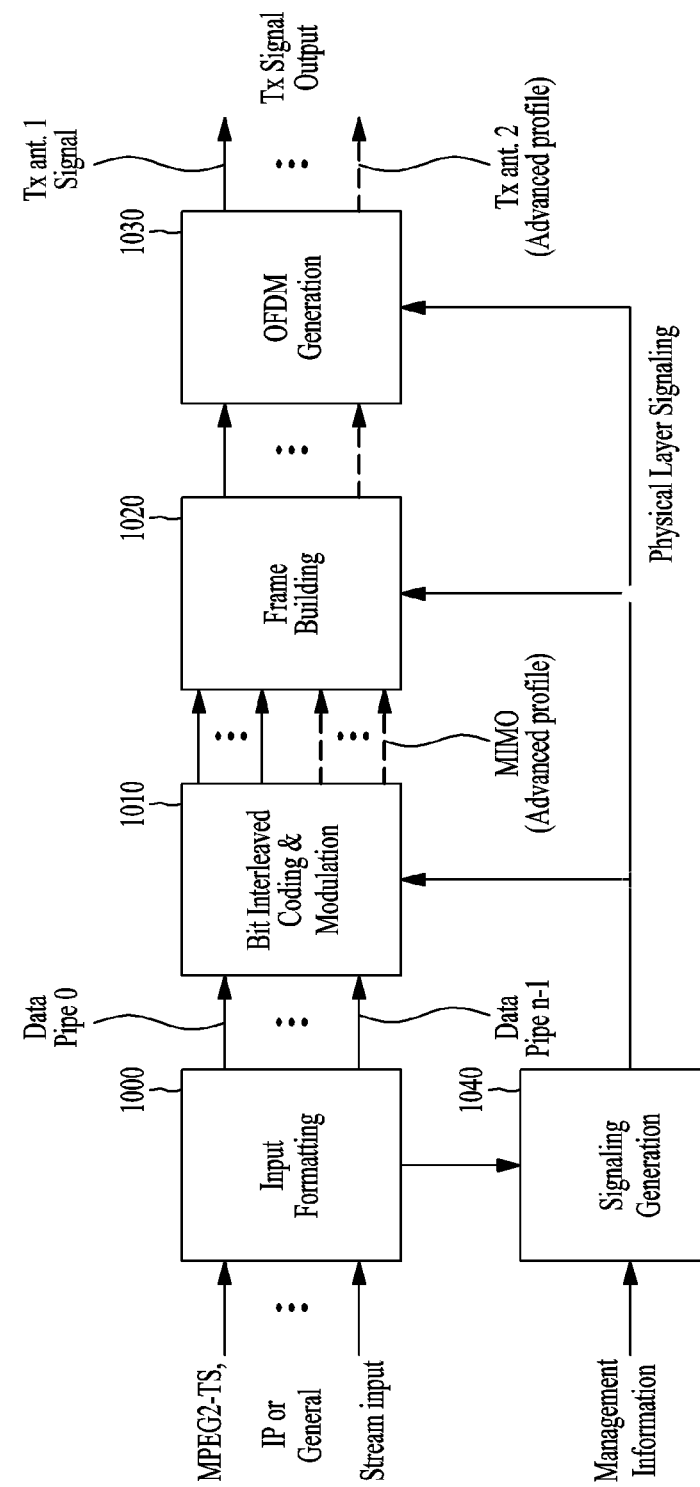
[Figure 1]

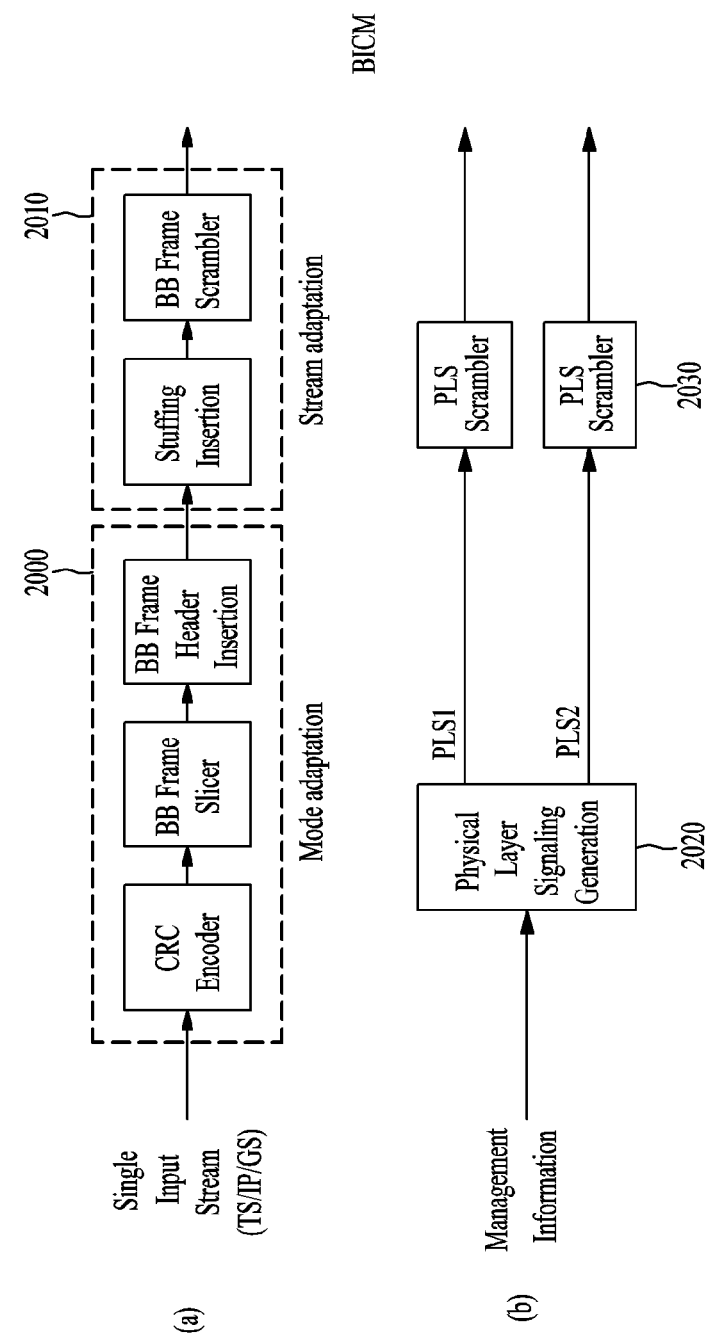
[Figure 2]

[Figure 3]
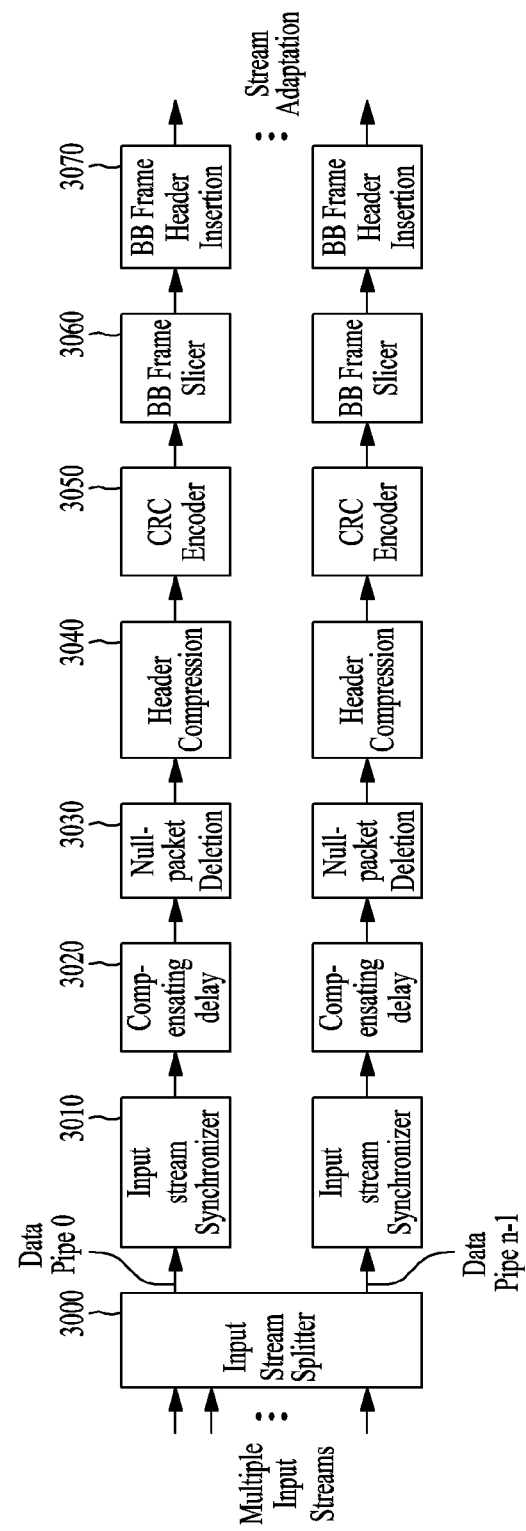

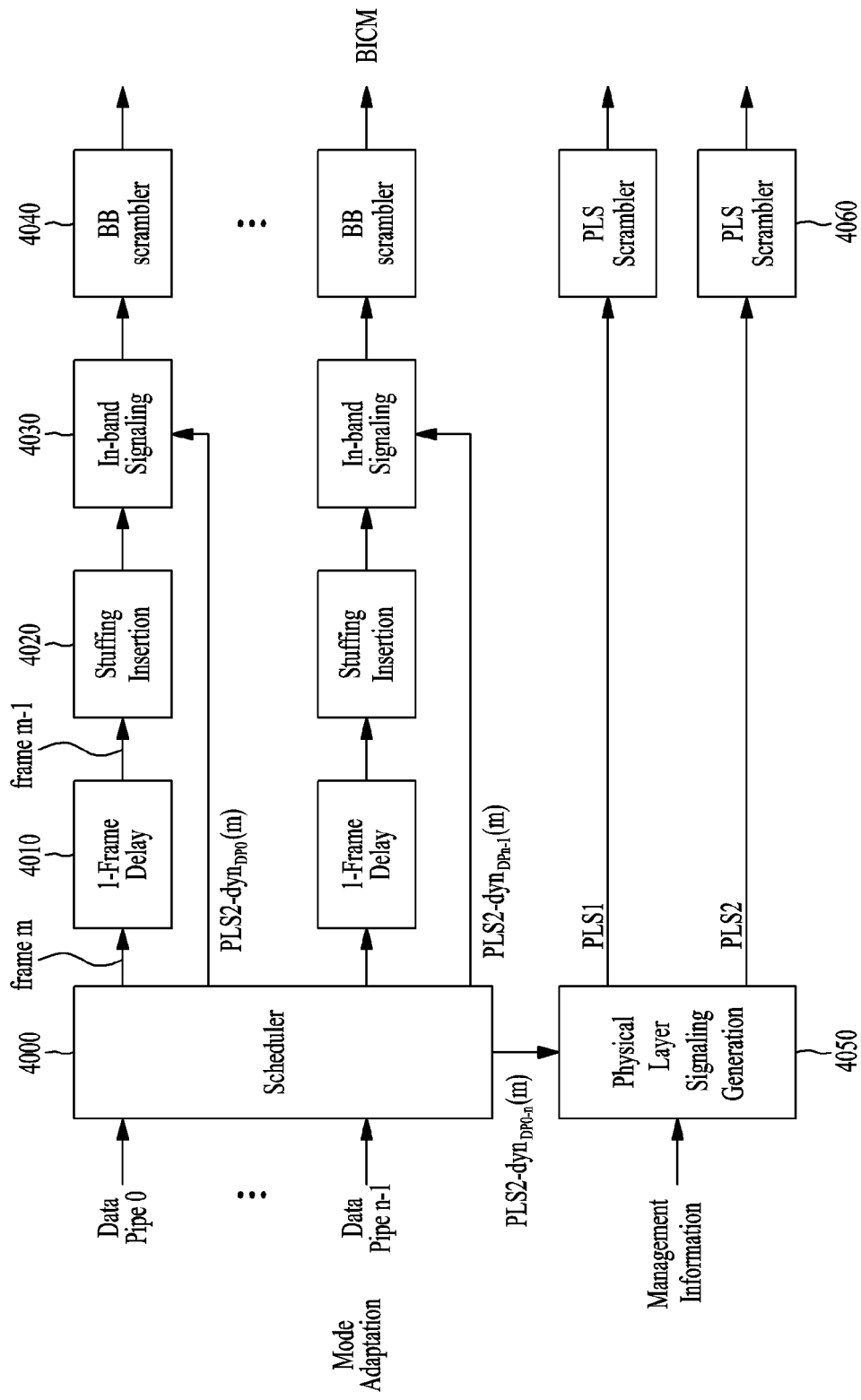

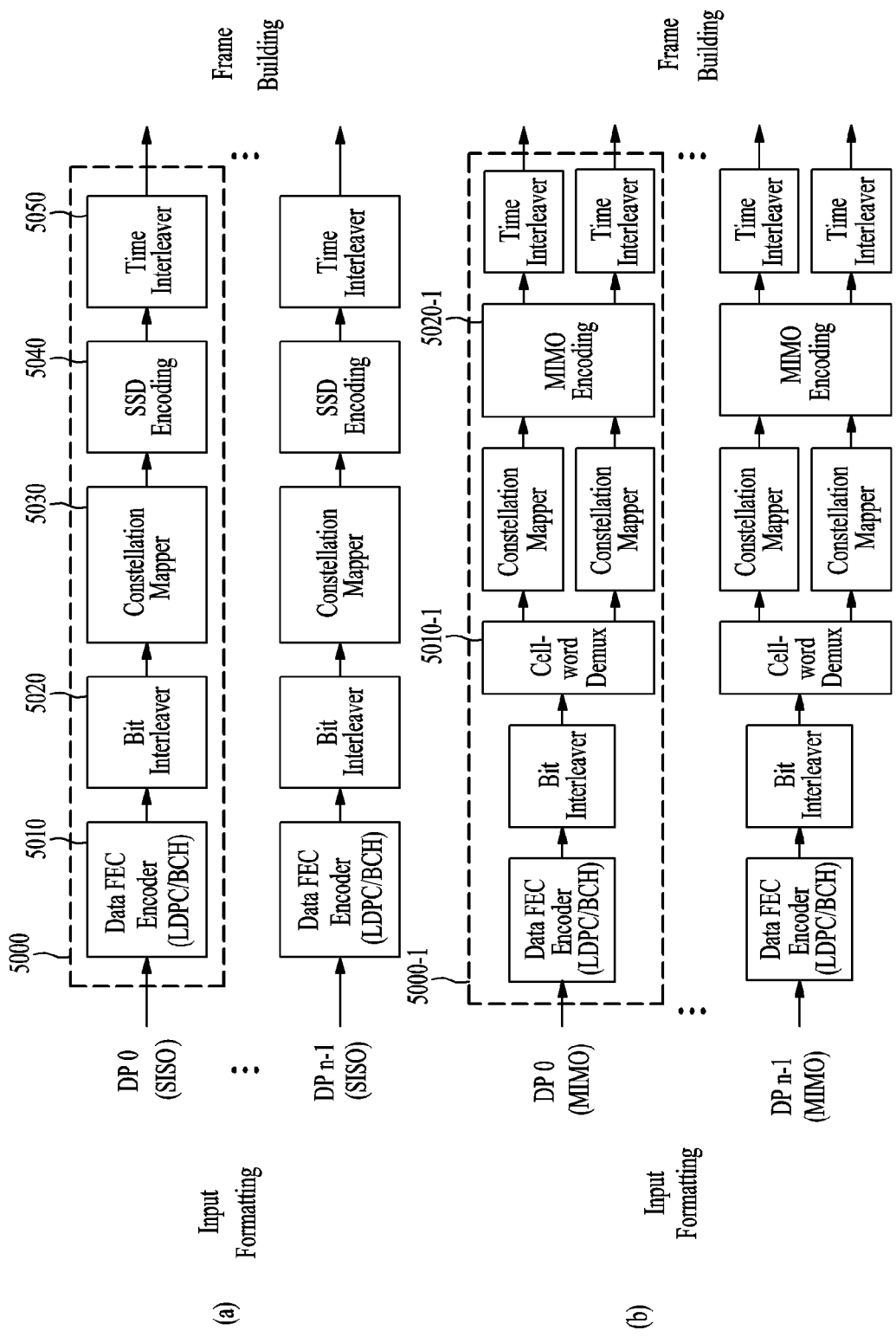
[Figure 5]

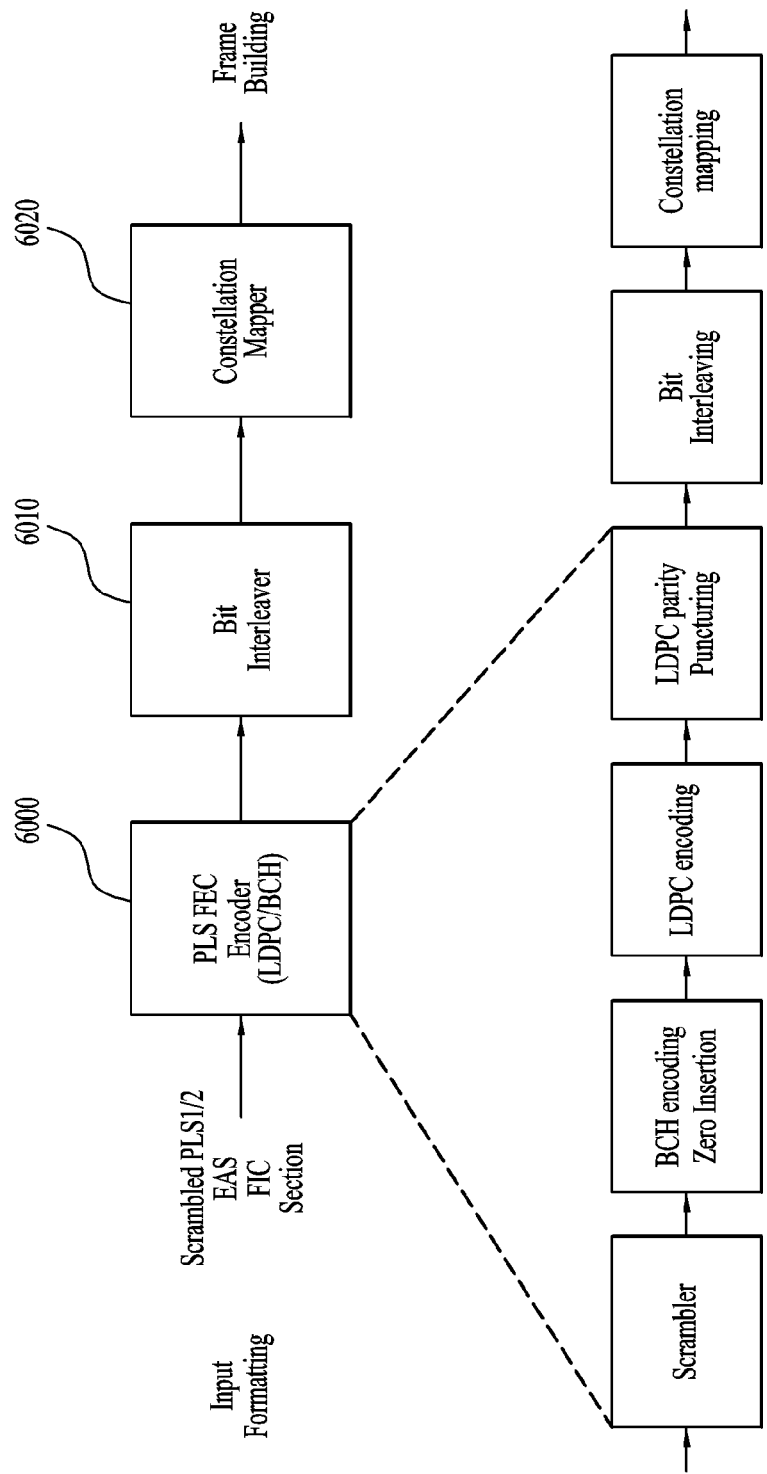
[Figure 6]

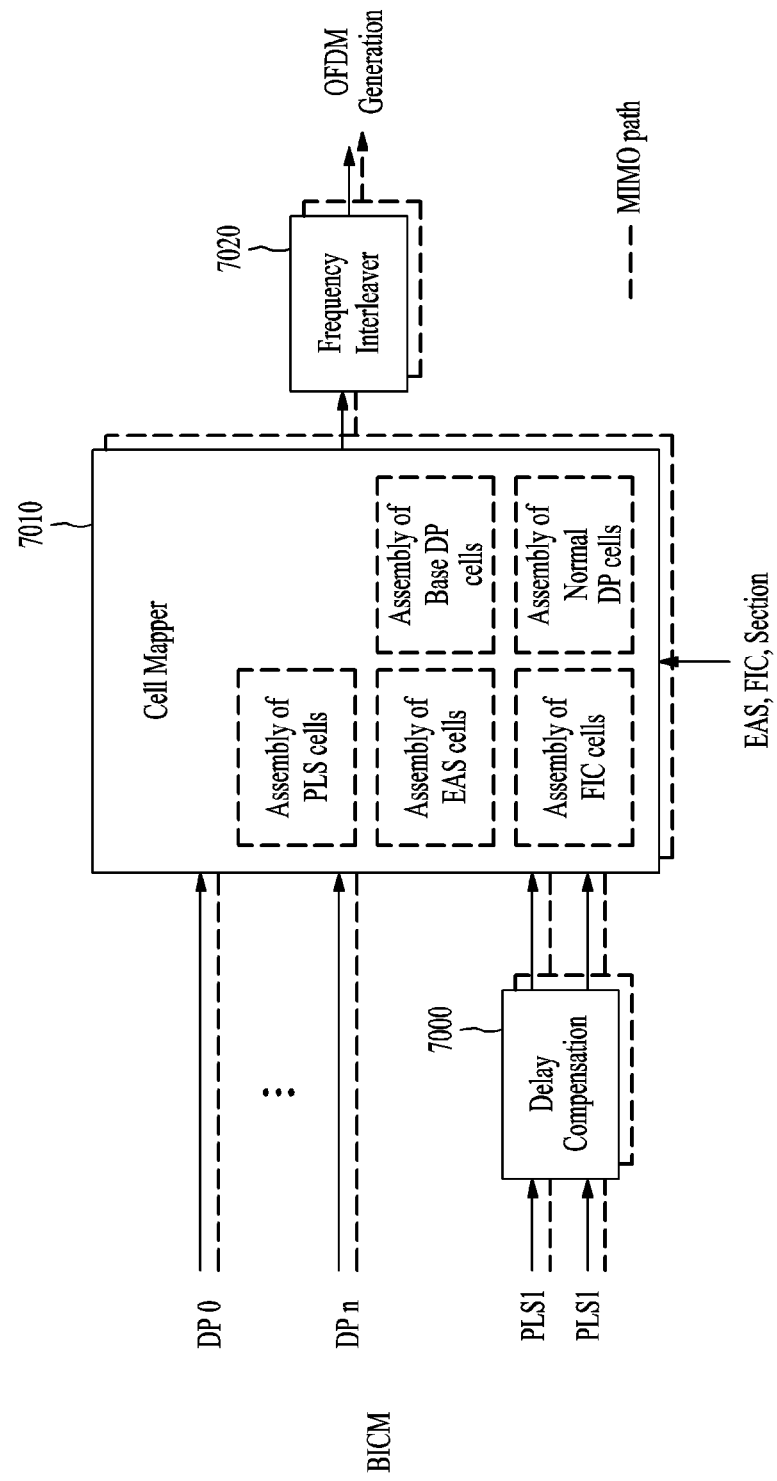

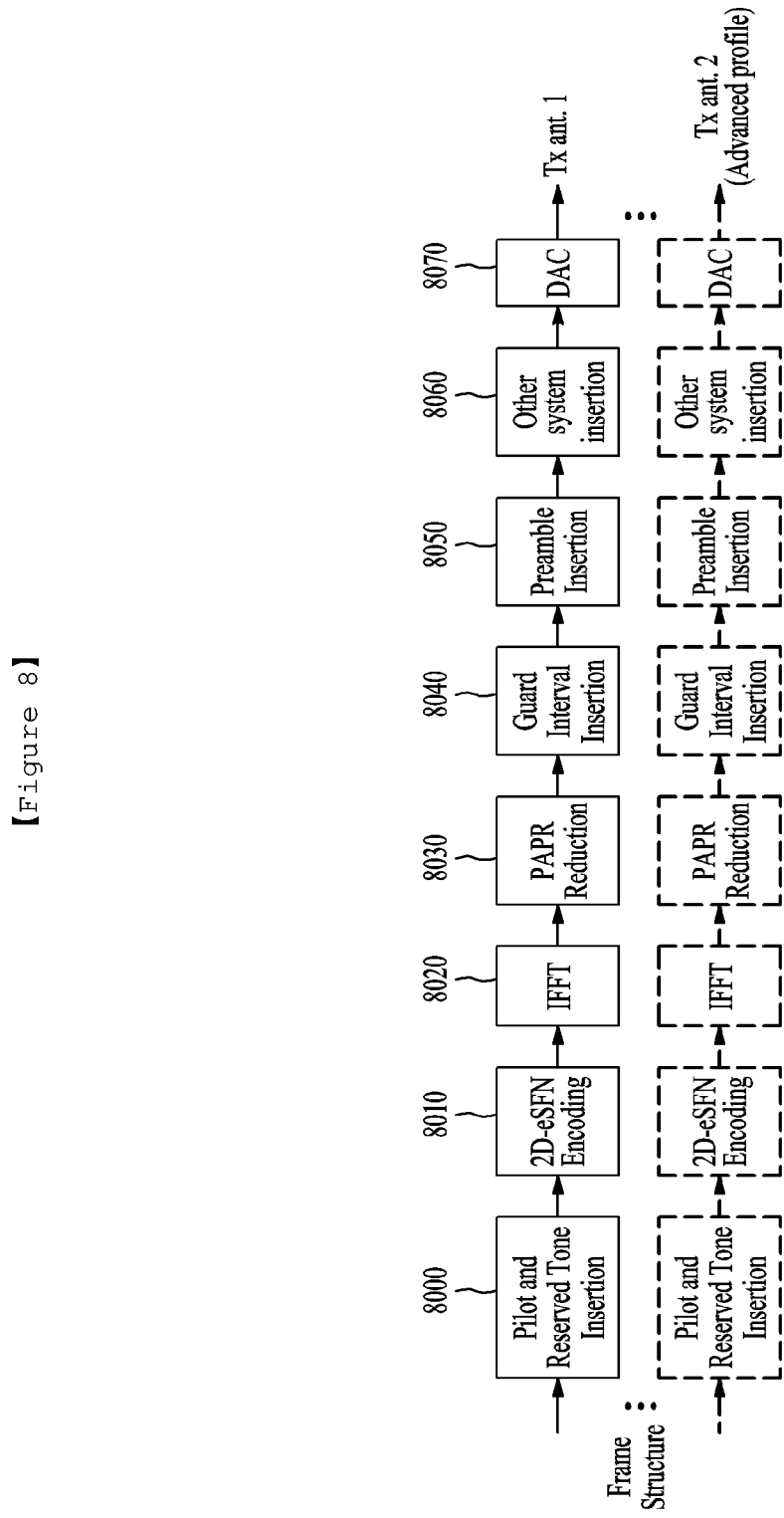
[Figure 8]

[Figure 9]
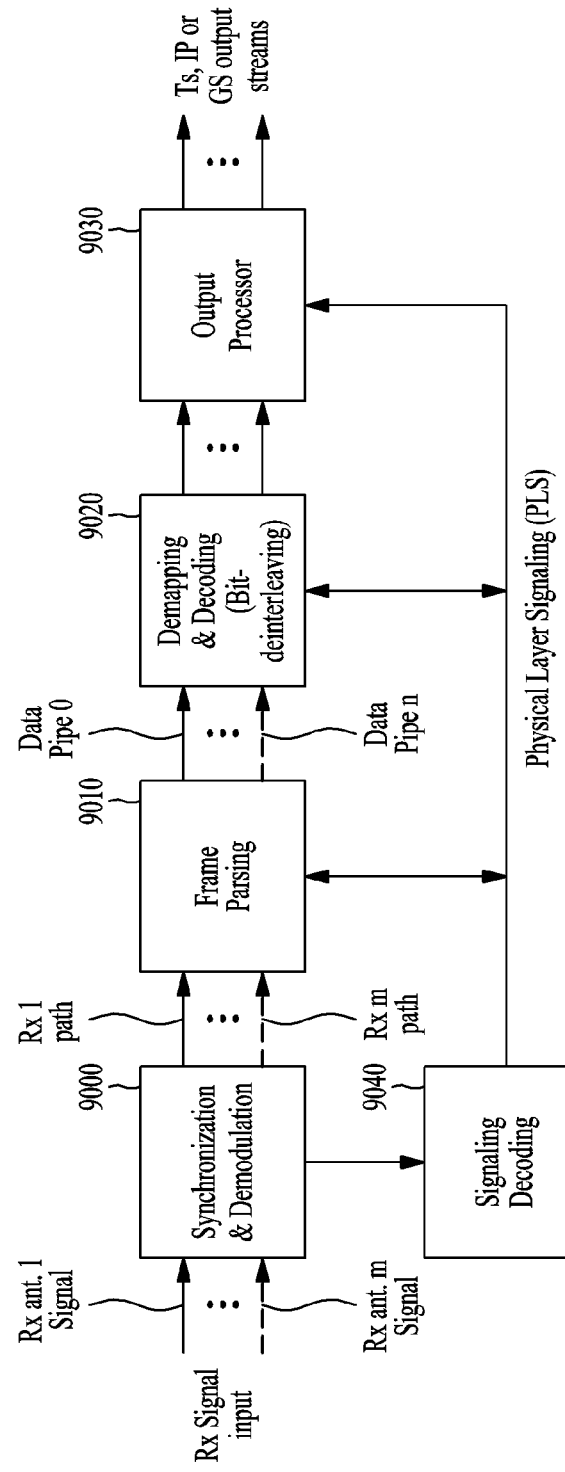

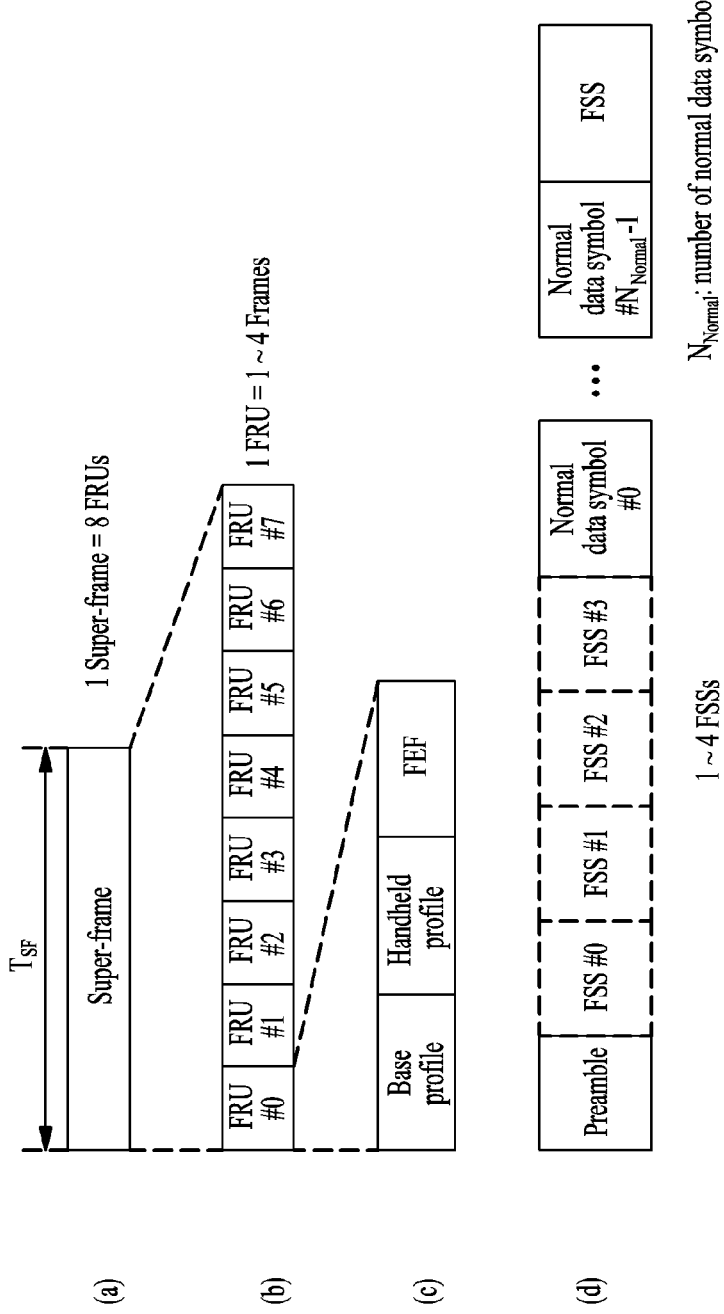
[Figure 10]

【Figure 11】
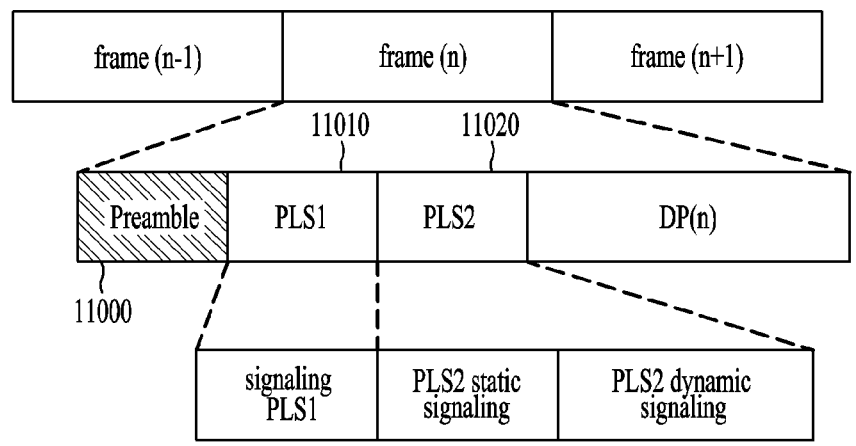
【Figure 12】
| Content | Bits |
|---|---|
| PHY_PROFILE | 3 |
| FFT_SIZE | 2 |
| GI_FRACTION | 3 |
| EAC_FLAG | 1 |
| PILOT_MODE | 1 |
| PAPR_FLAG | 1 |
| FRU_CONFIGURE | 3 |
| RESERVED | 7 |

[Figure 13]

| Content | Bits |
|---|---|
| PREAMBLE_DATA | 20 |
| NUM_FRAME_FRU | 2 |
| PAYLOAD_TYPE | 3 |
| NUM_FSS | 2 |
| SYSTEM_VERSION | 8 |
| CELL_ID | 16 |
| NETWORK_ID | 16 |
| SYSTEM_ID | 16 |
| for i = 0:3 | |
|     FRU_PHY_PROFILE | 3 |
|     FRU_FRAME_LENGTH | 2 |
|     FRU_GI_FRACTION | 3 |
|     RESERVED | 4 |
| end | |
| PLS2_FEC_TYPE | 2 |
| PLS2_MOD | 3 |
| PLS2_SIZE_CELL | 15 |
| PLS2_STAT_SIZE_BIT | 14 |
| PLS2_SYN_SIZE_BIT | 14 |
| PLS2_REP_FLAG | 1 |
| PLS2_REP_SIZE_CELL | 15 |
| PLS2_NEXT_FEC_TYPE | 2 |
| PLS2_NEXT_MODE | 3 |
| PLS2_NEXT_REP_FLAG | 1 |
| PLS2_NEXT_REP_SIZE_CELL | 15 |
| PLS2_NEXT_REP_STAT_SIZE_BIT | 14 |
| PLS2_NEXT_REP_DYN_SIZE_BIT | 14 |
| PLS2_AP_MODE | 2 |
| PLS2_AP_SIZE_CELL | 15 |
| PLS2_NEXT_AP_MODE | 2 |
| PLS2_NEXT_AP_SIZE_CELL | 15 |
| RESERVED | 32 |
| CRC 32 | 32 |

[Figure 14]

| Content | Bits |
|---|---|
| FIC_FLAG | 1 |
| AUX_FLAG | 1 |
| NUM_DP | 6 |
| for i = 1 : NUM_DP | |
|     DP_ID | 6 |
|     DP_TYPE | 3 |
|     DP_GROUP_ID | 8 |
|     BASE_DP_ID | 6 |
|     DP_FEC_TYPE | 2 |
|     DP_COD | 4 |
|     DP_MOD | 4 |
|     DP_SSD_FLAG | 1 |
|     if PHY_PROFILE = '010' | |
|         DP_MIMO | 3 |
|     end | |
|     DP_TI_TYPE | 1 |
|     DP_TI_LENGTH | 2 |
|     DP_TI_BYPASS | 1 |
|     DP_FRAME_INTERVAL | 2 |
|     DP_FIRST_FRAME_IDX | 5 |
|     DP_NUM_BLOCK_MAX | 10 |
|     DP_PAYLOAD_TYPE | 2 |
|     DP_INBAND_MODE | 2 |
|     DP_PROTOCOL_TYPE | 2 |
|     DP_CRC_MODE | 2 |
|     if DP_PAYLOAD_TYPE == TS('00') | |
|         DNP_MODE | 2 |
|         ISSY_MODE | 2 |
|         HC_MODE_TS | 2 |
|         if HC_MODE_TS == '01' or '10' | |
|             PID | 13 |
|         end | |
|     if DP_PAYLOAD_TYPE == IP('01') | |
|         HC_MODE_IP | 2 |
|     end | |
|     RESERVED | 8 |
| end | |
| if FIC_FLAG == 1 | |
|     FIC_VERSION | 8 |
|     FIC_LENGTH_BYTE | 13 |
|     RESERVED | 8 |
| end | |
| if AUX_FLAG == 1 | |
|     NUM_AUX | 4 |
|     AUX_CONFIG_RFU | 8 |
|     for - 1 : NUM_AUX | |
|         AUX_STREAM_TYPE | 4 |
|         AUX_PRIVATE_CONF | 28 |
|     end | |
| end | |

[Figure 15]
| Content | | Bit |
|---|---|---|
| FRAME_INDEX | | 5 |
| PLS_CHANGE_COUNTER | | 4 |
| FIC_CHANGE_COUNTER | | 4 |
| RESERVED | | 16 |
| for i = 1: NUM_DP | | |
| | DP_ID | 6 |
| | DP_START | 15 (or13) |
| | DP_NUM_BLOCK | 10 |
| end | RESERVED | 8 |
| EAC_FLAG | | 1 |
| EAS_WAKE_UP_VERSION_NUM | | 8 |
| if EAC_FLAG = 1 | | |
| | EAC_LENGTH_BYTE | 12 |
| else | | |
| | EAC_COUNTER | 12 |
| end | | |
| for i=1:NUM_AUX | | |
| | AUX_PRIVATE_DYN | 48 |
| end | | |
| CRC 32 | | 32 |
[Figure 16]
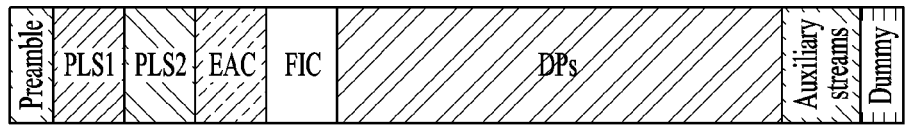

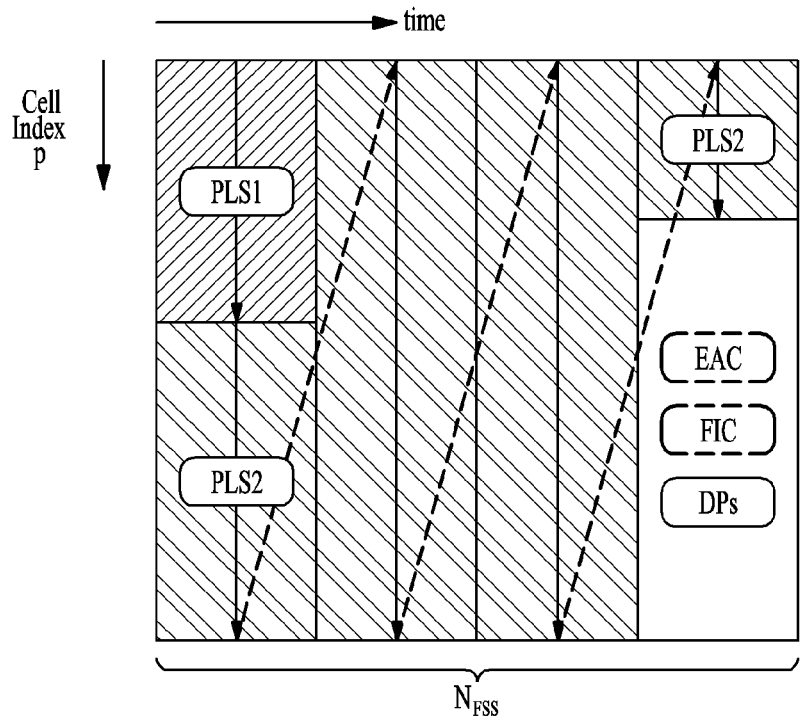
【Figure 17】
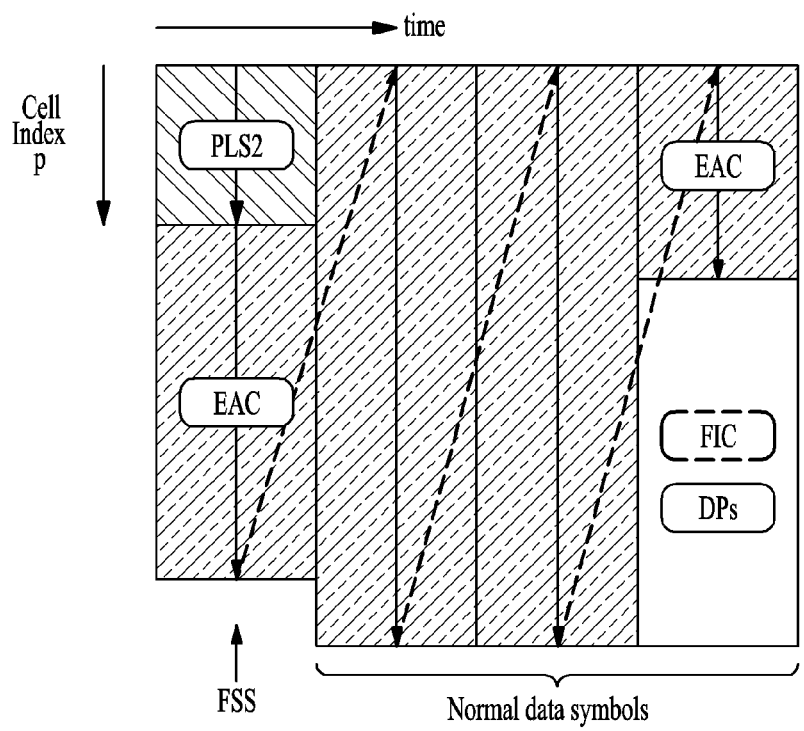
【Figure 18】

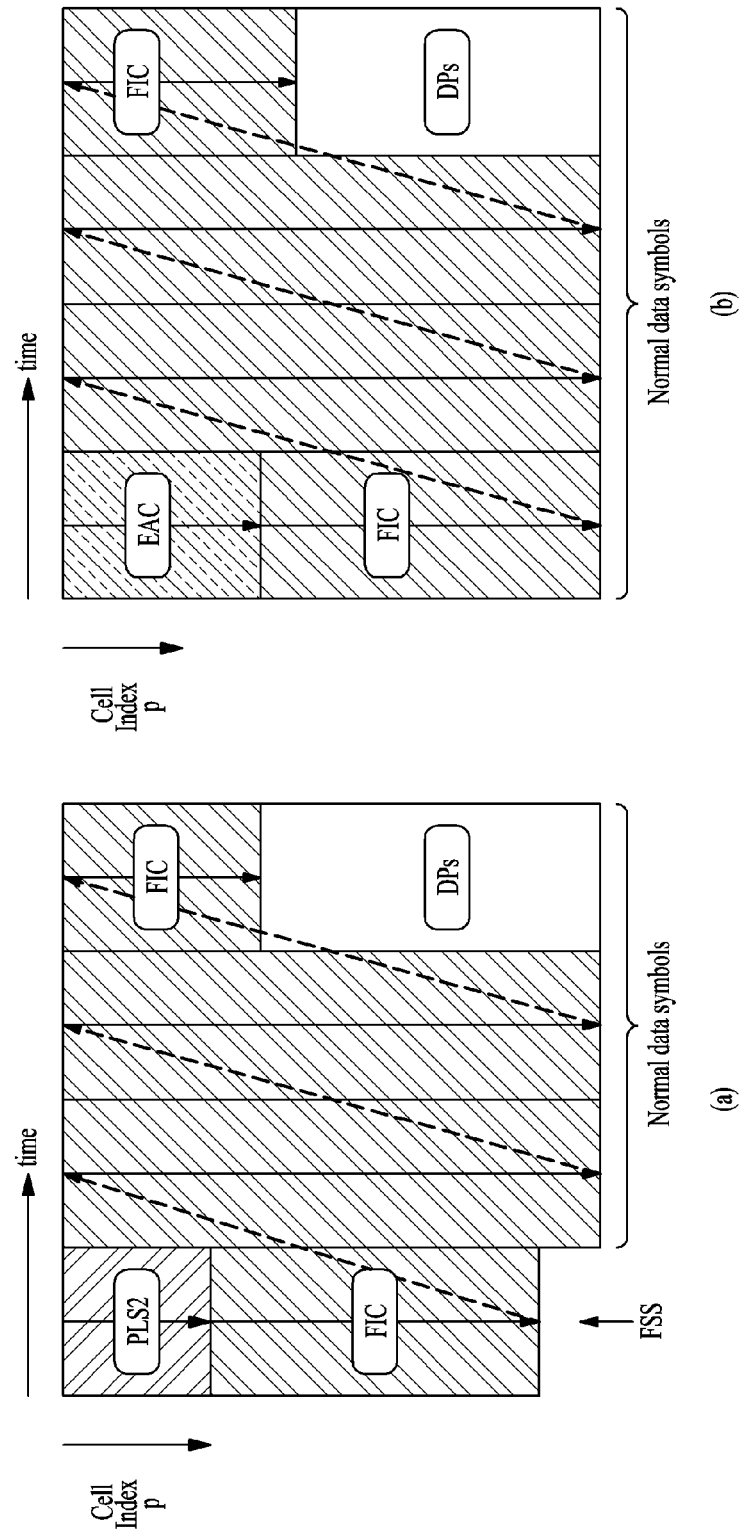
[Figure 19]

[Figure 20]
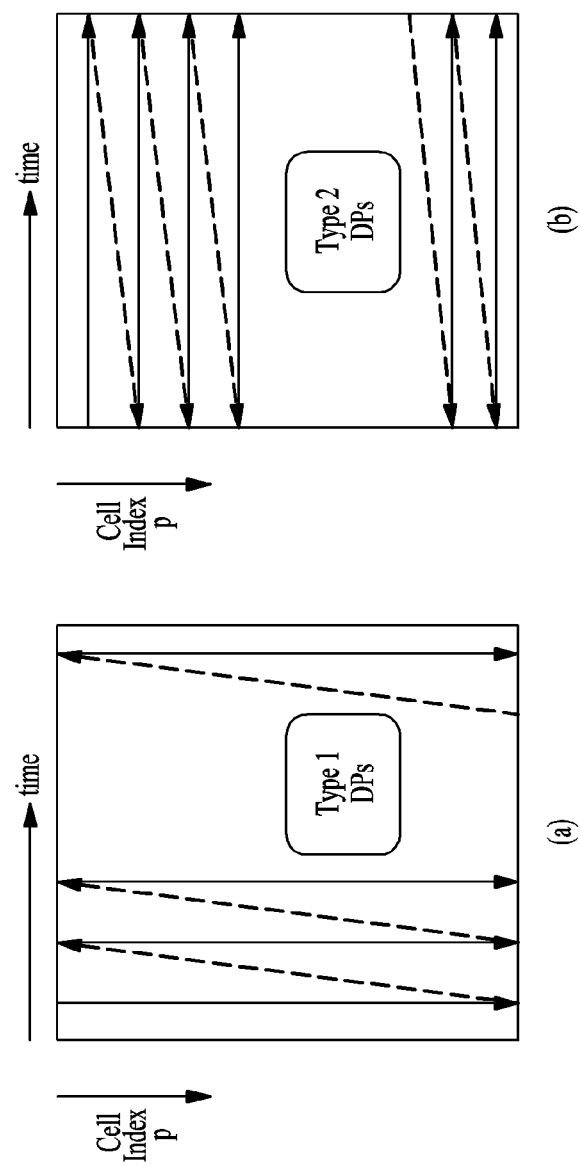

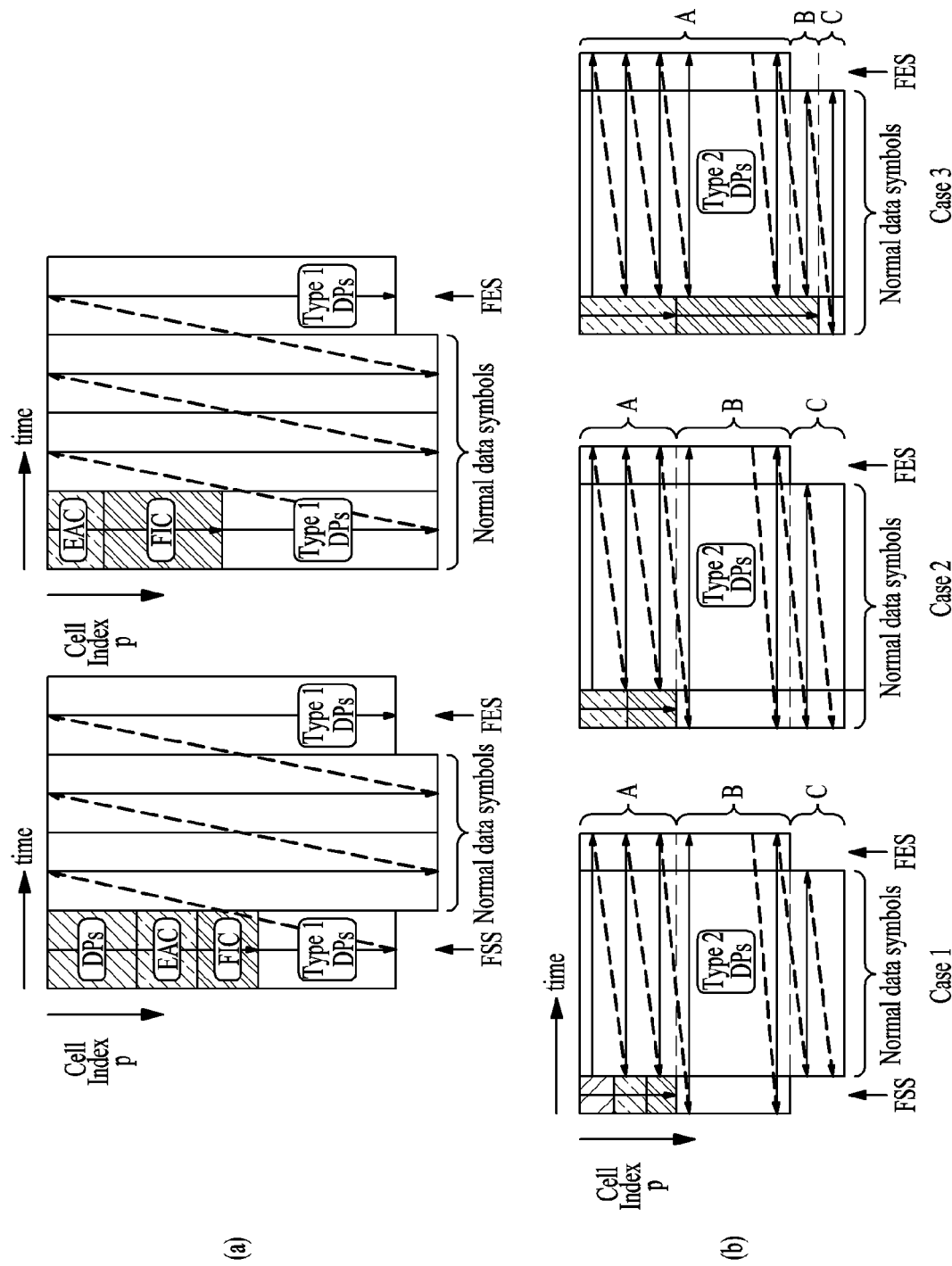
[Figure 21]

[Figure 22]
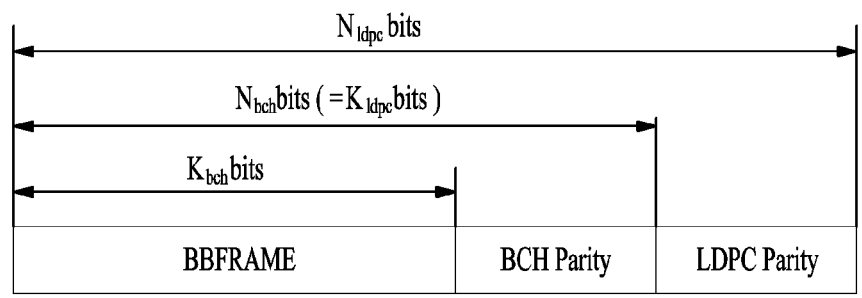

[Figure 23]
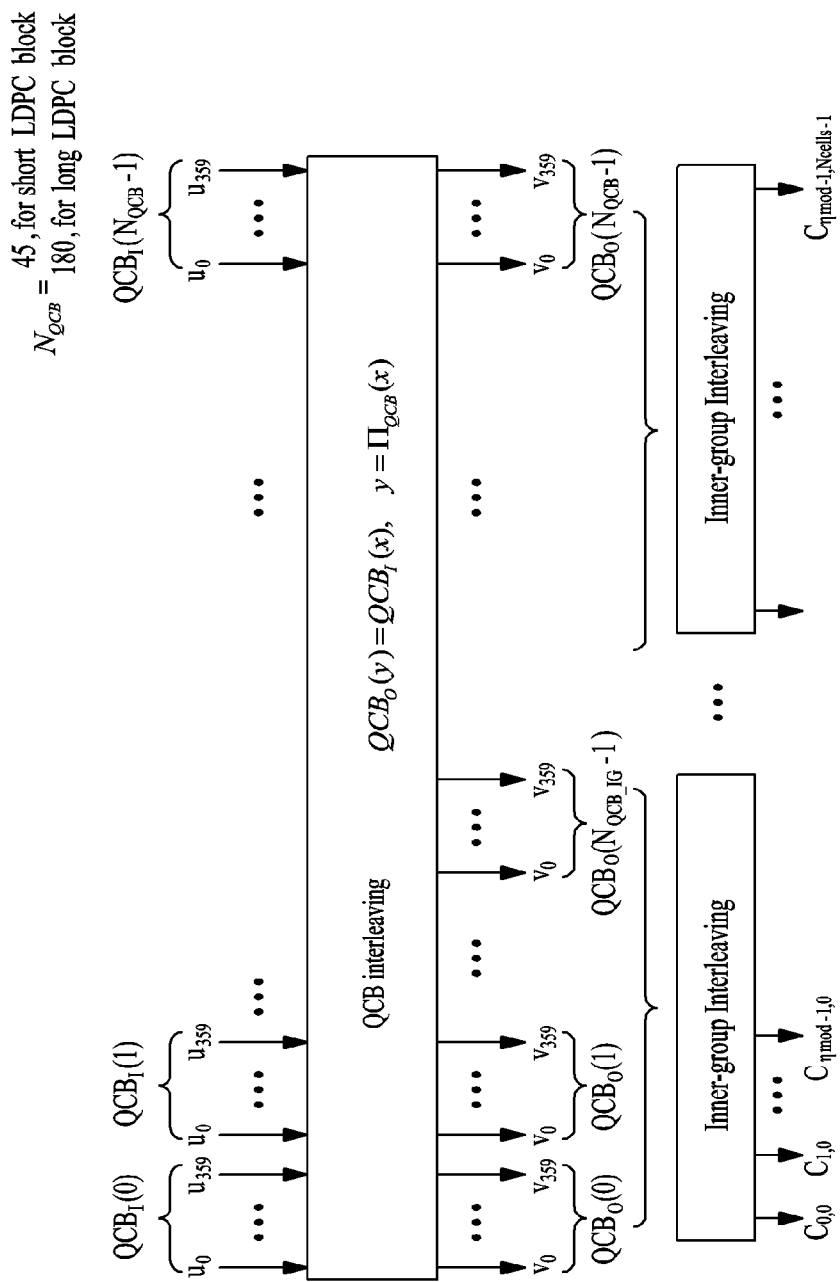

[Figure 24]
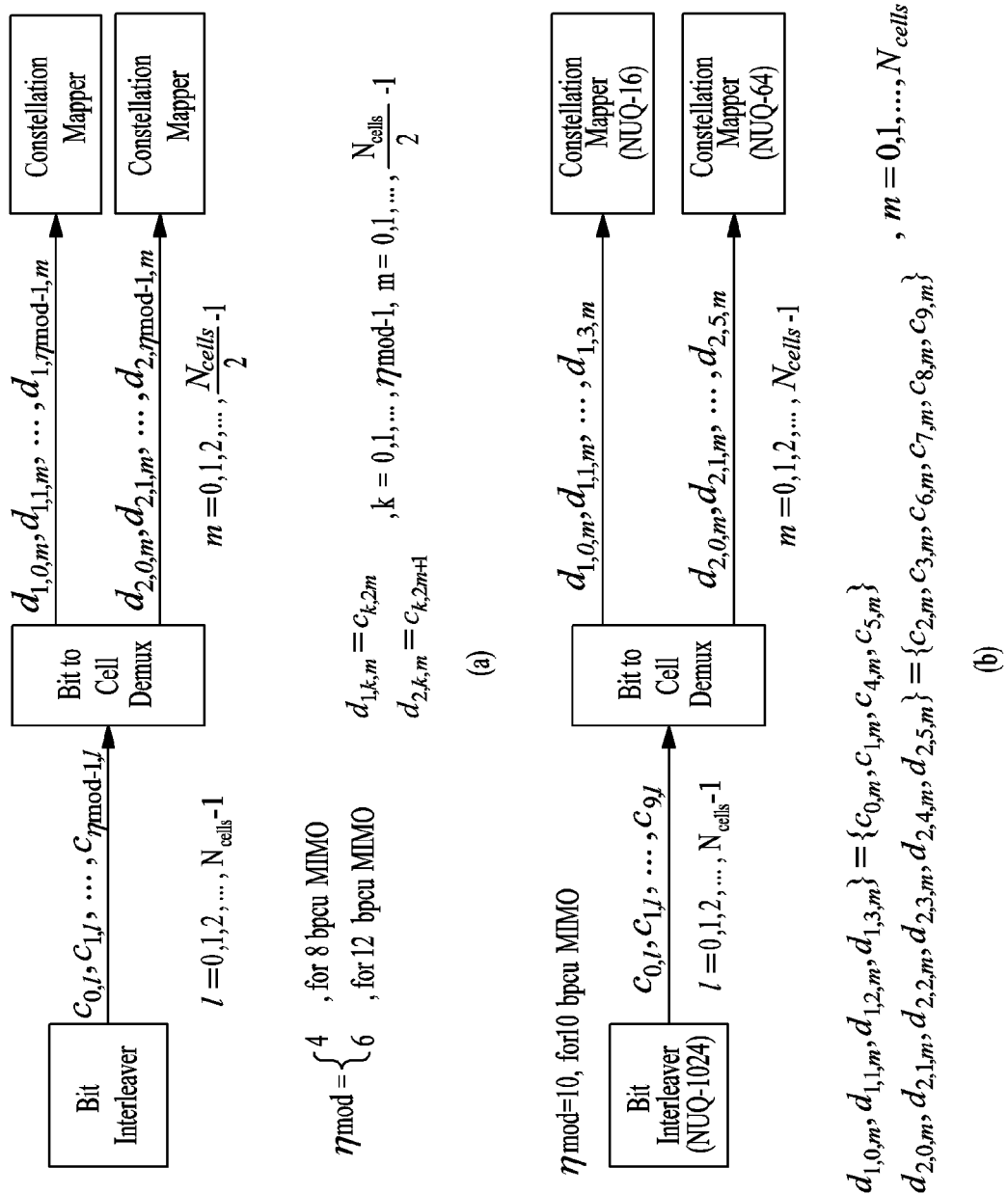

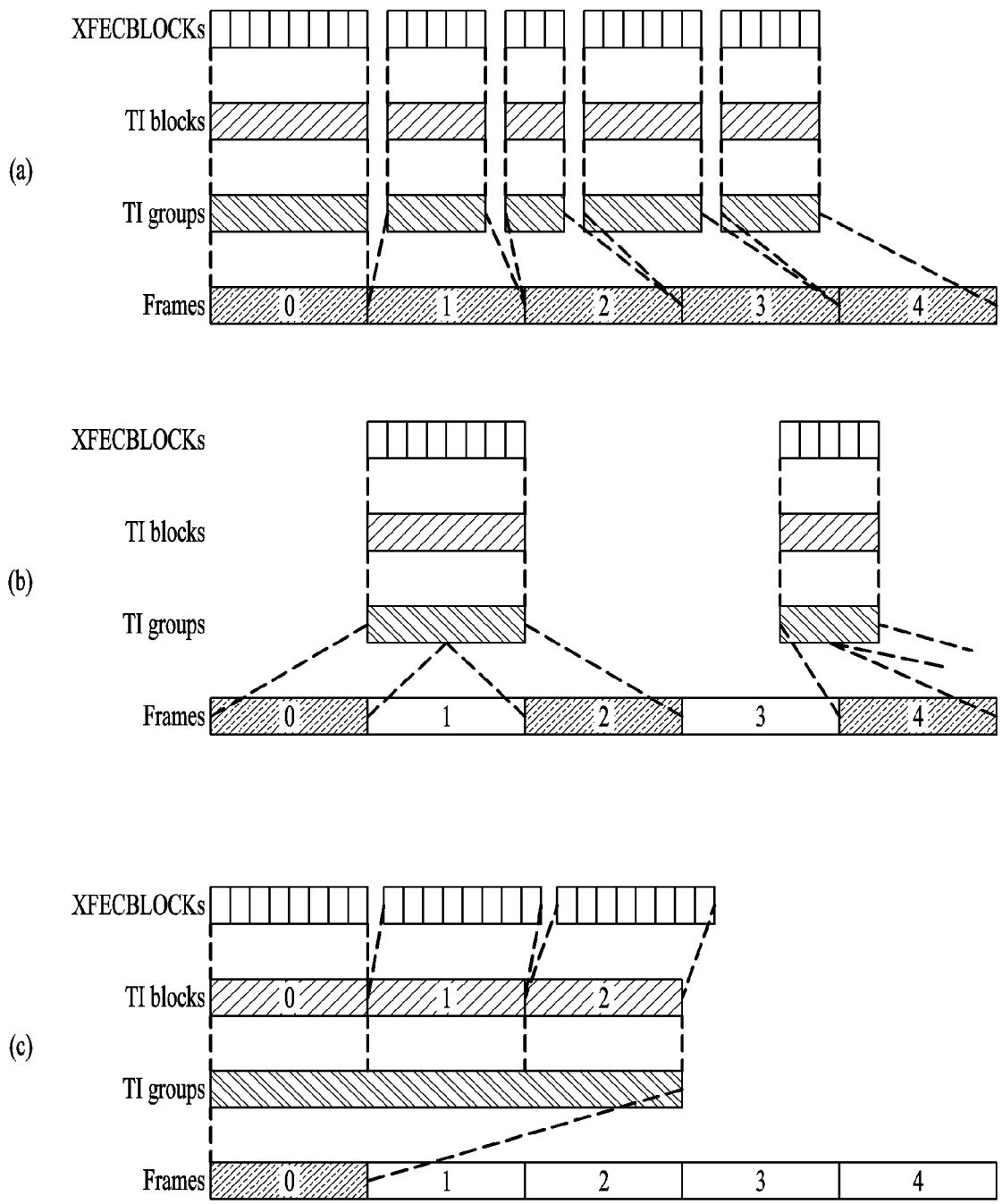
[Figure 25]

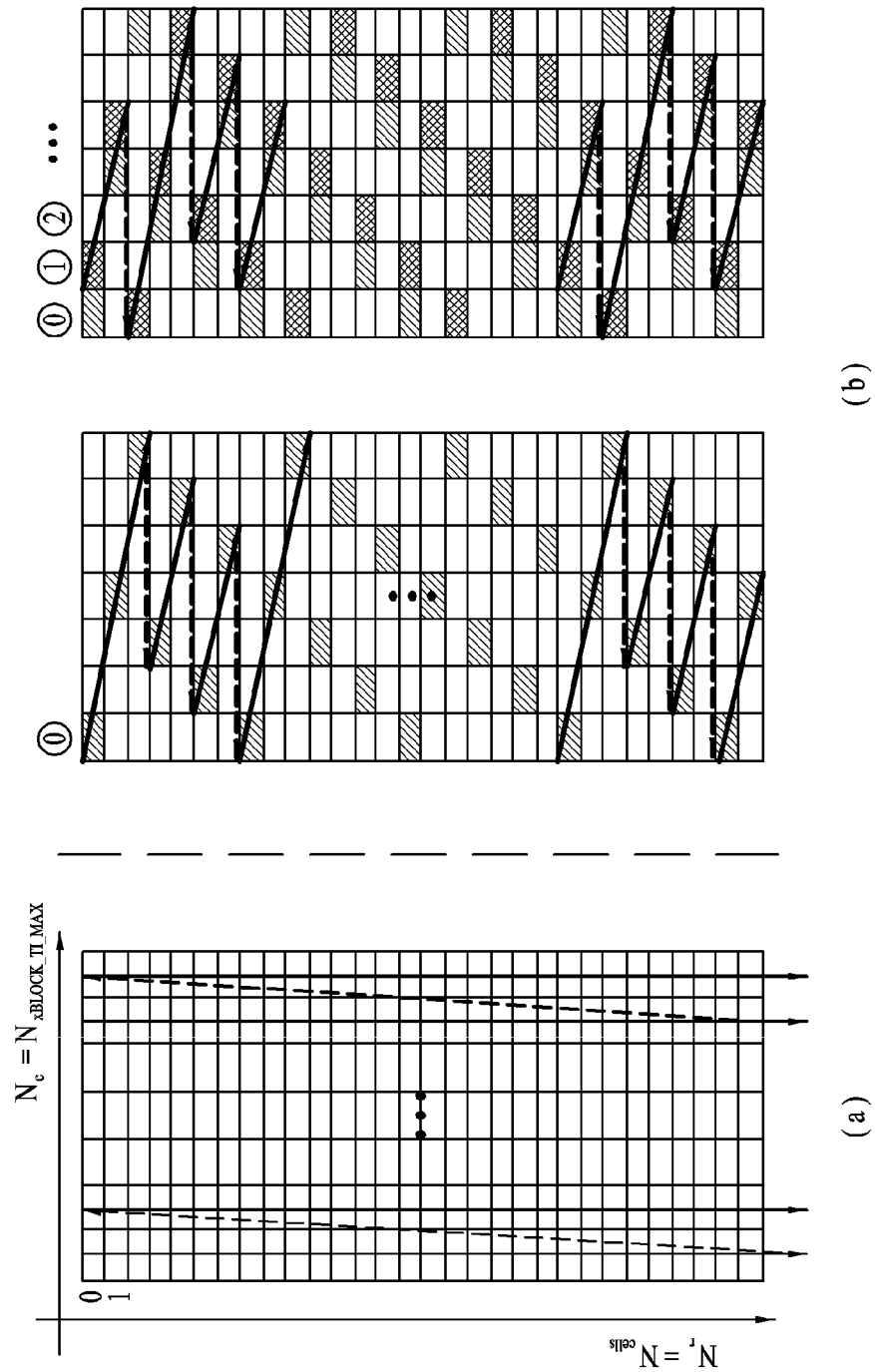
[Figure 26]

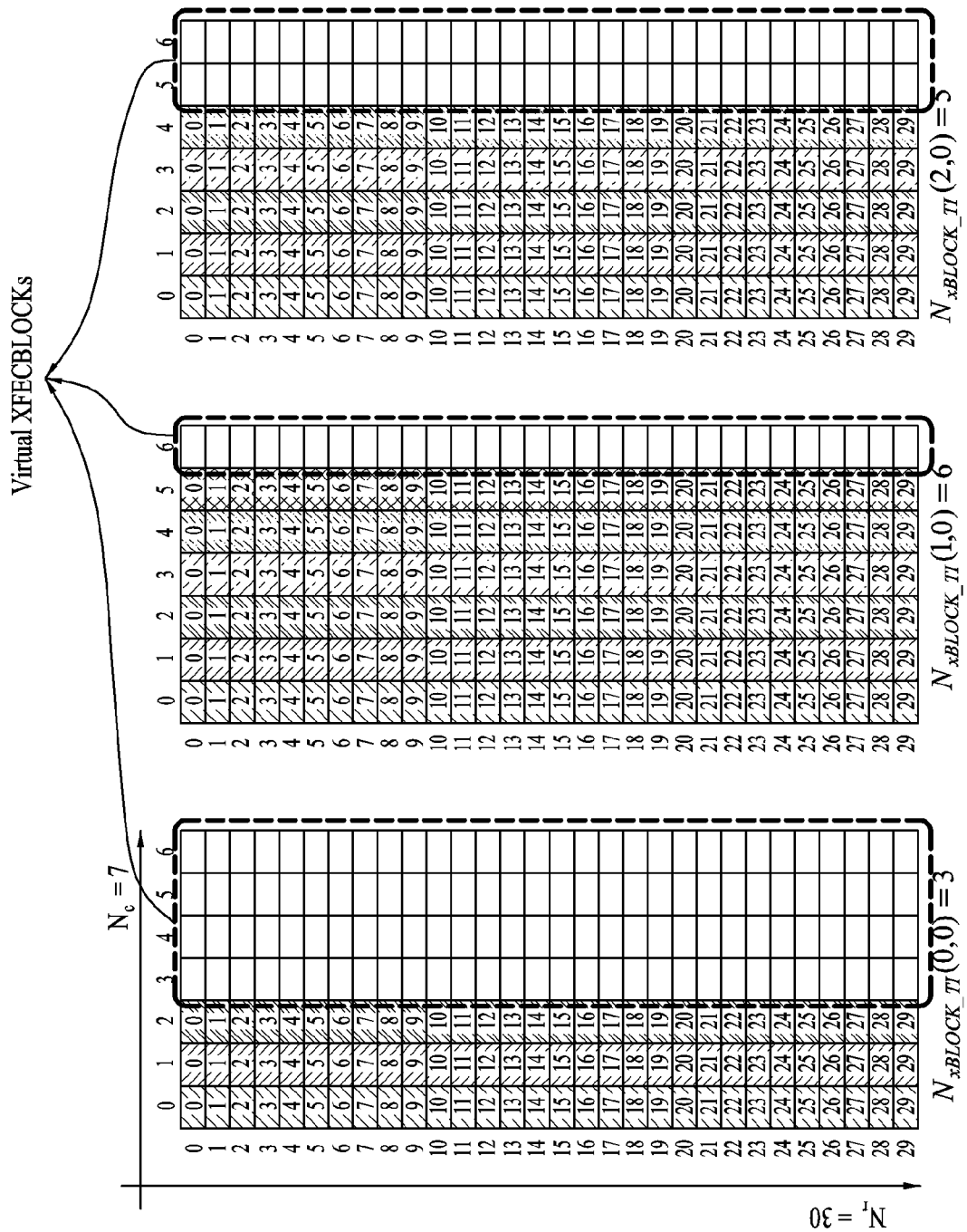
[Figure 27]

[Figure 28]
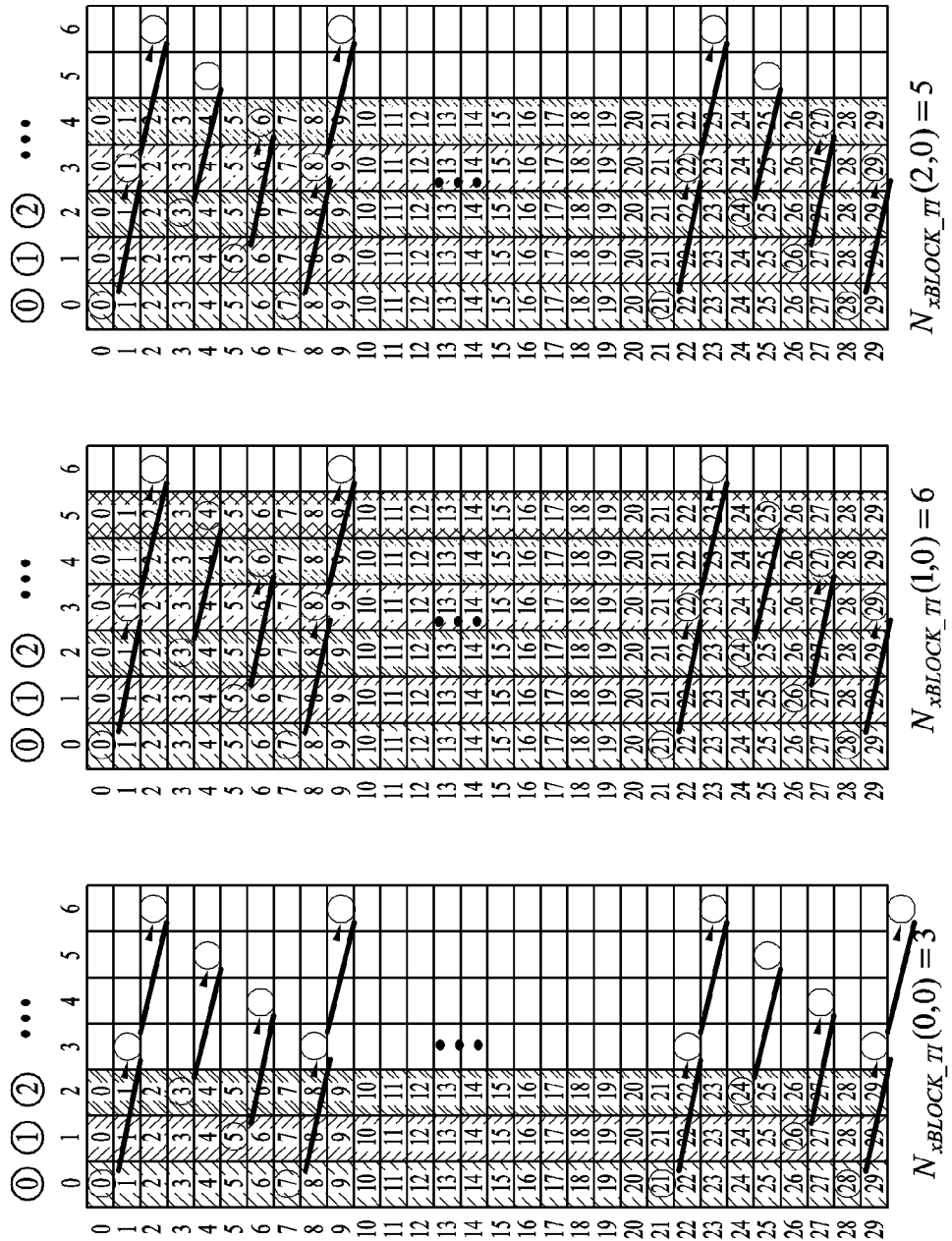

[Figure 29]

[Figure 30]
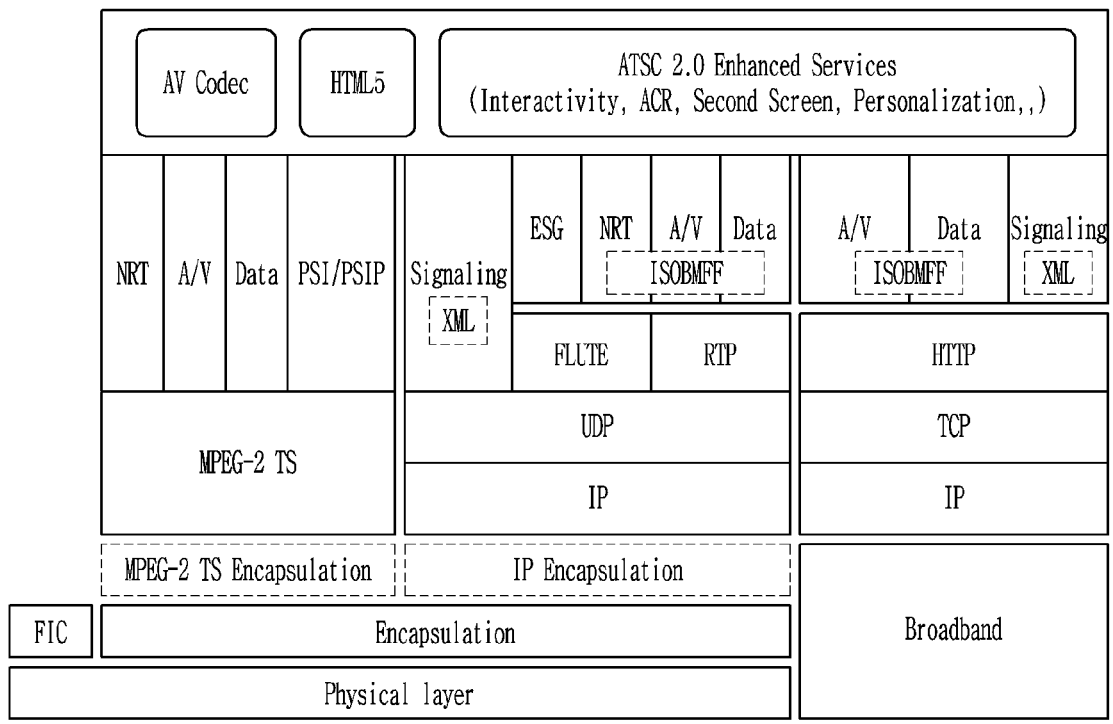
[Figure 31]
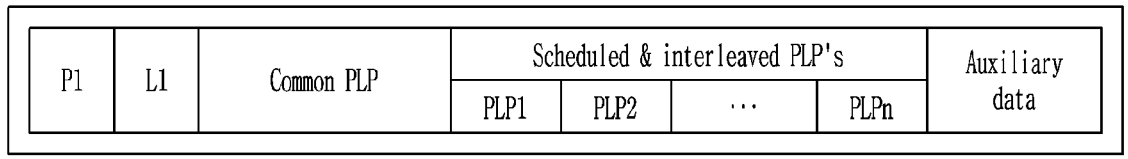
[Figure 32]
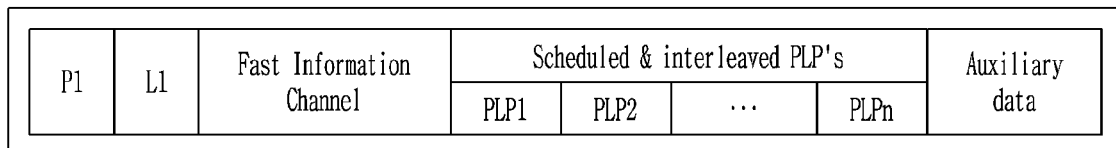

[Figure 33]
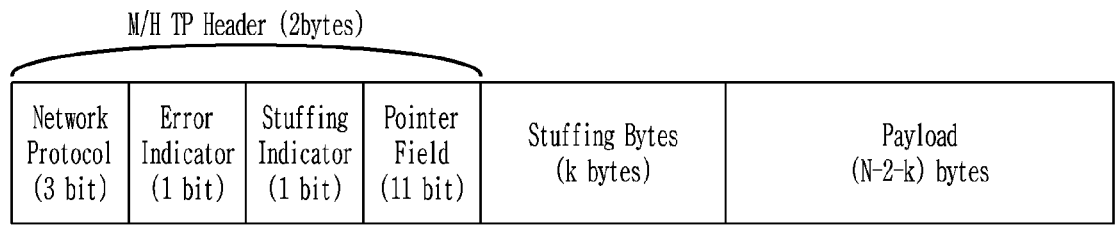
[Figure 34]
| network_protocol Value | Meaning |
|---|---|
| 000 | IPv4 (conforming to RFC STD05 [5]) |
| 001-110 | ATSC reserved |
| 111 | framed_packet_type, |

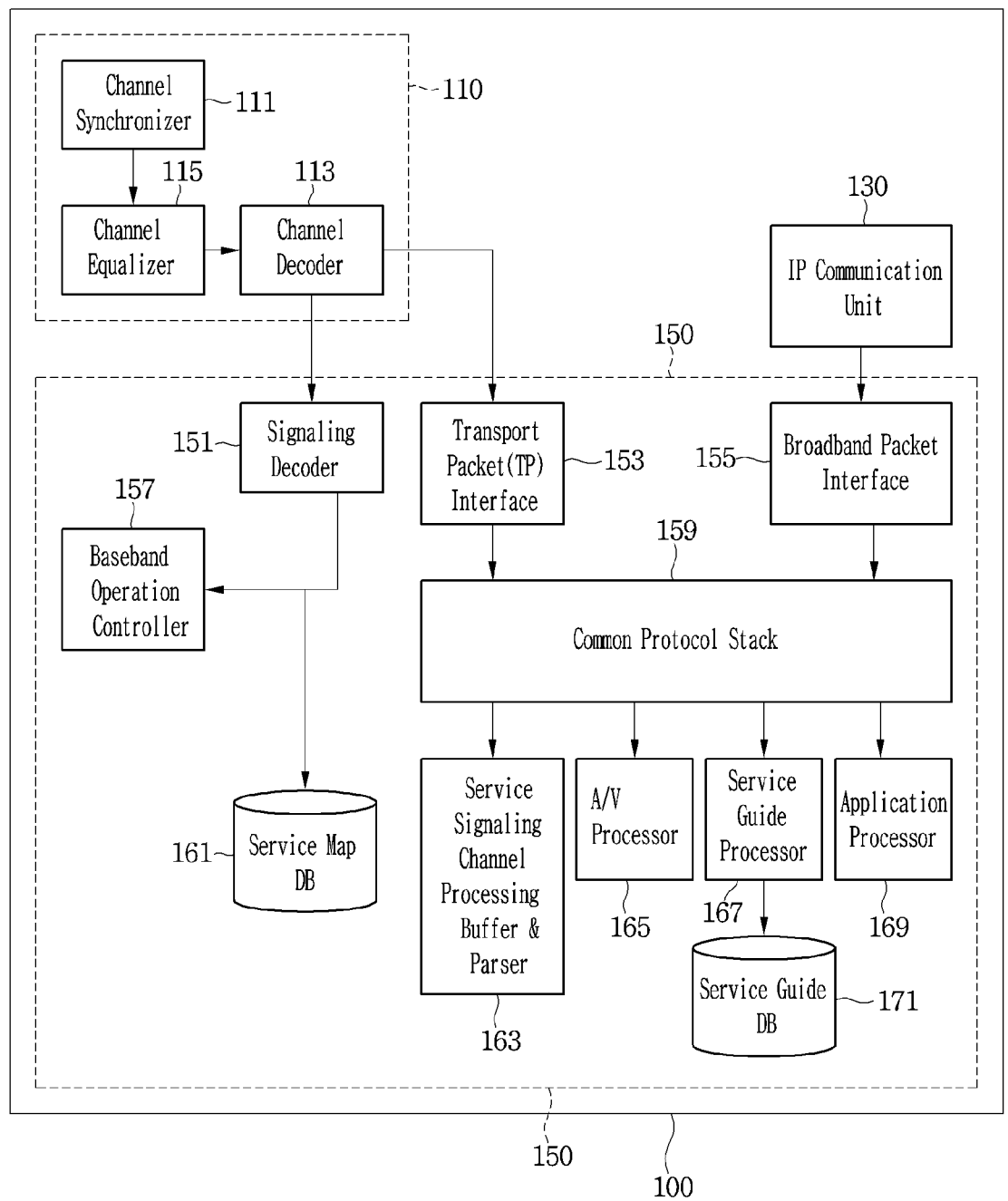
[Figure 35]

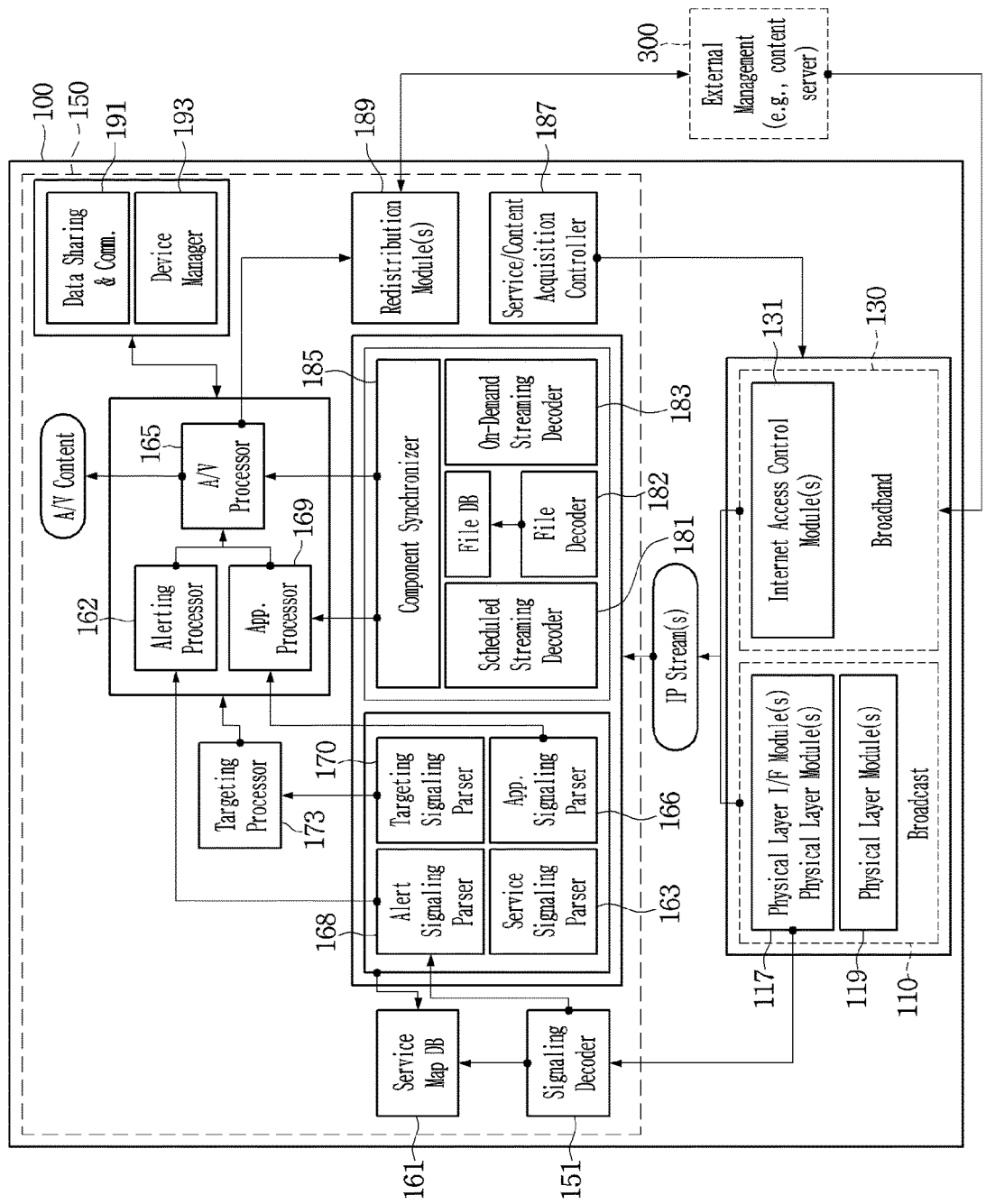
[Figure 36]

【Figure 37】
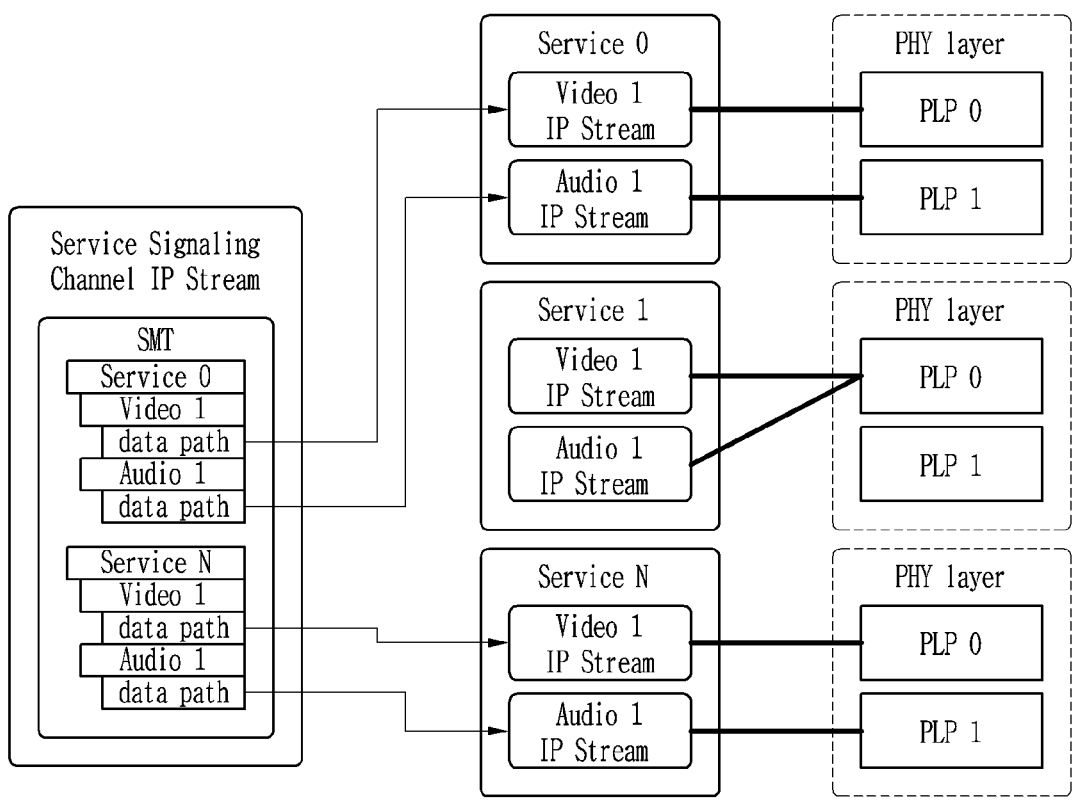

【Figure 38】

| Syntax | No. of Bits | Format |
|---|---|---|
| service_map_table_section() { | | |
|     table_id | 8 | 0xDB |
|     section_syntax_indicator | 1 | '0' |
|     private_indicator | 1 | '1' |
|     reserved | 2 | '11' |
|     section_length | 12 | uimsbf |
|     table_id_extension { | | |
|         SMT_protocol_version | 8 | uimsbf |
|         reserved | 8 | uimsbf |
|     } | | |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     num_services | 8 | uimsbf |
|     for (i=0; i<num_services; i++) | | |
|     { | | |
|         service_id | 16 | uimsbf |
|         reserved | 2 | '11' |
|         service_status | 2 | uimsbf |
|         SP_indicator | 1 | bslbf |
|         short_service_name_length /* m */ | 3 | uimsbf |
|         short_service_name | 16*m | bslbf |
|         reserved | 2 | '11' |
|         service_category | 6 | uimsbf |
|         reserved | 3 | '111' |
|         num_components | 5 | uimsbf |
|         for (j=0; j<num_components; j++) | | |
|         { | | |
|             essential_component_indicator | 1 | bsblf |
|             reserved | 3 | '111' |
|             num_component_level_descriptors | 4 | uimsbf |
|             for (k=0; k<num_component_level_descriptors; k++) | | |
|             { | | |
|                 component_level_descriptor() | var | |
|             } | | |
|         } | | |
|         reserved | 4 | '111' |
|         num_service_level_descriptors | 4 | uimsbf |
|         for (m=0; m<num_service_level_descriptors; m++) | | |
|         { | | |
|             service_level_descriptor() | var | |
|         } | | |
|     } | | |
| } | | |

[Figure 39]

| service_category | Meaning |
|---|---|
| 0x00 | The service category is not specified |
| 0x01 | Basic TV |
| 0x02 | Basic Radio |
| 0x03 | RI service - Rights Issuer service |
| 0x04 | Not specified by the current version of this standard. |
| 0x05 | Not specified by the current version of this standard. |
| 0x06 | Not specified by the current version of this standard. |
| 0x07 | Data Service |
| 0x08 | Service Guide - Service Guide (Announcement) |
| 0x09 | Emergency Alerting |
| 0x0A | Not specified by the current version of this standard. |
| 0x0B ~ 0xFF | Reserved for future use. |

【Figure 40】

| Syntax | No. of Bits | Format |
|---|---|---|
| service_map_table_section() { | | |
|     table_id | 8 | 0xDB |
|     section_syntax_indicator | 1 | '0' |
|     private_indicator | 1 | '1' |
|     reserved | 2 | '11' |
|     section_length | 12 | uimsbf |
|     table_id_extension { | | |
|         SMT_protocol_version | 8 | uimsbf |
|         reserved | 8 | uimsbf |
|     } | | |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     num_services | 8 | uimsbf |
|     for (i=0; i<num_services; i++) | | |
|     { | | |
|         service_id | 16 | uimsbf |
|         reserved | 2 | '11' |
|         service_status | 2 | uimsbf |
|         SP_indicator | 1 | bslbf |
|         short_service_name_length /* m */ | 3 | uimsbf |
|         short_service_name | 16*m | bslbf |
|         reserved | 2 | '11' |
|         service_category | 6 | uimsbf |
|         reserved | 3 | '111' |
|         num_components | 5 | uimsbf |
|         for (j=0; j<num_components; j++) | | |
|         { | | |
|             essential_component_indicator | 1 | bsblf |
|             reserved | 3 | '111' |
|             num_component_level_descriptors | 4 | uimsbf |
|             for (k=0; k<num_component_level_descriptors; k++) | | |
|             { | | |
|                 component_level_descriptor() | var | |
|             } | | |
|         } | | |
|         reserved | 4 | '111' |
|         num_service_level_descriptors | 4 | uimsbf |
|         for (m=0; m<num_service_level_descriptors; m++) | | |
|         { | | |
|             service_level_descriptor() | var | |
|         { | | |
| reserved | 4 | '1111' |
| num_ensemble_level_descriptors | 4 | uimsbf |
| for (n=0; n<num_ensemble_level_descriptors; n++) | | |
| { | | |
|     ensemble_level_descriptor() | var | |
|     } | | |
| } | | |

[Figure 41]
| Syntax | No. of bits | Format |
|---|---|---|
| stream_identifier_descriptor(){ | | |
|     descriptor_tag | 8 | uimsbf |
|     descriptor_length | 8 | uimsbf |
|     component_tag | 8 | uimsbf |
| } | | |
[Figure 42]
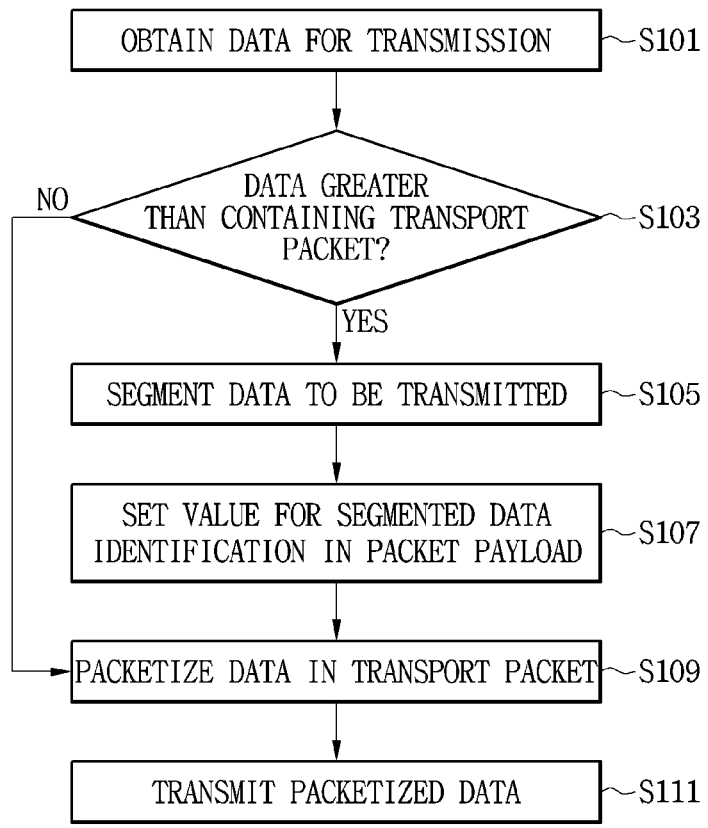

[Figure 43]
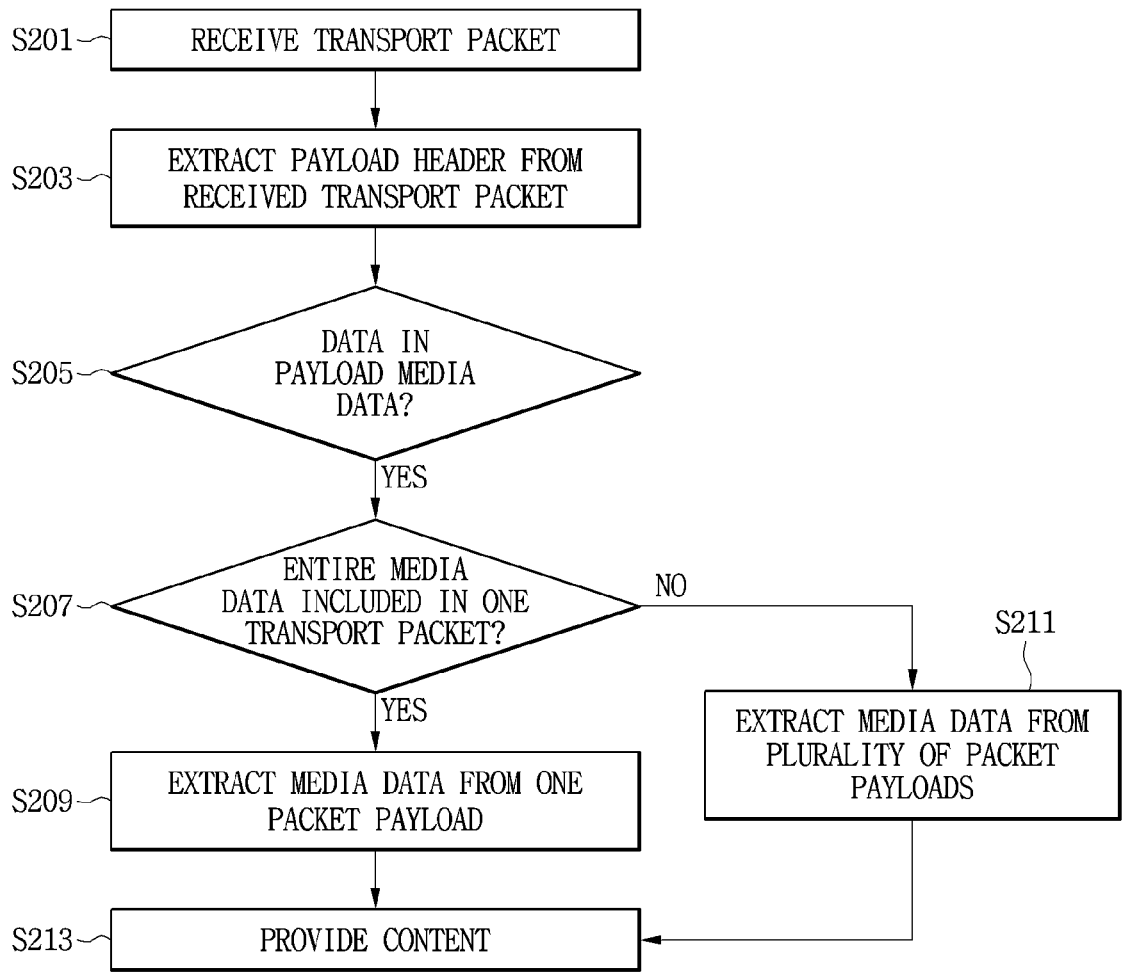
[Figure 44]
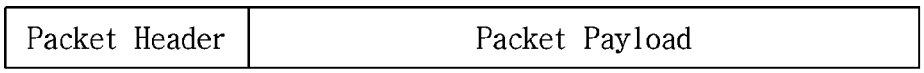

[Figure 45]
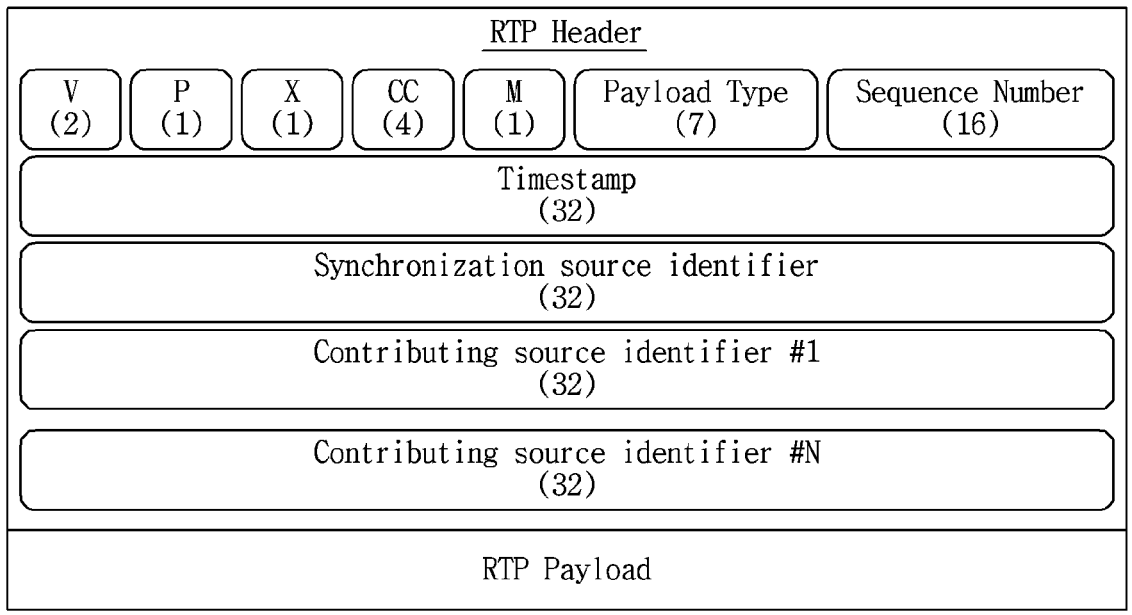
[Figure 46]
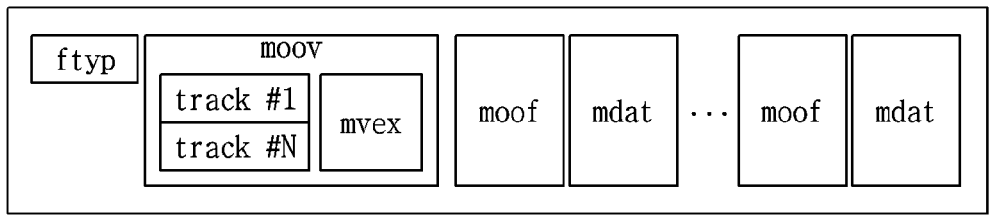
[Figure 47]
Payload Header (8bits)
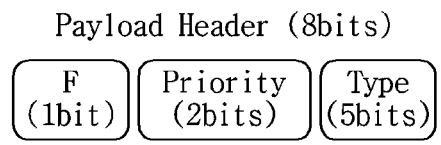

[Figure 48]
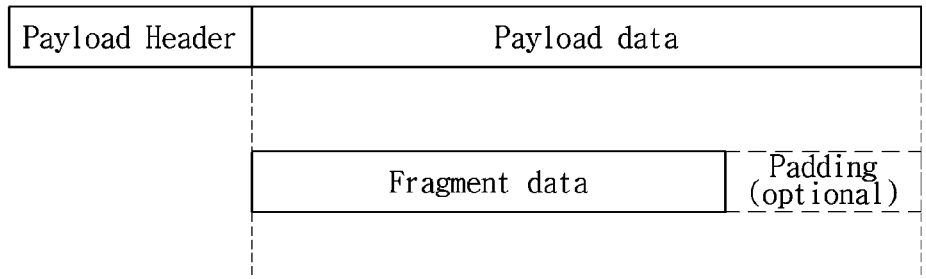
[Figure 49]
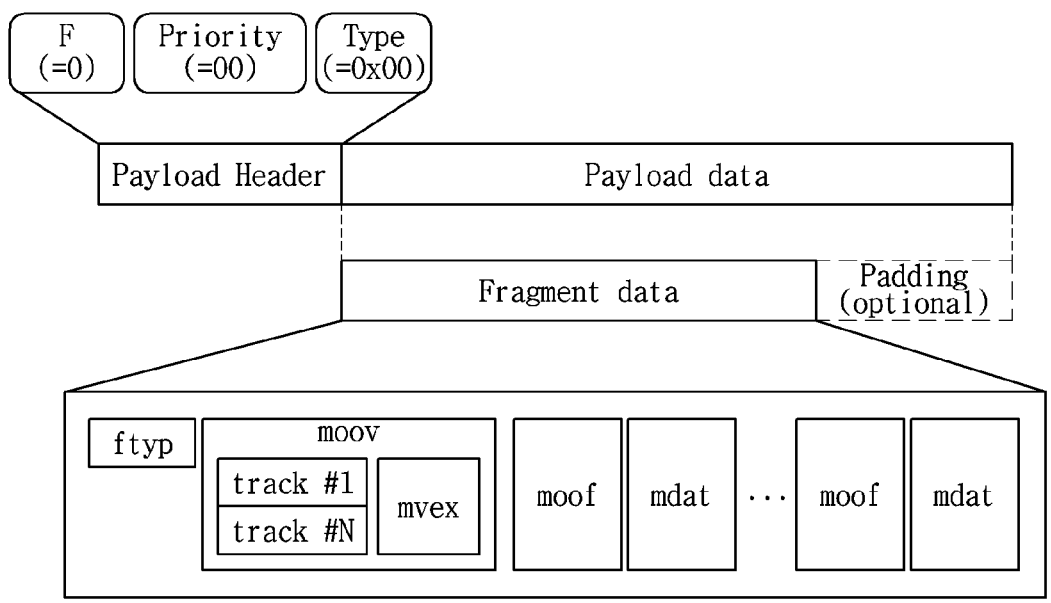
[Figure 50]
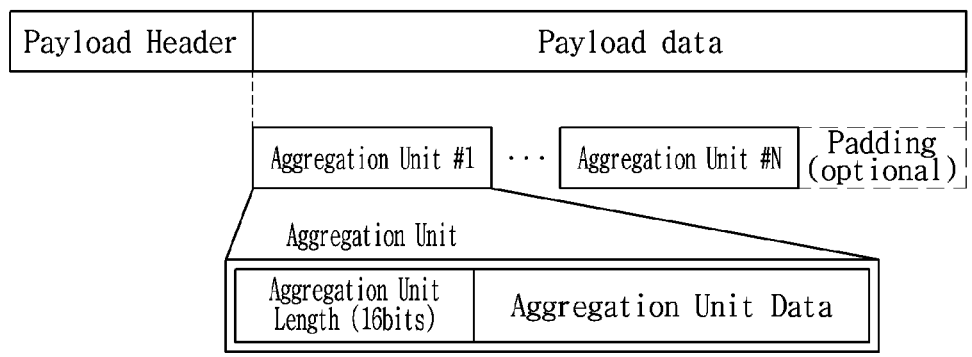

[Figure 51]
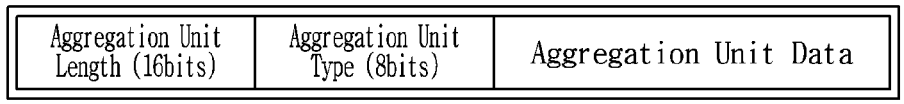
[Figure 52]
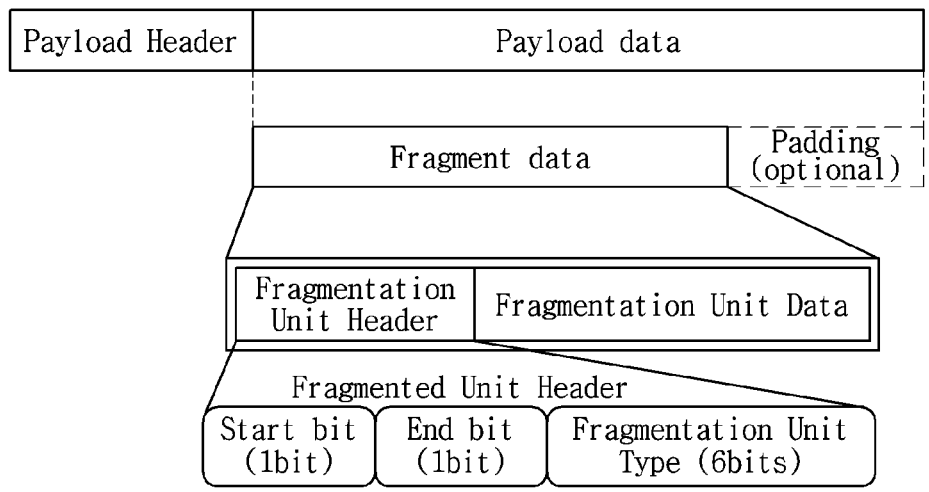
[Figure 53]
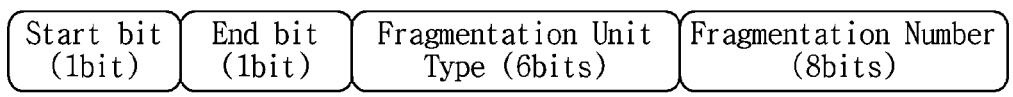
[Figure 54]
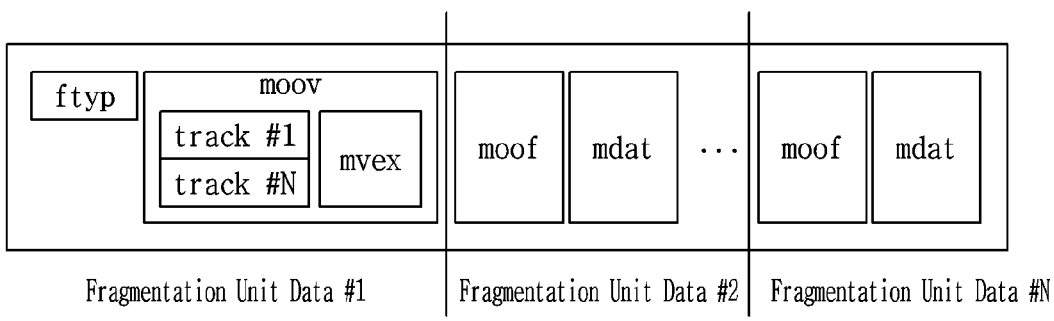

[Figure 55]
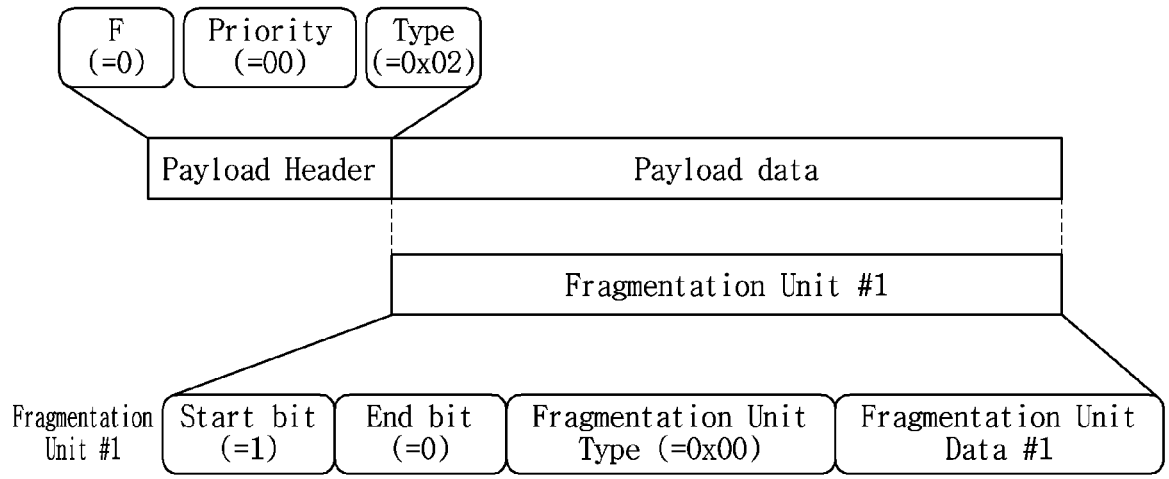
[Figure 56]
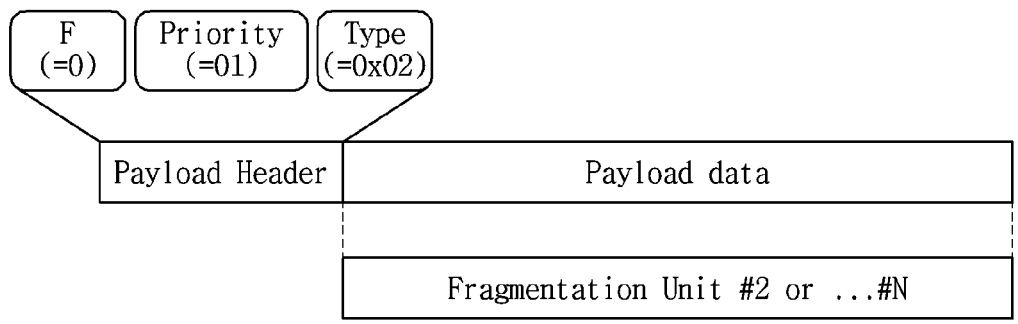
[Figure 57]
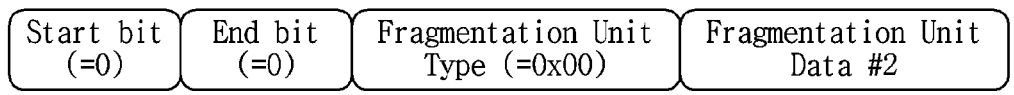
[Figure 58]
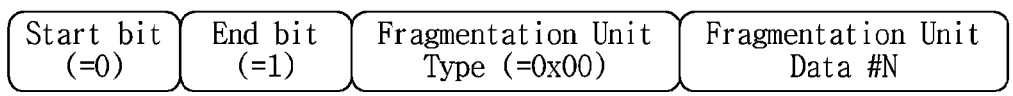

[Figure 59]

| Syntax | No. of Bits | Format |
|---|---|---|
| timeline_component_AU{ | | |
|     identifier | 8 | TBD |
|     AU_length | 32 | uimsbf |
|     location_flag | 1 | bslbf |
|     origin_timestamp_flag | 1 | bslbf |
|     timestamp_version | 1 | bslbf |
|     timestamp_type | 1 | bslbf |
|     timestamp_format | 4 | bslbf |
|     if(location_flag){ | | |
|         location_length /*M*/ | 8 | uimsbf |
|         location | 8*M | |
|     } | | |
|     if(origin_timestamp_flag){ | | |
|         origin_timestamp_version | 1 | bslbf |
|         origin_timestamp_type | 1 | uimsbf |
|         origin_timestamp_format | 4 | uimsbf |
|         origin_location_flag | 1 | bslbf |
|         reserved | 1 | '1' |
|         if(origin_timestamp_flag){ | | |
|           origin_location_length /*L*/ | 8 | uimsbf |
|           origin_location | 8*L | |
|         } | | |
|         if(origin_timestamp_format ==0x00){ | | |
|           origin_timescale | 32 | uimsbf |
|           origin_media_time | 32 or 64 | uimsbf |
|         }else if(origin_timestamp_format==0x01 \|\| | | |
|             origin_timestamp_format==0x02 \|\| | | |
|             origin_timestamp_format==0x03) { | | |
|           origin_timestamp | 32 or 64 | uimsbf |
|         } else { | | |
|           private_data_length /*LEN*/ | 16 | uimsbf |
|           private_data_bytes() | 8*LEN | |
|         } | | |
|     } | | |
|     if(timestamp_format==0x00){ | | |
|         timescale | 32 | uimsbf |
|         media_time | 32 or 64 | uimsbf |
|     }else if(origin_timestamp_format==0x01 \|\| | | |
|         origin_timestamp_format==0x02 \|\| | | |
|         origin_timestamp_format==0x03) { | | |
|         timestamp | 32 or 64 | uimsbf |
|     } else { | | |
|         data_bytes() | variable | |
|     } | | |
| } | | |

[Figure 60]
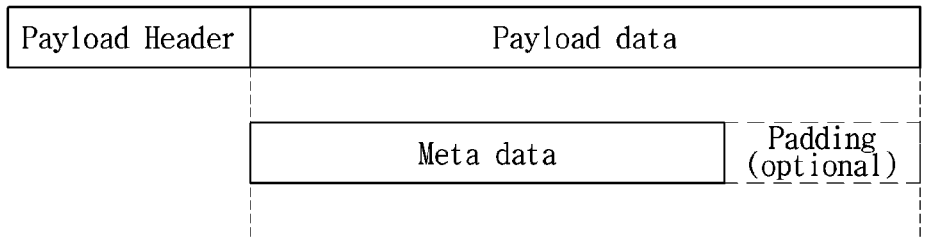
[Figure 61]
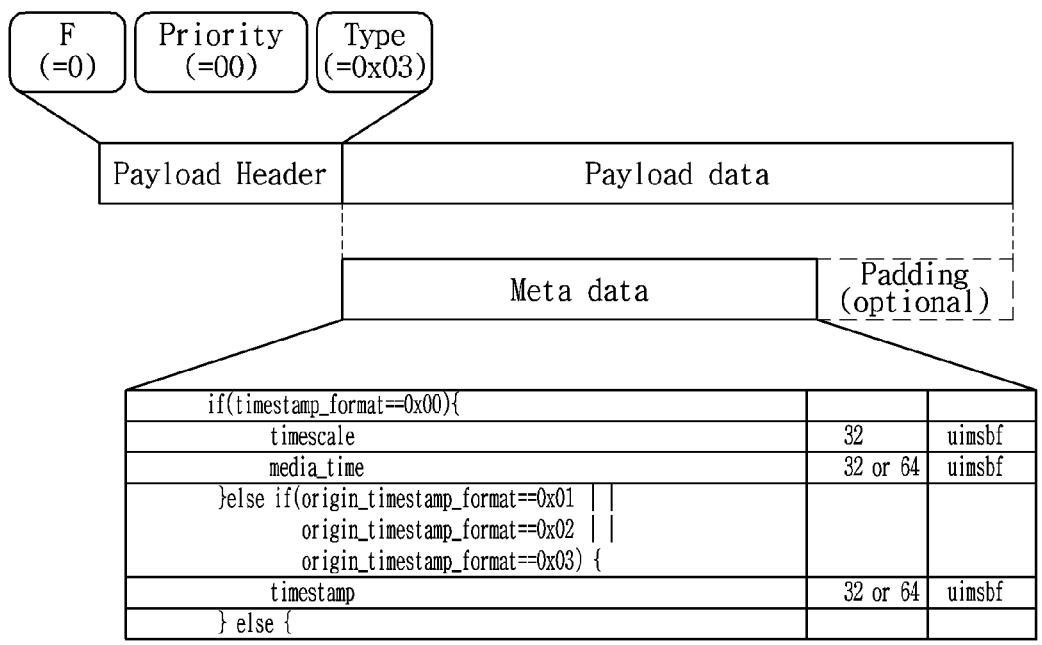
[Figure 62]
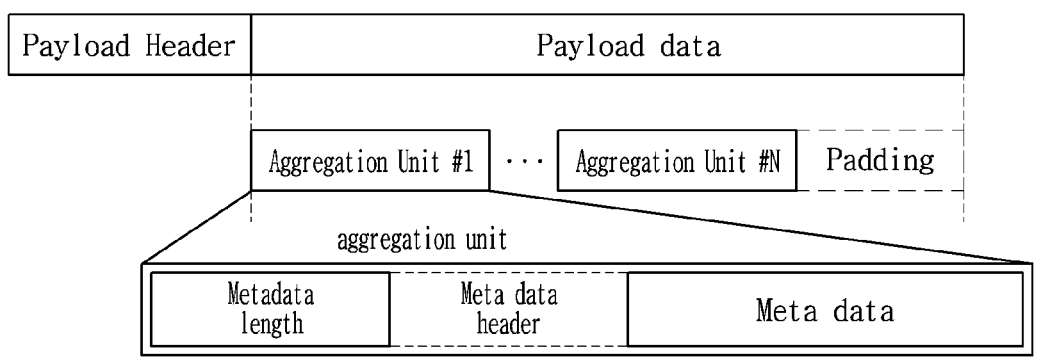

[Figure 63]
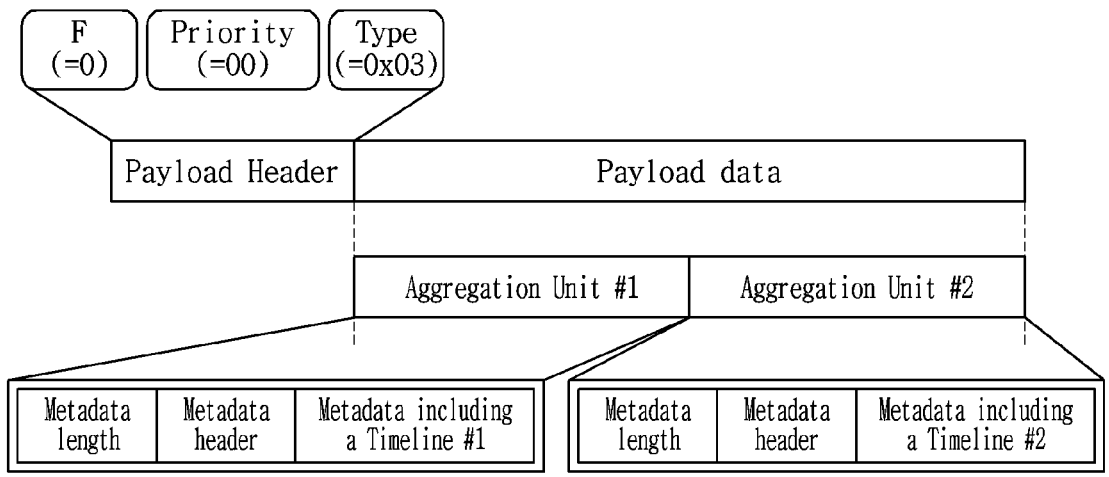
[Figure 64]
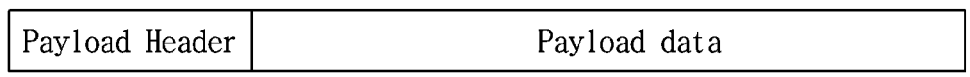
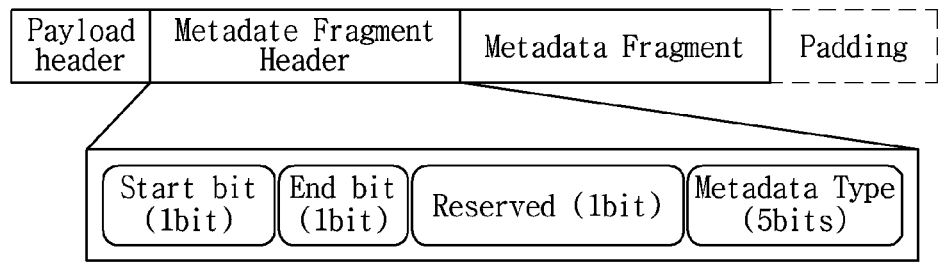
[Figure 65]
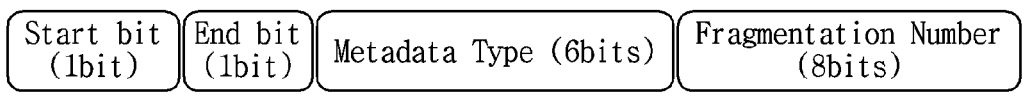

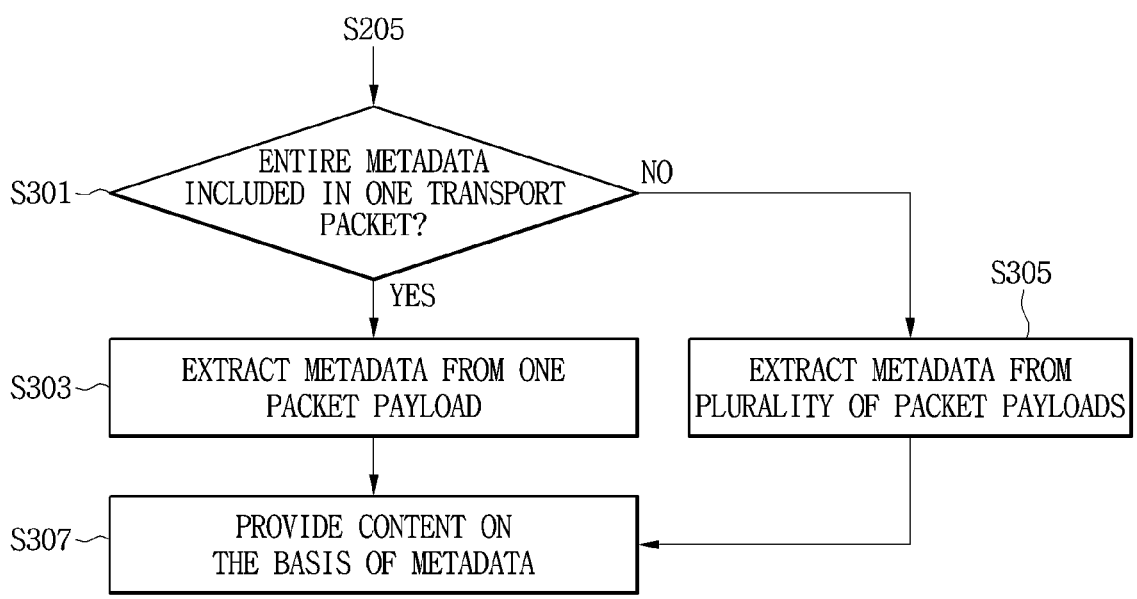
[Figure 66]

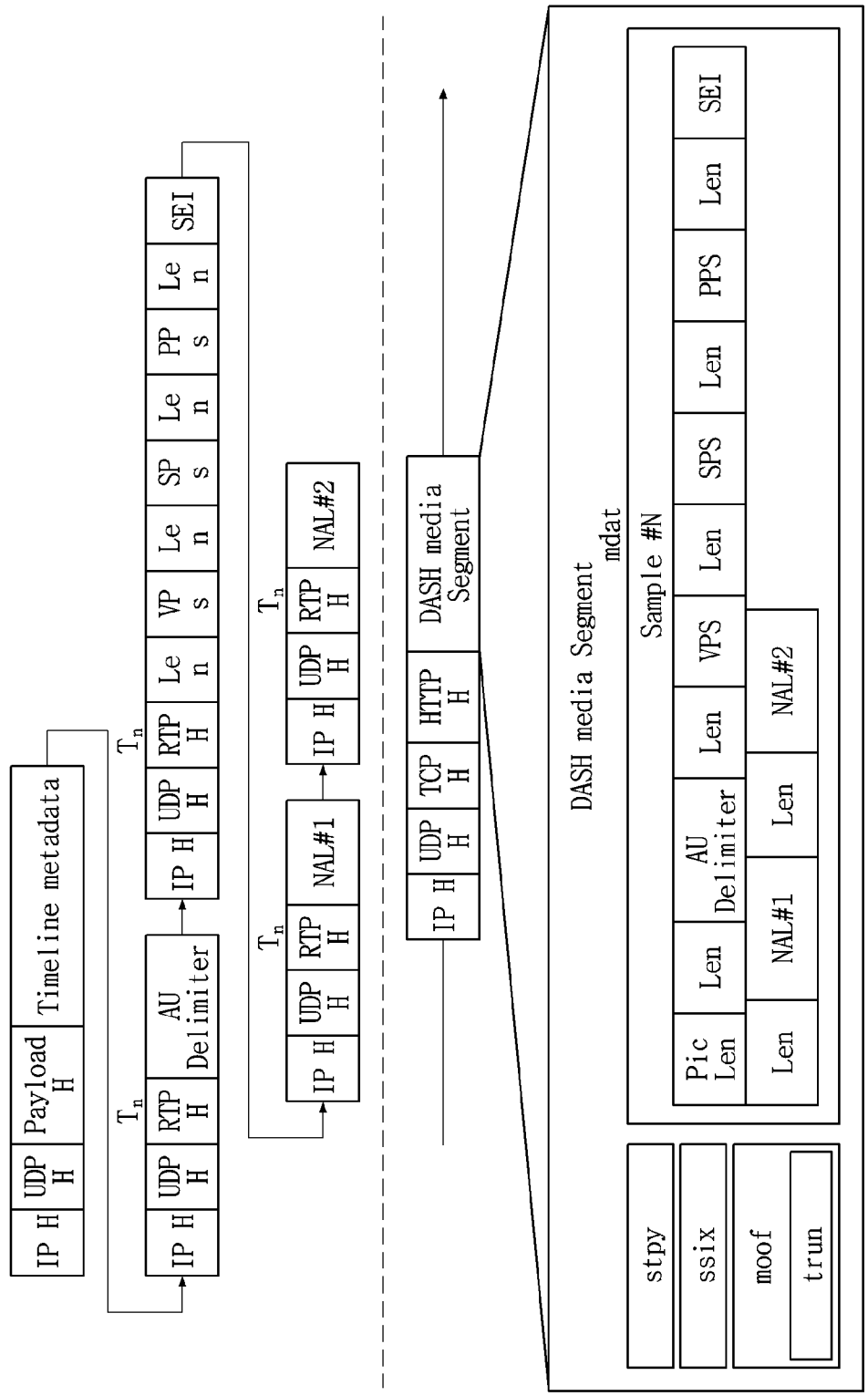
[Figure 67]

[Figure 68]
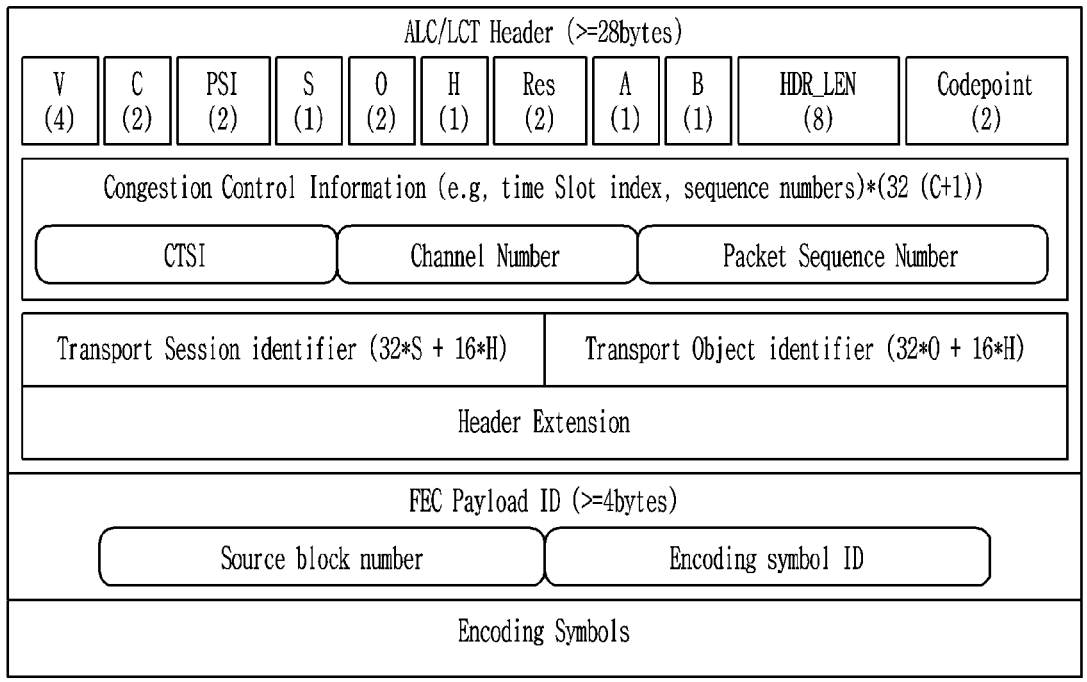
[Figure 69]
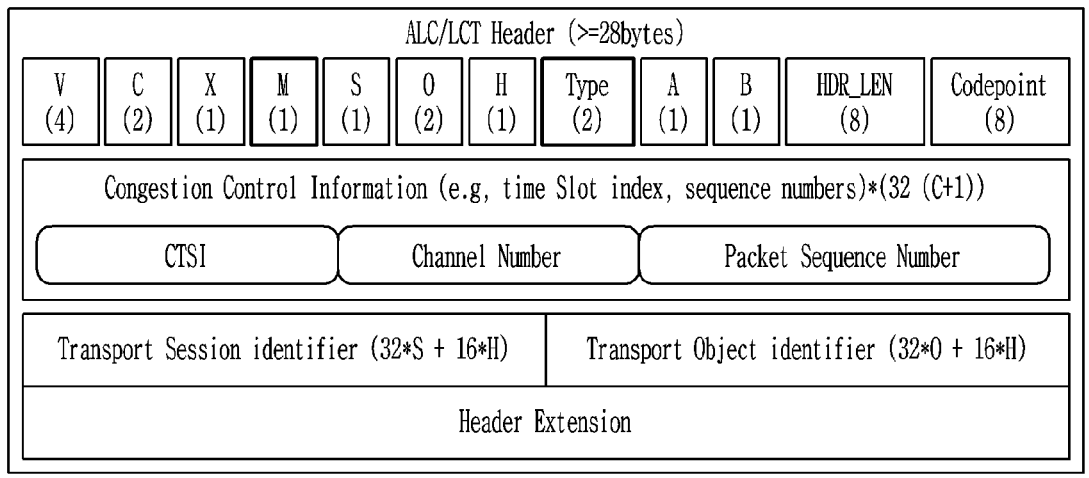

【Figure 70】
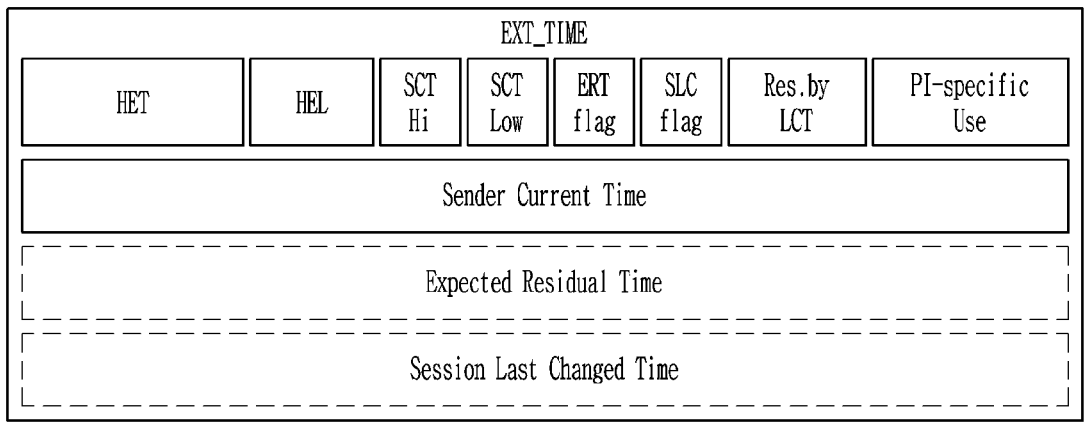
【Figure 71】
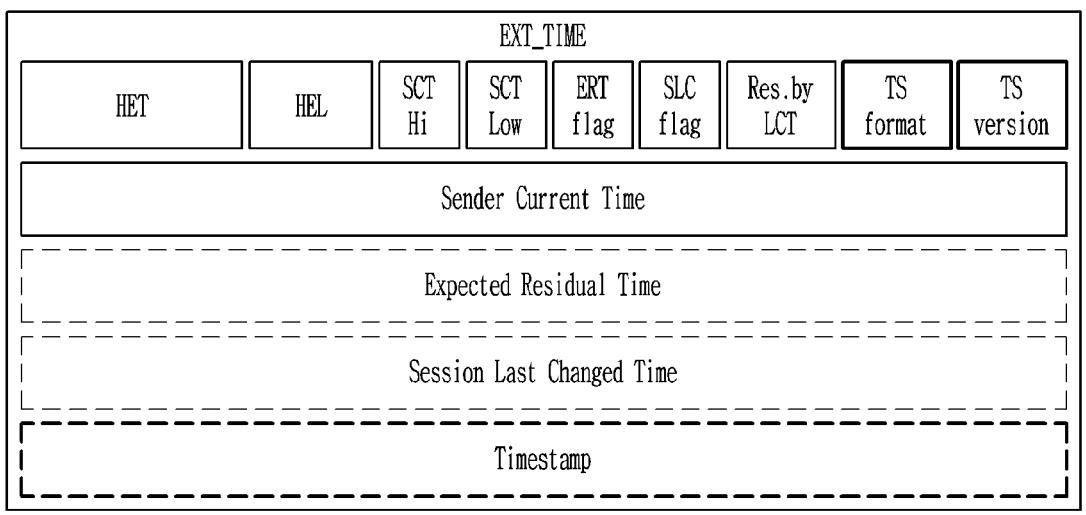
【Figure 72】
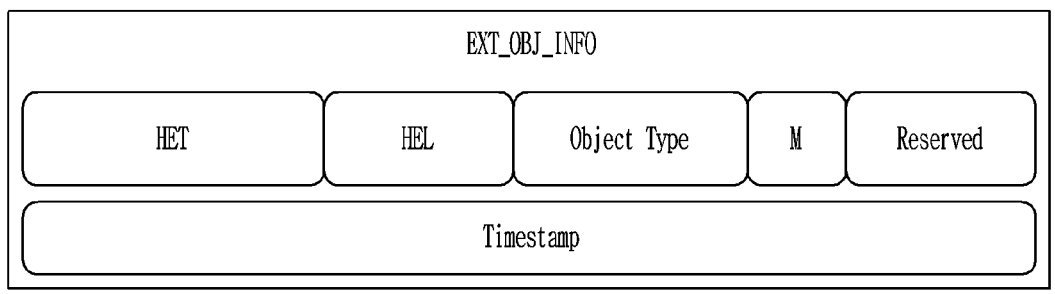

[Figure 73]
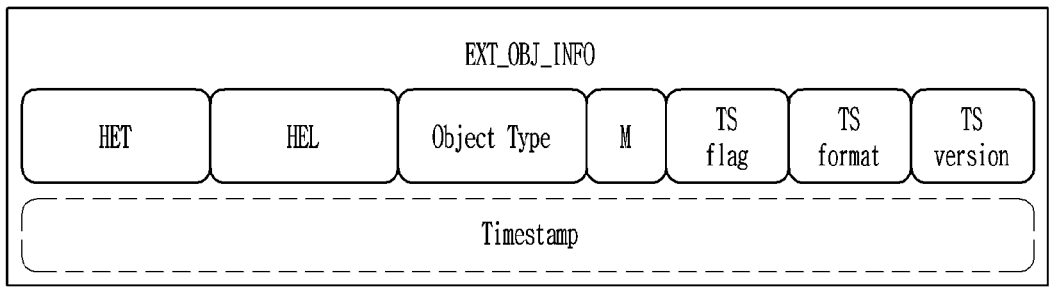
[Figure 74]
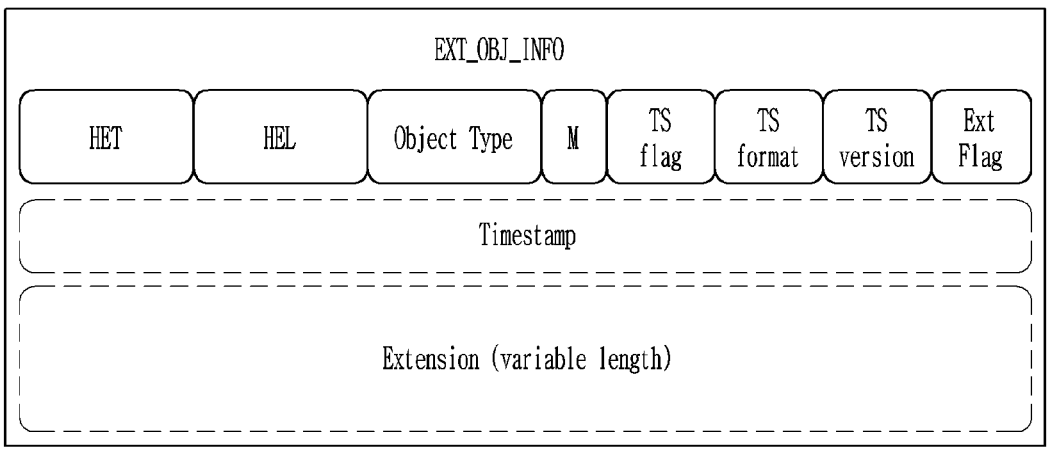
[Figure 75]
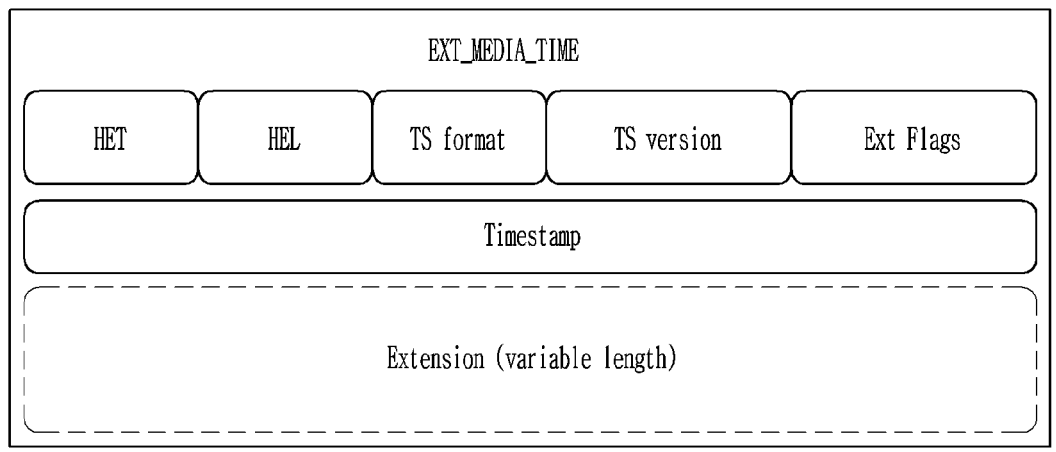

[Figure 76]
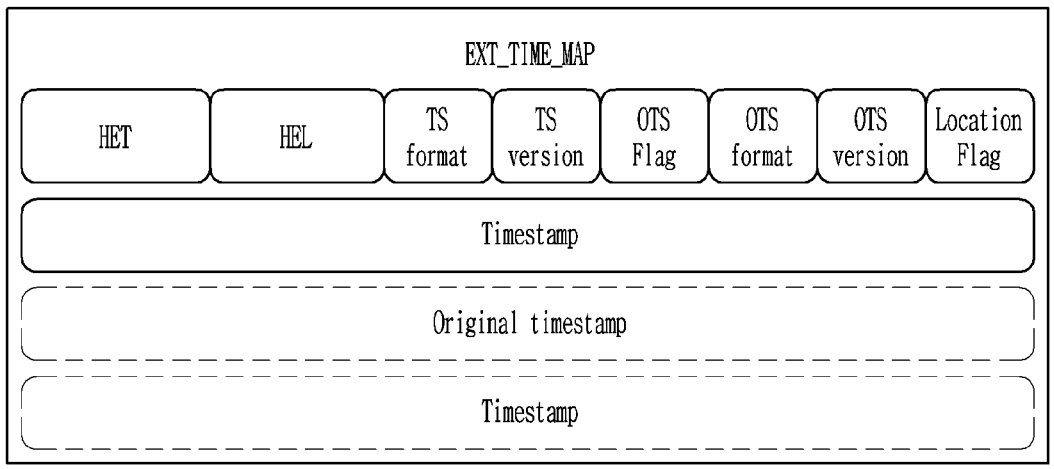
[Figure 77]
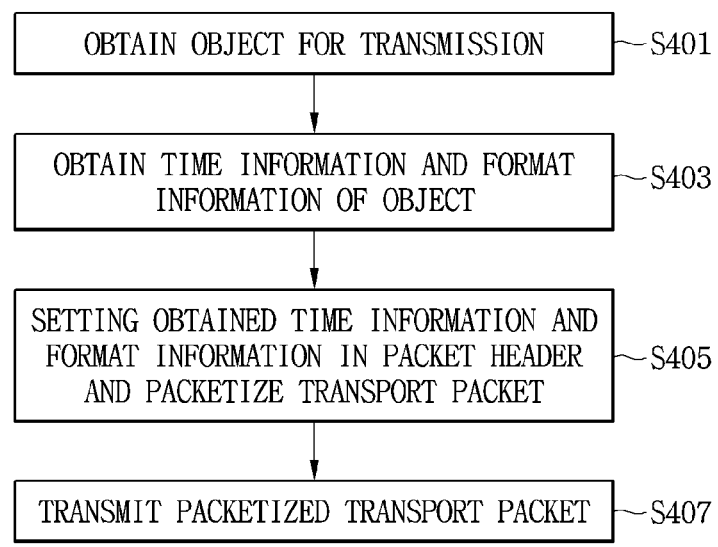

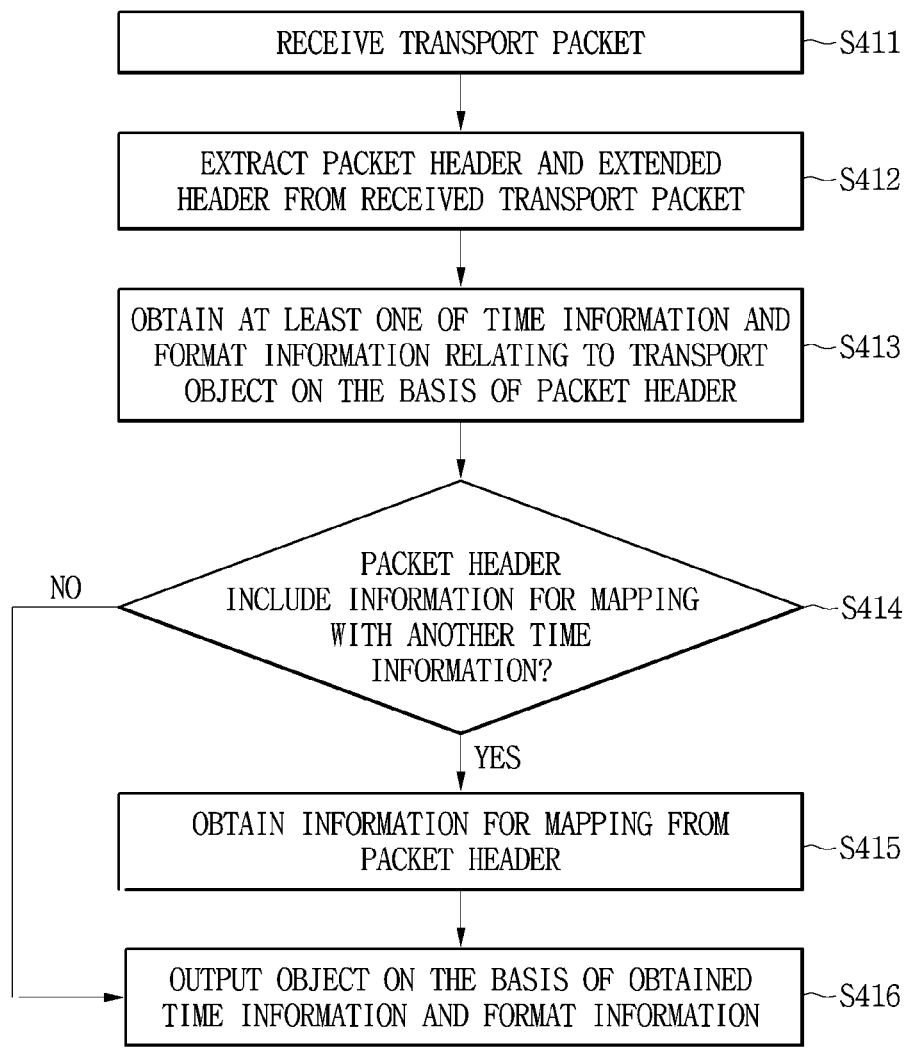
[Figure 78]

[Figure 79]
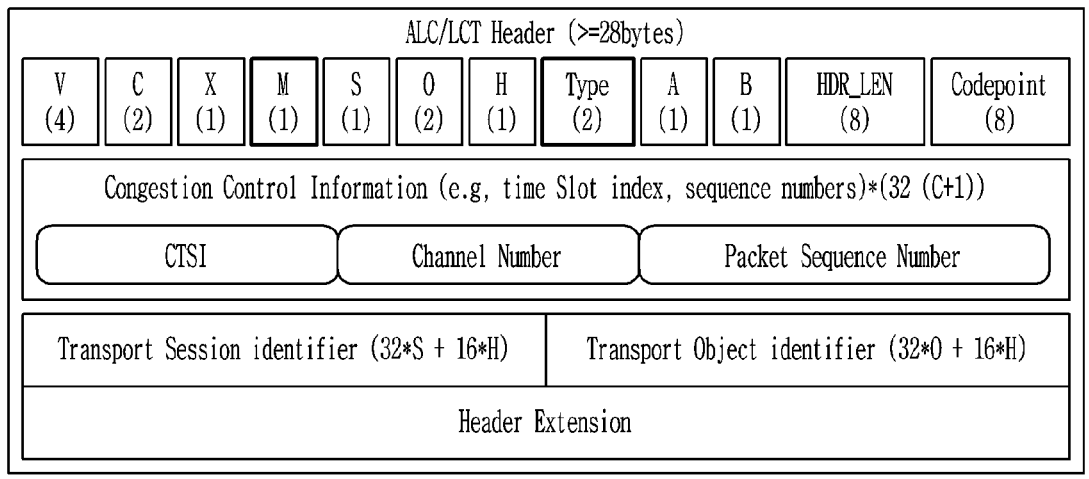
[Figure 80]
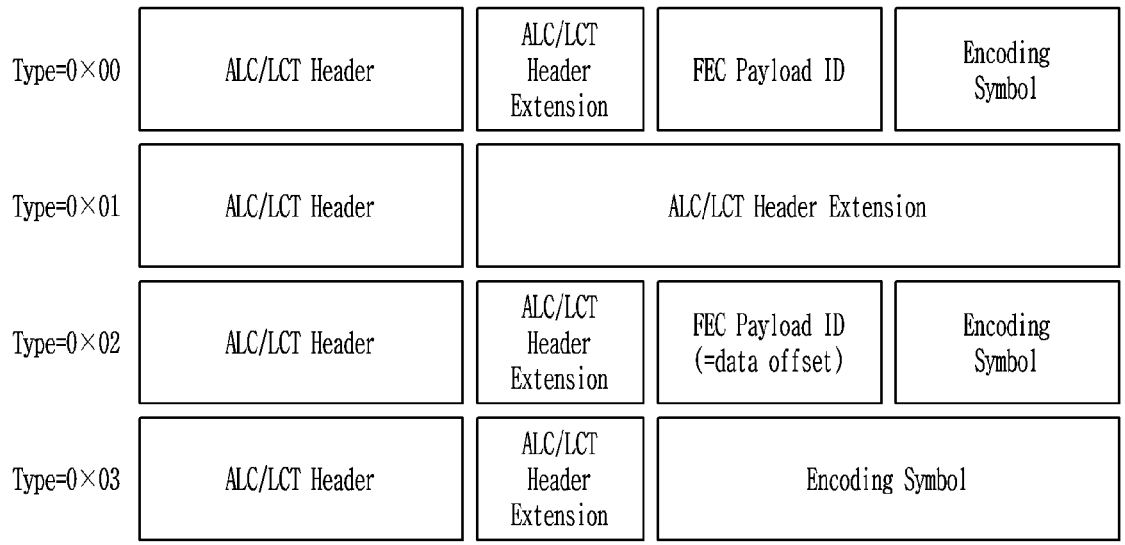

[Figure 81]
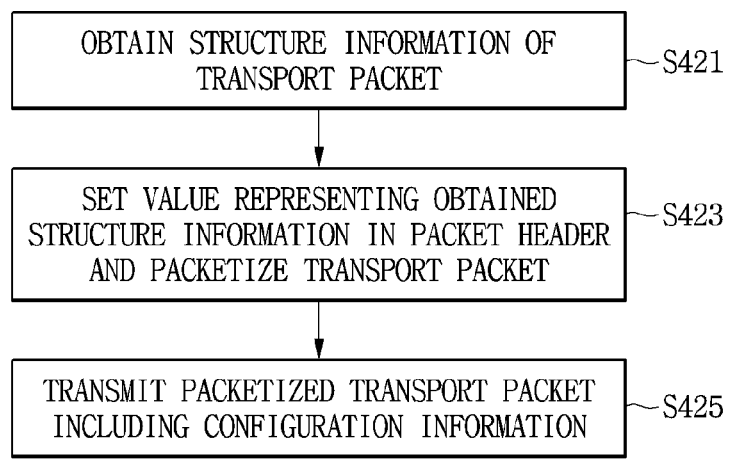
[Figure 82]
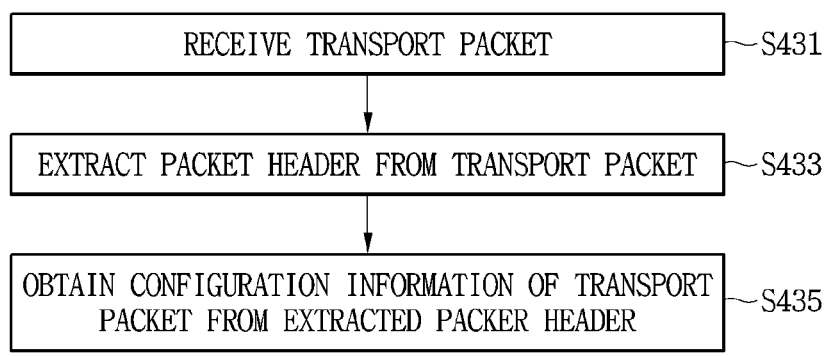

BROADCAST TRANSMISSION DEVICE AND OPERATING METHOD THEREOF, AND BROADCAST RECEPTION DEVICE AND OPERATING METHOD THEREOF

CROSS REFERENCE TO RELATED APPLICATIONS

This Application is a Continuation of U.S. application Ser. No. 15/109,526, filed on Jul. 1, 2016 (now U.S. Pat. No. 10,694,260, issued on Jun. 23, 2020), which is the National Phase of PCT International Application No. PCT/KR2014/013081, filed on Dec. 30, 2014, which claims priority under 35 U.S.C. 119(e) to U.S. Provisional Application No. 61/923,186, filed on Jan. 2, 2014, all of these applications are hereby expressly incorporated by reference into the present application.

BACKGROUND OF THE INVENTION

Field of the Invention

The present disclosure relates to a broadcast transmission device and an operating method thereof, and a broadcast reception device and an operating method thereof.

Discussion of the Related Art

Recent digital broadcasts require service and content transmission synchronization methods for supporting hybrid broadcasts to receive A/V through terrestrial broadcast networks and A/V and enhancement data through internet network.

Especially, as one of the promising applications to be used in the future DTV service, there are hybrid broadcast services interworking with internet networks in addition to existing terrestrial broadcast networks. The hybrid broadcast services transmit enhancement data relating to a broadcast content transmitted via terrestrial broadcast networks or part of broadcast content, via internet networks in real-time, so that they allow users to experience various contents. Therefore, required are a broadcast transmission device and broadcast reception device for transmitting and receiving broadcast contents through both terrestrial broadcast networks and internet networks.

SUMMARY OF THE INVENTION

Embodiments provide a broadcast transmission device and an operating method thereof, and a broadcast reception device and an operating method thereof in order to support the next generation hybrid broadcasts interworking with terrestrial broadcast networks and internet networks.

Embodiments also provide a broadcast transmission device and an operating method thereof, and a broadcast reception device and an operating method thereof in order to use a payload format of transport packet for media file format based data transfer on a real-time content transport protocol of broadcast services.

Embodiments also provide a broadcast transmission device and an operating method thereof, and a broadcast reception device and an operating method thereof in order to use a transport packet structure for transmitting a type of an object to be transmitted and timing information of the object.

Embodiments also provide a broadcast transmission device and an operating method thereof, and a broadcast reception device and an operating method thereof in order to use a transport packet structure for mapping of different timing information for each object to be transmitted.

Embodiments also provide a broadcast transmission device and an operating method thereof, and a broadcast reception device and an operating method thereof in order to use a transport packet structure for a dynamic configuration of a transport packet.

In one embodiment, a broadcast reception device includes: a broadcast reception unit configured to receive a transport packet, the transport packet divided into a packet payload including a transport object that is a target of a transmission through a packet and a packet header signaling the packet payload; and a control unit configured to extract the packet header from the transport packet, extract first information relating to a presentation or decoding time point of the transport object from the extracted packet header, and output the transport object on the basis of the first information.

The control unit may obtain second information representing a type of the transport object from the packet header.

The second information may represent that the type of the transport object is at least one of a first type of an ISO BMFF based regular file, a second type of an entity according to HTTP, and a third type of an audio or video access unit.

The first information may include at least one of first time information including a timestamp of the transport object and second time information including a timestamp of a base timeline mapped into the first time information.

The packet header may include location information of data relating to the base timeline mapped into the first time information.

The control unit may obtain information on whether the second time information is included in the transport packet from the packet header.

The control unit may obtain at least one of format information of the first time information and format information of the second time information from the packet header.

The control unit may obtain the first information and the second information as part of the packet header from a header extension selectively included in the packet header.

The control unit may obtain structure type information of the transport packet from the packet header.

The structure type of the transport packet may include a first structure type including a packet header, a header extension, a payload identifier, and object data, a second structure type only including a packet header and a header extension, and a third structure type only including a packet header, a header extension, and object data.

The first structure type may further include offset information of object data.

In another embodiment, an operating method of a broadcast reception device includes: receiving a transport packet, the transport packet divided into a packet payload including a transport object that is a target of a transmission through a packet and a packet header signaling the packet payload; extracting the packet header from the transport packet; obtaining first information relating to a presentation or decoding time point of the transport object from the extracted packet header; and outputting the transport object on the basis of the first information.

The method may further include obtaining second information representing a type of the transport object from the packet header.

The first information may include at least one of first time information including a timestamp of the transport object and second time information including a timestamp of a base timeline mapped into the first time information.

The method may further include determining whether the second time information is included in the packet header on the basis of the extracted packet header.

The method may further include obtaining the first information and the second information as part of the packet header from a header extension selectively included in the packet header.

The method may further include obtaining structure type information of the transport packet from the packet header.

The structure type of the transport packet may include a first structure type including a packet header, a header extension, a payload identifier, and object data, a second structure type only including a packet header and a header extension, and a third structure type only including a packet header, a header extension, and object data.

In further another embodiment, a broadcast transmission device includes: a control unit configured to obtain a transport object that is a target of a transmission through a packet, obtain at least one of first information relating to a presentation or decoding time point of the transport object and second information representing a type of the transport object, and set at least one of the obtained first information and second information in a packet header to packetize data; and a transmission unit configured to transmit the packetized data through a transport packet, wherein the control unit sets the first information and the second information, as part of the packet header, in a header extension selectively included in the packet header.

In further another embodiment, an operating method of a broadcast transmission device includes: obtaining a transport object that is a target of a transmission through a packet; obtaining at least one of first information relating to a presentation or decoding time point of the transport object and second information representing a type of the transport object; setting the obtained first information and second information in a packet header to packetize a transport packet; and transmitting the packetized transport packet.

An embodiment of the present invention provides a broadcast transmission device and an operating method thereof, and a broadcast reception device and an operating method thereof, in order for efficiently transmitting and receiving a corresponding transport packet when one transport packet includes one file format based media data or a plurality of file format based media data.

Additionally, an embodiment of the present invention provides a broadcast transmission device and an operating method thereof, and a broadcast reception device and an operating method thereof, in order for efficiently transmitting and receiving a corresponding transport packet when one transport packet includes at least one metadata.

Additionally, an embodiment of the present invention provides a broadcast transmission device and an operating method thereof, and a broadcast reception device and an operating method thereof in order to use a transport packet structure for transmitting a type of an object to be transmitted and timing information of the object.

Additionally, an embodiment of the present invention provides a broadcast transmission device and an operating method thereof, and a broadcast reception device and an operating method thereof in order to use a transport packet structure for mapping of different timing information for each object to be transmitted.

Additionally, an embodiment of the present invention provides a broadcast transmission device and an operating method thereof, and a broadcast reception device and an operating method thereof in order to use a transport packet structure for a dynamic configuration of a transport packet.

BRIEF DESCRIPTION OF THE DRAWINGS

FIG. 1 illustrates a structure of an apparatus for transmitting broadcast signals for future broadcast services according to an embodiment of the present invention.

FIG. 2 illustrates an input formatting block according to one embodiment of the present invention.

FIG. 3 illustrates an input formatting block according to another embodiment of the present invention.

FIG. 4 illustrates an input formatting block according to another embodiment of the present invention.

FIG. 5 illustrates a BICM block according to an embodiment of the present invention.

FIG. 6 illustrates a BICM block according to another embodiment of the present invention.

FIG. 7 illustrates a frame building block according to one embodiment of the present invention.

FIG. 8 illustrates an OFMD generation block according to an embodiment of the present invention.

FIG. 9 illustrates a structure of an apparatus for receiving broadcast signals for future broadcast services according to an embodiment of the present invention.

FIG. 10 illustrates a frame structure according to an embodiment of the present invention.

FIG. 11 illustrates a signaling hierarchy structure of the frame according to an embodiment of the present invention.

FIG. 12 illustrates preamble signaling data according to an embodiment of the present invention.

FIG. 13 illustrates PLS1 data according to an embodiment of the present invention.

FIG. 14 illustrates PLS2 data according to an embodiment of the present invention.

FIG. 15 illustrates PLS2 data according to another embodiment of the present invention.

FIG. 16 illustrates a logical structure of a frame according to an embodiment of the present invention.

FIG. 17 illustrates PLS mapping according to an embodiment of the present invention.

FIG. 18 illustrates EAC mapping according to an embodiment of the present invention.

FIG. 19 illustrates FIC mapping according to an embodiment of the present invention.

FIG. 20 illustrates a type of DP according to an embodiment of the present invention.

FIG. 21 illustrates DP mapping according to an embodiment of the present invention.

FIG. 22 illustrates an FEC structure according to an embodiment of the present invention.

FIG. 23 illustrates a bit interleaving according to an embodiment of the present invention.

FIG. 24 illustrates a cell-word demultiplexing according to an embodiment of the present invention.

FIG. 25 illustrates a time interleaving according to an embodiment of the present invention.

FIG. 26 illustrates the basic operation of a twisted row-column block interleaver according to an embodiment of the present invention.

FIG. 27 illustrates an operation of a twisted row-column block interleaver according to another embodiment of the present invention.

FIG. 28 illustrates a diagonal-wise reading pattern of a twisted row-column block interleaver according to an embodiment of the present invention.

FIG. 29 illustrates interleaved XFECBLOCKs from each interleaving array according to an embodiment of the present invention.

FIG. 30 is a view of a protocol stack for supporting a broadcast service according to an embodiment of the present invention.

FIG. 31 is a view illustrating a broadcast transmission frame according to an embodiment of the present invention.

FIG. 32 is a view of a broadcast transmission frame according to another embodiment of the present invention.

FIG. 33 is a view illustrating a structure of a transport packet transmitting a broadcast service according to an embodiment of the present invention.

FIG. 34 is a view illustrating a value that a network protocol field has in a transport packet transmitting a broadcast service according to an embodiment of the present invention.

FIG. 35 is a view illustrating a configuration of a broadcast reception device according to an embodiment of the present invention.

FIG. 36 is a view illustrating a configuration of a broadcast reception device according to another embodiment of the present invention.

FIG. 37 is a view that a broadcast service signaling table and broadcast service transmission path signaling information signal broadcast service and a broadcast service transmission path.

FIG. 38 is a view illustrating a broadcast service signaling table according to an embodiment of the present invention.

FIG. 39 is a view illustrating a value that a service category field has in a broadcast service signaling table according to an embodiment of the present invention.

FIG. 40 is a view of a broadcast service signaling table according to another embodiment of the present invention.

FIG. 41 is a view of a stream identifier descriptor according to another embodiment of the present invention.

FIG. 42 is a view illustrating an operation when a broadcast transmission device transmits a broadcast packet according to an embodiment of the present invention.

FIG. 43 is a view illustrating an operation when a broadcast reception device receives a broadcast packet according to an embodiment of the present invention.

FIG. 44 is a view illustrating a segment configuration according to an embodiment of the present invention.

FIG. 45 is a view illustrating a structure of a real-time transport protocol (RTP) packet according to an embodiment of the present invention.

FIG. 46 is a view illustrating a media file format based on an ISO base media file format (ISO BMFF) according to an embodiment of the present invention.

FIG. 47 is a view illustrating a configuration of a payload header in a packet payload according to an embodiment of the present invention.

FIGS. 48 and 49 are views illustrating a payload configuration of a transport packet in which one media data is packetized in one packet.

FIGS. 50 and 51 are views illustrating a configuration of a transport packet in which a plurality of media data are packetized in one packet.

FIG. 52 is a view illustrating a payload configuration of a transport packet (hereinafter referred to as a fragmented packet) in which one media data is divided and packetized into a plurality of transport packets.

FIG. 53 is a view illustrating a configuration of a payload in a fragmented packet according to another embodiment of the present invention.

FIG. 54 is a view when a broadcast transmission device fragments an ISO BMFF based media file into a plurality of packets.

FIG. 55 is a view illustrating first fragmentation unit data packetized by the broadcast transmission device of FIG. 54.

FIGS. 56 to 58 are views illustrating a fragmentation unit including remaining data except for the start data in the fragmentation unit data of FIG. 54 according to an embodiment of the present invention.

FIG. 59 is a view illustrating a timeline signaling table of metadata according to an embodiment of the present invention.

FIG. 60 is a view illustrating a configuration of payload data in which one metadata is packetized in payload data of a transport packet.

FIG. 61 is a view when payload data of a transport packet includes metadata for a timeline according to an embodiment of the present invention.

FIG. 62 is a view when a plurality of metadata are packetized in one transport packet.

FIG. 63 is a view when one transport packet includes several timeline information.

FIG. 64 is a view illustrating a packet payload in which one metadata is divided and packetized in a plurality of transport packets.

FIG. 65 is a view illustrating a metadata fragment header according to another embodiment of the present invention.

FIG. 66 is a view illustrating an operation when a broadcast reception device receives a broadcast packet according to an embodiment of the present invention.

FIG. 67 is a view when video stream is transmitted using RTP through broadcast network and video stream is transmitted using file format based media data through an internet network.

FIG. 68 is a view illustrating a configuration of a transport packet according to an embodiment of the present invention.

FIG. 69 is a view illustrating a configuration of a packet header according to an embodiment of the present invention.

FIGS. 70 and 71 are views illustrating a configuration of an expanded header including time information.

FIGS. 72 to 75 are views illustrating a configuration of a header extension according to another embodiment of the present invention.

FIG. 76 is a view illustrating a structure of a header extension for supporting mapping with another timing information according to an embodiment of the present invention.

FIG. 77 is a view illustrating a method of operating a broadcast transmission device according to an embodiment of the present invention.

FIG. 78 is a view illustrating a method of operating a broadcast reception device according to an embodiment of the present invention.

FIG. 79 is a view illustrating a structure of a packet header including information on a configuration of a transport packet.

FIG. 80 is a view illustrating a configuration of the transport packet described with reference to FIG. 79.

FIG. 81 is a view illustrating a method of operating a broadcast transmission device according to an embodiment of the present invention.

FIG. 82 is a view illustrating a method of operating a broadcast reception device according to an embodiment of the present invention.

DETAILED DESCRIPTION OF THE EMBODIMENTS

Hereinafter, embodiments of the present invention will be described in more detail with reference to the accompanying drawings, in order to allow those skilled in the art to easily realize the present invention. The present invention may be realized in different forms, and is not limited to the embodiments described herein. Moreover, detailed descriptions related to well-known functions or configurations will be ruled out in order not to unnecessarily obscure subject matters of the present invention. Like reference numerals refer to like elements throughout.

In additional, when a part "includes" some components, this means that the part does not exclude other components unless stated specifically and further includes other components.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

The present invention may defines three physical layer (PL) profiles—base, handheld and advanced profiles—each optimized to minimize receiver complexity while attaining the performance required for a particular use case. The physical layer (PHY) profiles are subsets of all configurations that a corresponding receiver should implement.

The three PHY profiles share most of the functional blocks but differ slightly in specific blocks and/or parameters. Additional PHY profiles can be defined in the future. For the system evolution, future profiles can also be multiplexed with the existing profiles in a single RF channel through a future extension frame (FEF). The details of each PHY profile are described below.

1. Base Profile

The base profile represents a main use case for fixed receiving devices that are usually connected to a roof-top antenna. The base profile also includes portable devices that could be transported to a place but belong to a relatively stationary reception category. Use of the base profile could be extended to handheld devices or even vehicular by some improved implementations, but those use cases are not expected for the base profile receiver operation.

Target SNR range of reception is from approximately 10 to 20 dB, which includes the 15 dB SNR reception capability of the existing broadcast system (e.g. ATSC A/53). The receiver complexity and power consumption is not as critical as in the battery-operated handheld devices, which will use the handheld profile. Key system parameters for the base profile are listed in below table 1.

TABLE 1

| | |
|---|---|
| LDPC codeword length | 16K, 64K bits |
| Constellation size | 4~10 bpcu (bits per channel use) |
| Time de-inter leaving memory size | ≤$2^{19}$ data cells |
| Pilot patterns | Pilot pattern for fixed reception |
| FFT size | 16K, 32K points |

2. Handheld Profile

The handheld profile is designed for use in handheld and vehicular devices that operate with battery power. The devices can be moving with pedestrian or vehicle speed. The power consumption as well as the receiver complexity is very important for the implementation of the devices of the handheld profile. The target SNR range of the handheld profile is approximately 0 to 10 dB, but can be configured to reach below 0 dB when intended for deeper indoor reception.

In addition to low SNR capability, resilience to the Doppler Effect caused by receiver mobility is the most important performance attribute of the handheld profile. Key system parameters for the handheld profile are listed in the below table 2.

TABLE 2

| | |
|---|---|
| LDPC codeword length | 16K bits |
| Constellation size | 2~8 bpcu |
| Time de-inter leaving memory size | ≤$2^{18}$ data cells |
| Pilot patterns | Pilot patterns for mobile and indoor reception |
| FFT size | 8K, 16K points |

3. Advanced Profile

The advanced profile provides highest channel capacity at the cost of more implementation complexity. This profile requires using MIMO transmission and reception, and UHDTV service is a target use case for which this profile is specifically designed. The increased capacity can also be used to allow an increased number of services in a given bandwidth, e.g., multiple SDTV or HDTV services.

The target SNR range of the advanced profile is approximately 20 to 30 dB. MIMO transmission may initially use existing elliptically-polarized transmission equipment, with extension to full-power cross-polarized transmission in the future. Key system parameters for the advanced profile are listed in below table 3.

TABLE 3

| | |
|---|---|
| LDPC codeword length | 16K, 64K bits |
| Constellation size | 8~12 bpcu |
| Time de-inter leaving memory size | ≤$2^{18}$ data cells |
| Pilot patterns | Pilot pattern for fixed reception |
| FFT size | 16K, 32K points |

In this case, the base profile can be used as a profile for both the terrestrial broadcast service and the mobile broadcast service. That is, the base profile can be used to define a concept of a profile which includes the mobile profile. Also, the advanced profile can be divided advanced profile for a base profile with MIMO and advanced profile for a handheld profile with MIMO. Moreover, the three profiles can be changed according to intention of the designer.

The following terms and definitions may apply to the present invention. The following terms and definitions can be changed according to design.

auxiliary stream: sequence of cells carrying data of as yet undefined modulation and coding, which may be used for future extensions or as required by broadcasters or network operators base data pipe: data pipe that carries service signaling data baseband frame (or BBFRAME): set of Kbch bits which form the input to one FEC encoding process (BCH and LDPC encoding)

cell: modulation value that is carried by one carrier of the OFDM transmission coded block: LDPC-encoded block of PLS1 data or one of the LDPC-encoded blocks of PLS2 data data pipe: logical channel in the physical layer that carries service data or related metadata, which may carry one or multiple service(s) or service component(s).

data pipe unit: a basic unit for allocating data cells to a DP in a frame.

data symbol: OFDM symbol in a frame which is not a preamble symbol (the frame signaling symbol and frame edge symbol is included in the data symbol)

DP_ID: this 8-bit field identifies uniquely a DP within the system identified by the SYSTEM_ID dummy cell: cell carrying a pseudo-random value used to fill the remaining capacity not used for PLS signaling, DPs or auxiliary streams emergency alert channel: part of a frame that carries EAS information data frame: physical layer time slot that starts with a preamble and ends with a frame edge symbol frame repetition unit: a set of frames belonging to same or different physical layer profile including a FEF, which is repeated eight times in a super-frame fast information channel: a logical channel in a frame that carries the mapping information between a service and the corresponding base DP FECBLOCK: set of LDPC-encoded bits of a DP data FFT size: nominal FFT size used for a particular mode, equal to the active symbol period Ts expressed in cycles of the elementary period T frame signaling symbol: OFDM symbol with higher pilot density used at the start of a frame in certain combinations of FFT size, guard interval and scattered pilot pattern, which carries a part of the PLS data frame edge symbol: OFDM symbol with higher pilot density used at the end of a frame in certain combinations of FFT size, guard interval and scattered pilot pattern frame-group: the set of all the frames having the same PHY profile type in a super-frame.

future extension frame: physical layer time slot within the super-frame that could be used for future extension, which starts with a preamble Futurecast UTB system: proposed physical layer broadcasting system, of which the input is one or more MPEG2-TS or IP or general stream(s) and of which the output is an RF signal input stream: A stream of data for an ensemble of services delivered to the end users by the system.

normal data symbol: data symbol excluding the frame signaling symbol and the frame edge symbol PHY profile: subset of all configurations that a corresponding receiver should implement PLS: physical layer signaling data consisting of PLS1 and PLS2

PLS1: a first set of PLS data carried in the FSS symbols having a fixed size, coding and modulation, which carries basic information about the system as well as the parameters needed to decode the PLS2

NOTE: PLS1 data remains constant for the duration of a frame-group.

PLS2: a second set of PLS data transmitted in the FSS symbol, which carries more detailed PLS data about the system and the DPs PLS2 dynamic data: PLS2 data that may dynamically change frame-by-frame PLS2 static data: PLS2 data that remains static for the duration of a frame-group preamble signaling data: signaling data carried by the preamble symbol and used to identify the basic mode of the system preamble symbol: fixed-length pilot symbol that carries basic PLS data and is located in the beginning of a frame NOTE: The preamble symbol is mainly used for fast initial band scan to detect the system signal, its timing, frequency offset, and FFT-size.

reserved for future use: not defined by the present document but may be defined in future super-frame: set of eight frame repetition units time interleaving block (TI block): set of cells within which time interleaving is carried out, corresponding to one use of the time interleaver memory TI group: unit over which dynamic capacity allocation for a particular DP is carried out, made up of an integer, dynamically varying number of XFECBLOCKs NOTE: The TI group may be mapped directly to one frame or may be mapped to multiple frames. It may contain one or more TI blocks.

Type 1 DP: DP of a frame where all DPs are mapped into the frame in TDM fashion

Type 2 DP: DP of a frame where all DPs are mapped into the frame in FDM fashion

XFECBLOCK: set of Ncells cells carrying all the bits of one LDPC FECBLOCK

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame structure block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is a logical channel in the physical layer that carries service data or related metadata, which may carry one or multiple service(s) or service component(s).

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

FIGS. 2, 3 and 4 illustrate the input formatting block 1000 according to embodiments of the present invention. A description will be given of each figure.

FIG. 2 illustrates an input formatting block according to one embodiment of the present invention. FIG. 2 shows an input formatting module when the input signal is a single input stream.

The input formatting block illustrated in FIG. 2 corresponds to an embodiment of the input formatting block 1000 described with reference to FIG. 1.

The input to the physical layer may be composed of one or multiple data streams. Each data stream is carried by one DP. The mode adaptation modules slice the incoming data stream into data fields of the baseband frame (BBF). The system supports three types of input data streams: MPEG2-TS, Internet protocol (IP) and Generic stream (GS). MPEG2-TS is characterized by fixed length (188 byte) packets with the first byte being a sync-byte (0x47). An IP stream is composed of variable length IP datagram packets, as signaled within IP packet headers. The system supports both IPv4 and IPv6 for the IP stream. GS may be composed of variable length packets or constant length packets, signaled within encapsulation packet headers.

(a) shows a mode adaptation block 2000 and a stream adaptation 2010 for signal DP and (b) shows a PLS generation block 2020 and a PLS scrambler 2030 for generating and processing PLS data. A description will be given of the operation of each block.

The Input Stream Splitter splits the input TS, IP, GS streams into multiple service or service component (audio, video, etc.) streams. The mode adaptation module 2010 is comprised of a CRC Encoder, BB (baseband) Frame Slicer, and BB Frame Header Insertion block.

The CRC Encoder provides three kinds of CRC encoding for error detection at the user packet (UP) level, i.e., CRC-8, CRC-16, and CRC-32. The computed CRC bytes are appended after the UP. CRC-8 is used for TS stream and CRC-32 for IP stream. If the GS stream doesn't provide the CRC encoding, the proposed CRC encoding should be applied.

BB Frame Slicer maps the input into an internal logical-bit format. The first received bit is defined to be the MSB. The BB Frame Slicer allocates a number of input bits equal to the available data field capacity. To allocate a number of input bits equal to the BBF payload, the UP packet stream is sliced to fit the data field of BBF.

BB Frame Header Insertion block can insert fixed length BBF header of 2 bytes is inserted in front of the BB Frame. The BBF header is composed of STUFFI (1 bit), SYNOD (13 bits), and RFU (2 bits). In addition to the fixed 2-Byte BBF header, BBF can have an extension field (1 or 3 bytes) at the end of the 2-byte BBF header.

The stream adaptation 2010 is comprised of stuffing insertion block and BB scrambler.

The stuffing insertion block can insert stuffing field into a payload of a BB frame. If the input data to the stream adaptation is sufficient to fill a BB-Frame, STUFFI is set to '0' and the BBF has no stuffing field. Otherwise STUFFI is set to '1' and the stuffing field is inserted immediately after the BBF header. The stuffing field comprises two bytes of the stuffing field header and a variable size of stuffing data.

The BB scrambler scrambles complete BBF for energy dispersal. The scrambling sequence is synchronous with the BBF. The scrambling sequence is generated by the feedback shift register.

The PLS generation block 2020 can generate physical layer signaling (PLS) data. The PLS provides the receiver with a means to access physical layer DPs. The PLS data consists of PLS1 data and PLS2 data.

The PLS1 data is a first set of PLS data carried in the FSS symbols in the frame having a fixed size, coding and modulation, which carries basic information about the system as well as the parameters needed to decode the PLS2 data. The PLS1 data provides basic transmission parameters including parameters required to enable the reception and decoding of the PLS2 data. Also, the PLS1 data remains constant for the duration of a frame-group.

The PLS2 data is a second set of PLS data transmitted in the FSS symbol, which carries more detailed PLS data about the system and the DPs. The PLS2 contains parameters that provide sufficient information for the receiver to decode the desired DP. The PLS2 signaling further consists of two types of parameters, PLS2 Static data (PLS2-STAT data) and PLS2 dynamic data (PLS2-DYN data). The PLS2 Static data is PLS2 data that remains static for the duration of a frame-group and the PLS2 dynamic data is PLS2 data that may dynamically change frame-by-frame.

Details of the PLS data will be described later.

The PLS scrambler 2030 can scramble the generated PLS data for energy dispersal.

The above-described blocks may be omitted or replaced by blocks having similar or identical functions.

FIG. 3 illustrates an input formatting block according to another embodiment of the present invention.

The input formatting block illustrated in FIG. 3 corresponds to an embodiment of the input formatting block 1000 described with reference to FIG. 1.

FIG. 3 shows a mode adaptation block of the input formatting block when the input signal corresponds to multiple input streams.

The mode adaptation block of the input formatting block for processing the multiple input streams can independently process the multiple input streams.

Referring to FIG. 3, the mode adaptation block for respectively processing the multiple input streams can include an input stream splitter 3000, an input stream synchronizer 3010, a compensating delay block 3020, a null packet deletion block 3030, a head compression block 3040, a CRC encoder 3050, a BB frame slicer 3060 and a BB header insertion block 3070. Description will be given of each block of the mode adaptation block.

Operations of the CRC encoder 3050, BB frame slicer 3060 and BB header insertion block 3070 correspond to those of the CRC encoder, BB frame slicer and BB header insertion block described with reference to FIG. 2 and thus description thereof is omitted.

The input stream splitter 3000 can split the input TS, IP, GS streams into multiple service or service component (audio, video, etc.) streams.

The input stream synchronizer 3010 may be referred as ISSY. The ISSY can provide suitable means to guarantee Constant Bit Rate (CBR) and constant end-to-end transmission delay for any input data format. The ISSY is always used for the case of multiple DPs carrying TS, and optionally used for multiple DPs carrying GS streams.

The compensating delay block 3020 can delay the split TS packet stream following the insertion of ISSY information to allow a TS packet recombining mechanism without requiring additional memory in the receiver.

The null packet deletion block 3030, is used only for the TS input stream case. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, removed null-packets can be re-inserted in the exact place where they were originally by reference to a deleted null-packet (DNP) counter that is inserted in the transmission, thus guaranteeing constant bit-rate and avoiding the need for time-stamp (PCR) updating.

The head compression block 3040 can provide packet header compression to increase transmission efficiency for TS or IP input streams. Because the receiver can have a priori information on certain parts of the header, this known information can be deleted in the transmitter.

For Transport Stream, the receiver has a-priori information about the sync-byte configuration (0x47) and the packet length (188 Byte). If the input TS stream carries content that has only one PID, i.e., for only one service component (video, audio, etc.) or service sub-component (SVC base layer, SVC enhancement layer, MVC base view or MVC dependent views), TS packet header compression can be applied (optionally) to the Transport Stream. IP packet header compression is used optionally if the input steam is an IP stream.

The above-described blocks may be omitted or replaced by blocks having similar or identical functions.

FIG. 4 illustrates an input formatting block according to another embodiment of the present invention.

The input formatting block illustrated in FIG. 4 corresponds to an embodiment of the input formatting block 1000 described with reference to FIG. 1.

FIG. 4 illustrates a stream adaptation block of the input formatting module when the input signal corresponds to multiple input streams.

Referring to FIG. 4, the mode adaptation block for respectively processing the multiple input streams can include a scheduler 4000, an 1-Frame delay block 4010, a stuffing insertion block 4020, an in-band signaling 4030, a BB Frame scrambler 4040, a PLS generation block 4050 and a PLS scrambler 4060. Description will be given of each block of the stream adaptation block.

Operations of the stuffing insertion block 4020, the BB Frame scrambler 4040, the PLS generation block 4050 and the PLS scrambler 4060 correspond to those of the stuffing insertion block, BB scrambler, PLS generation block and the PLS scrambler described with reference to FIG. 2 and thus description thereof is omitted.

The scheduler 4000 can determine the overall cell allocation across the entire frame from the amount of FEC-BLOCKs of each DP. Including the allocation for PLS, EAC and FIC, the scheduler generate the values of PLS2-DYN data, which is transmitted as in-band signaling or PLS cell in FSS of the frame. Details of FECBLOCK, EAC and FIC will be described later.

The 1-Frame delay block 4010 can delay the input data by one transmission frame such that scheduling information about the next frame can be transmitted through the current frame for in-band signaling information to be inserted into the DPs.

The in-band signaling 4030 can insert un-delayed part of the PLS2 data into a DP of a frame.

The above-described blocks may be omitted or replaced by blocks having similar or identical functions.

FIG. 5 illustrates a BICM block according to an embodiment of the present invention.

The BICM block illustrated in FIG. 5 corresponds to an embodiment of the BICM block 1010 described with reference to FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPs input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

(a) shows the BICM block shared by the base profile and the handheld profile and (b) shows the BICM block of the advanced profile.

The BICM block shared by the base profile and the handheld profile and the BICM block of the advanced profile can include plural processing blocks for processing each DP.

A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, el. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in PLS2 data.

The SSD encoding block 5040 can precode cells in two (2D), three (3D), and four (4D) dimensions to increase the reception robustness under difficult fading conditions.

The time interleaver 5050 can operates at the DP level. The parameters of time interleaving (TI) may be set differently for each DP. Details of operations of the time interleaver 5050 will be described later.

A processing block 5000-1 of the BICM block for the advanced profile can include the Data FEC encoder, bit interleaver, constellation mapper, and time interleaver. However, the processing block 5000-1 is distinguished from the processing block 5000 further includes a cell-word demultiplexer 5010-1 and a MIMO encoding block 5020-1.

Also, the operations of the Data FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 can processing the output of the cell-word demultiplexer 5010-1 using MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

MIMO encoding is intended for a 2×2 MIMO system requiring at least two antennas at both the transmitter and the receiver. Two MIMO encoding modes are defined in this proposal; full-rate spatial multiplexing (FR-SM) and full-rate full-diversity spatial multiplexing (FRFD-SM). The FR-SM encoding provides capacity increase with relatively small complexity increase at the receiver side while the FRFD-SM encoding provides capacity increase and additional diversity gain with a great complexity increase at the receiver side. The proposed MIMO encoding scheme has no restriction on the antenna polarity configuration.

MIMO processing is required for the advanced profile frame, which means all DPs in the advanced profile frame are processed by the MIMO encoder. MIMO processing is applied at DP level. Pairs of the Constellation Mapper outputs NUQ (e1,i and e2,i) are fed to the input of the MIMO Encoder. Paired MIMO Encoder output (g1,i and g2,i) is transmitted by the same carrier k and OFDM symbol 1 of their respective TX antennas.

The above-described blocks may be omitted or replaced by blocks having similar or identical functions.

FIG. 6 illustrates a BICM block according to another embodiment of the present invention.

The BICM block illustrated in FIG. 6 corresponds to an embodiment of the BICM block 1010 described with reference to FIG. 1.

FIG. 6 illustrates a BICM block for protection of physical layer signaling (PLS), emergency alert channel (EAC) and fast information channel (FIC). EAC is a part of a frame that carries EAS information data and FIC is a logical channel in a frame that carries the mapping information between a service and the corresponding base DP. Details of the EAC and FIC will be described later.

Referring to FIG. 6, the BICM block for protection of PLS, EAC and FIC can include a PLS FEC encoder 6000, a bit interleaver 6010 and a constellation mapper 6020.

Also, the PLS FEC encoder 6000 can include a scrambler, BCH encoding/zero insertion block, LDPC encoding block and LDPC parity punturing block. Description will be given of each block of the BICM block.

The PLS FEC encoder 6000 can encode the scrambled PLS 1/2 data, EAC and FIC section.

The scrambler can scramble PLS1 data and PLS2 data before BCH encoding and shortened and punctured LDPC encoding.

The BCH encoding/zero insertion block can perform outer encoding on the scrambled PLS 1/2 data using the shortened BCH code for PLS protection and insert zero bits after the BCH encoding. For PLS1 data only, the output bits of the zero insertion may be permutted before LDPC encoding.

The LDPC encoding block can encode the output of the BCH encoding/zero insertion block using LDPC code. To generate a complete coded block, Cldpc, parity bits, Pldpc are encoded systematically from each zero-inserted PLS information block, Ildpc and appended after it.

$$C_{ldpc}=[I_{ldpc}P_{ldpc}]=[i_0,i_1,\ldots,i_{K_{ldpc}-1},p_0,p_1,\ldots,p_{N_{ldpc}-K_{ldpc}-1}]$$ [Math figure 1]

The LDPC code parameters for PLS1 and PLS2 are as following table 4.

TABLE 4

| Signaling Type | $K_{sig}$ | $K_{bch}$ | $N_{bch\_parity}$ | $K_{ldpc}$ ($=N_{bch}$) | $N_{ldpc}$ | $N_{ldpc\_parity}$ | code rate | $Q_{ldpc}$ |
|---|---|---|---|---|---|---|---|---|
| PLS1 | 342 | 1020 | 60 | 1080 | 4320 | 3240 | 1/4 | 36 |
| PLS2 | <1021 | | | | | | | |
| | >1020 | 2100 | | 2160 | 7200 | 5040 | 3/10 | 56 |

The LDPC parity puncturing block can perform puncturing on the PLS1 data and PLS 2 data.

When shortening is applied to the PLS1 data protection, some LDPC parity bits are punctured after LDPC encoding. Also, for the PLS2 data protection, the LDPC parity bits of PLS2 are punctured after LDPC encoding. These punctured bits are not transmitted.

The bit interleaver 6010 can interleave the each shortened and punctured PLS1 data and PLS2 data.

The constellation mapper 6020 can map the bit interleaved PLS1 data and PLS2 data onto constellations.

The above-described blocks may be omitted or replaced by blocks having similar or identical functions.

FIG. 7 illustrates a frame building block according to one embodiment of the present invention.

The frame building block illustrated in FIG. 7 corresponds to an embodiment of the frame building block 1020 described with reference to FIG. 1.

Referring to FIG. 7, the frame building block can include a delay compensation block 7000, a cell mapper 7010 and a frequency interleaver 7020. Description will be given of each block of the frame building block.

The delay compensation block 7000 can adjust the timing between the data pipes and the corresponding PLS data to ensure that they are co-timed at the transmitter end. The PLS data is delayed by the same amount as data pipes are by addressing the delays of data pipes caused by the Input Formatting block and BICM block. The delay of the BICM block is mainly due to the time interleaver 5050. In-band signaling data carries information of the next TI group so that they are carried one frame ahead of the DPs to be signaled. The Delay Compensating block delays in-band signaling data accordingly.

The cell mapper 7010 can map PLS, EAC, FIC, DPs, auxiliary streams and dummy cells into the active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. Service signaling data (such as PSI (program specific information)/SI) can be separately gathered and sent by a data pipe. The Cell Mapper operates according to the dynamic information produced by the scheduler and the configuration of the frame structure. Details of the frame will be described later.

The frequency interleaver 7020 can randomly interleave data cells received from the cell mapper 7010 to provide frequency diversity. Also, the frequency interleaver 7020 can operate on very OFDM symbol pair comprised of two sequential OFDM symbols using a different interleaving-seed order to get maximum interleaving gain in a single frame.

The above-described blocks may be omitted or replaced by blocks having similar or identical functions.

FIG. 8 illustrates an OFMD generation block according to an embodiment of the present invention.

The OFMD generation block illustrated in FIG. 8 corresponds to an embodiment of the OFMD generation block 1030 described with reference to FIG. 1.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Referring to FIG. 8, the frame building block can include a pilot and reserved tone insertion block 8000, a 2D-eSFN encoding block 8010, an IFFT (Inverse Fast Fourier Transform) block 8020, a PAPR reduction block 8030, a guard interval insertion block 8040, a preamble insertion block 8050, other system insertion block 8060 and a DAC block 8070. Description will be given of each block of the frame building block.

The pilot and reserved tone insertion block 8000 can insert pilots and the reserved tone.

Various cells within the OFDM symbol are modulated with reference information, known as pilots, which have transmitted values known a priori in the receiver. The information of pilot cells is made up of scattered pilots, continual pilots, edge pilots, FSS (frame signaling symbol) pilots and FES (frame edge symbol) pilots. Each pilot is transmitted at a particular boosted power level according to pilot type and pilot pattern. The value of the pilot information is derived from a reference sequence, which is a series of values, one for each transmitted carrier on any given symbol. The pilots can be used for frame synchronization, frequency synchronization, time synchronization, channel estimation, and transmission mode identification, and also can be used to follow the phase noise.

Reference information, taken from the reference sequence, is transmitted in scattered pilot cells in every symbol except the preamble, FSS and FES of the frame. Continual pilots are inserted in every symbol of the frame. The number and location of continual pilots depends on both the FFT size and the scattered pilot pattern. The edge carriers are edge pilots in every symbol except for the preamble symbol. They are inserted in order to allow frequency interpolation up to the edge of the spectrum. FSS pilots are inserted in FSS(s) and FES pilots are inserted in FES. They are inserted in order to allow time interpolation up to the edge of the frame.

The system according to an embodiment of the present invention supports the SFN network, where distributed MISO scheme is optionally used to support very robust transmission mode. The 2D-eSFN is a distributed MISO scheme that uses multiple TX antennas, each of which is located in the different transmitter site in the SFN network.

The 2D-eSFN encoding block 8010 can process a 2D-eSFN processing to distorts the phase of the signals transmitted from multiple transmitters, in order to create both time and frequency diversity in the SFN configuration.

Hence, burst errors due to low flat fading or deep-fading for a long time can be mitigated.

The IFFT block 8020 can modulate the output from the 2D-eSFN encoding block 8010 using OFDM modulation scheme. Any cell in the data symbols which has not been designated as a pilot (or as a reserved tone) carries one of the data cells from the frequency interleaver. The cells are mapped to OFDM carriers.

The PAPR reduction block 8030 can perform a PAPR reduction on input signal using various PAPR reduction algorithm in the time domain.

The guard interval insertion block 8040 can insert guard intervals and the preamble insertion block 8050 can insert preamble in front of the signal. Details of a structure of the preamble will be described later. The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc. Data related to respective broadcast services can be transmitted through different frames.

The DAC block 8070 can convert an input digital signal into an analog signal and output the analog signal. The signal output from the DAC block 7800 can be transmitted through multiple output antennas according to the physical layer profiles. A Tx antenna according to an embodiment of the present invention can have vertical or horizontal polarity.

The above-described blocks may be omitted or replaced by blocks having similar or identical functions according to design.

FIG. 9 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1.

The apparatus for receiving broadcast signals for future broadcast services according to an embodiment of the present invention can include a synchronization & demodulation module 9000, a frame parsing module 9010, a demapping & decoding module 9020, an output processor 9030 and a signaling decoding module 9040. A description will be given of operation of each module of the apparatus for receiving broadcast signals.

The synchronization & demodulation module 9000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 9100 can parse input signal frames and extract data through which a service selected by a user is transmitted. If the apparatus for transmitting broadcast signals performs interleaving, the frame parsing module 9100 can carry out deinterleaving corresponding to a reverse procedure of interleaving. In this case, the positions of a signal and data that need to be extracted can be obtained by decoding data output from the signaling decoding module 9400 to restore scheduling information generated by the apparatus for transmitting broadcast signals.

The demapping & decoding module 9200 can convert the input signals into bit domain data and then deinterleave the same as necessary. The demapping & decoding module 9200 can perform demapping for mapping applied for transmission efficiency and correct an error generated on a transmission channel through decoding. In this case, the demapping & decoding module 9200 can obtain transmission parameters necessary for demapping and decoding by decoding the data output from the signaling decoding module 9400.

The output processor 9300 can perform reverse procedures of various compression/signal processing procedures which are applied by the apparatus for transmitting broadcast signals to improve transmission efficiency. In this case, the output processor 9300 can acquire necessary control information from data output from the signaling decoding module 9400. The output of the output processor 8300 corresponds to a signal input to the apparatus for transmitting broadcast signals and may be MPEG-TSs, IP streams (v4 or v6) and generic streams.

The signaling decoding module 9400 can obtain PLS information from the signal demodulated by the synchronization & demodulation module 9000. As described above, the frame parsing module 9100, demapping & decoding module 9200 and output processor 9300 can execute functions thereof using the data output from the signaling decoding module 9400.

FIG. 10 illustrates a frame structure according to an embodiment of the present invention.

FIG. 10 shows an example configuration of the frame types and FRUs in a super-frame. (a) shows a super frame according to an embodiment of the present invention, (b) shows FRU (Frame Repetition Unit) according to an embodiment of the present invention, (c) shows frames of variable PHY profiles in the FRU and (d) shows a structure of a frame.

A super-frame may be composed of eight FRUs. The FRU is a basic multiplexing unit for TDM of the frames, and is repeated eight times in a super-frame.

Each frame in the FRU belongs to one of the PHY profiles, (base, handheld, advanced) or FEF. The maximum allowed number of the frames in the FRU is four and a given PHY profile can appear any number of times from zero times to four times in the FRU (e.g., base, base, handheld, advanced). PHY profile definitions can be extended using reserved values of the PHY_PROFILE in the preamble, if required.

The FEF part is inserted at the end of the FRU, if included. When the FEF is included in the FRU, the minimum number of FEFs is 8 in a super-frame. It is not recommended that FEF parts be adjacent to each other.

One frame is further divided into a number of OFDM symbols and a preamble. As shown in (d), the frame comprises a preamble, one or more frame signaling symbols (FSS), normal data symbols and a frame edge symbol (FES).

The preamble is a special symbol that enables fast Futurecast UTB system signal detection and provides a set of basic transmission parameters for efficient transmission and reception of the signal. The detailed description of the preamble will be will be described later.

The main purpose of the FSS(s) is to carry the PLS data. For fast synchronization and channel estimation, and hence fast decoding of PLS data, the FSS has more dense pilot pattern than the normal data symbol. The FES has exactly the same pilots as the FSS, which enables frequency-only interpolation within the FES and temporal interpolation, without extrapolation, for symbols immediately preceding the FES.

FIG. 11 illustrates a signaling hierarchy structure of the frame according to an embodiment of the present invention.

FIG. 11 illustrates the signaling hierarchy structure, which is split into three main parts: the preamble signaling data 11000, the PLS1 data 11010 and the PLS2 data 11020. The purpose of the preamble, which is carried by the preamble symbol in every frame, is to indicate the transmission type and basic transmission parameters of that frame. The PLS1 enables the receiver to access and decode the PLS2 data, which contains the parameters to access the DP of interest. The PLS2 is carried in every frame and split into two main parts: PLS2-STAT data and PLS2-DYN data. The static and dynamic portion of PLS2 data is followed by padding, if necessary.

FIG. 12 illustrates preamble signaling data according to an embodiment of the present invention.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in below table 5.

TABLE 5

| Value | PHY Profile |
|---|---|
| 000 | Base profile |
| 001 | Handheld profile |
| 010 | Advanced profiled |
| 011~110 | Reserved |
| 111 | FEF |

FFT_SIZE: This 2 bit field indicates the FFT size of the current frame within a frame-group, as described in below table 6.

TABLE 6

| Value | FFT size |
|---|---|
| 00 | 8K FFT |
| 01 | 16K FFT |
| 10 | 32K FFT |
| 11 | Reserved |

GI_FRACTION: This 3 bit field indicates the guard interval fraction value in the current super-frame, as described in below table 7.

TABLE 7

| Value | GI_FRACTION |
|---|---|
| 000 | 1/5 |
| 001 | 1/10 |
| 010 | 1/20 |
| 011 | 1/40 |
| 100 | 1/80 |
| 101 | 1/160 |
| 110~111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field can be switched dynamically within a super-frame.

PILOT_MODE: This 1-bit field indicates whether the pilot mode is mobile mode or fixed mode for the current frame in the current frame-group. If this field is set to '0', mobile pilot mode is used. If the field is set to '1', the fixed pilot mode is used.

PAPR_FLAG: This 1-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in below table 8.

TABLE 8

| | Current PHY_PROFILE = '000' (base) | Current PHY_PROFILE = '001' (handheld) | Current PHY_PROFILE = '010' (advanced) | Current PHY_PROFILE = '111' (FEF) |
|---|---|---|---|---|
| FRU_CONFIGURE = 000 | Only base profile present | Only handheld profile present | Only advanced profile present | Only FEF present |
| FRU_CONFIGURE = 1XX | Handheld profile present | Base profile present | Base profile present | Base profile present |
| FRU_CONFIGURE = X1X | Advanced profile present | Advanced profile present | Handheld profile present | Handheld profile present |
| FRU_CONFIGURE = XX1 | FEF present | FEF present | FEF present | Advanced profile present |

RESERVED: This 7-bit field is reserved for future use.

FIG. 13 illustrates PLS1 data according to an embodiment of the present invention.

PLS1 data provides basic transmission parameters including parameters required to enable the reception and decoding of the PLS2. As above mentioned, the PLS1 data remain unchanged for the entire duration of one frame-group. The detailed definition of the signaling fields of the PLS1 data are as follows:

PREAMBLE_DATA: This 20-bit field is a copy of the preamble signaling data excluding the EAC_FLAG.

NUM_FRAME_FRU: This 2-bit field indicates the number of the frames per FRU.

PAYLOAD_TYPE: This 3-bit field indicates the format of the payload data carried in the frame-group. PAYLOAD_TYPE is signaled as shown in table 9.

TABLE 9

| value | Payload type |
|---|---|
| 1XX | TS stream is transmitted |
| X1X | IP stream is transmitted |
| XX1 | GS stream is transmitted |

NUM_FSS: This 2-bit field indicates the number of FSS symbols in the current frame.

SYSTEM_VERSION: This 8-bit field indicates the version of the transmitted signal format. The SYSTEM_VERSION is divided into two 4-bit fields, which are a major version and a minor version.

Major version: The MSB four bits of SYSTEM_VERSION field indicate major version information. A change in the major version field indicates a non-backward-compatible change. The default value is '0000'. For the version described in this standard, the value is set to '0000'.

Minor version: The LSB four bits of SYSTEM_VERSION field indicate minor version information. A change in the minor version field is backward-compatible.

CELL_ID: This is a 16-bit field which uniquely identifies a geographic cell in an ATSC network. An ATSC cell coverage area may consist of one or more frequencies, depending on the number of frequencies used per Futurecast UTB system. If the value of the CELL_ID is not known or unspecified, this field is set to '0'.

NETWORK_ID: This is a 16-bit field which uniquely identifies the current ATSC network.

SYSTEM_ID: This 16-bit field uniquely identifies the Futurecast UTB system within the ATSC network. The Futurecast UTB system is the terrestrial broadcast system whose input is one or more input streams (TS, IP, GS) and whose output is an RF signal. The Futurecast UTB system carries one or more PHY profiles and FEF, if any. The same Futurecast UTB system may carry different input streams and use different RF frequencies in different geographical areas, allowing local service insertion. The frame structure and scheduling is controlled in one place and is identical for all transmissions within a Futurecast UTB system. One or more Futurecast UTB systems may have the same SYSTEM_ID meaning that they all have the same physical layer structure and configuration.

The following loop consists of FRU_PHY_PROFILE, FRU_FRAME_LENGTH, FRU_GI_FRACTION, and RESERVED which are used to indicate the FRU configuration and the length of each frame type. The loop size is fixed so that four PHY profiles (including a FEF) are signaled within the FRU. If NUM_FRAME_FRU is less than 4, the unused fields are filled with zeros.

FRU_PHY_PROFILE: This 3-bit field indicates the PHY profile type of the (i+1)th (i is the loop index) frame of the associated FRU. This field uses the same signaling format as shown in the table 8.

FRU_FRAME_LENGTH: This 2-bit field indicates the length of the (i+1)th frame of the associated FRU. Using FRU_FRAME_LENGTH together with FRU_GI_FRACTION, the exact value of the frame duration can be obtained.

FRU_GI_FRACTION: This 3-bit field indicates the guard interval fraction value of the (i+1)th frame of the associated FRU. FRU_GI_FRACTION is signaled according to the table 7.

RESERVED: This 4-bit field is reserved for future use.

The following fields provide parameters for decoding the PLS2 data.

PLS2_FEC_TYPE: This 2-bit field indicates the FEC type used by the PLS2 protection. The FEC type is signaled according to table 10. The details of the LDPC codes will be described later.

TABLE 10

| Content | PLS2 FEC type |
|---|---|
| 00 | 4K-1/4 and 7K-3/10 LDPC codes |
| 01~11 | Reserved |

PLS2_MOD: This 3-bit field indicates the modulation type used by the PLS2. The modulation type is signaled according to table 11.

TABLE 11

| Value | PLS2_MODE |
|---|---|
| 000 | BPSK |
| 001 | QPSK |
| 010 | QAM-16 |
| 011 | NUQ-64 |
| 100~111 | Reserved |

PLS2_SIZE_CELL: This 15-bit field indicates Ctotal_partial_block, the size (specified as the number of QAM cells) of the collection of full coded blocks for PLS2 that is carried in the current frame-group. This value is constant during the entire duration of the current frame-group.

PLS2_STAT_SIZE_BIT: This 14-bit field indicates the size, in bits, of the PLS2-STAT for the current frame-group. This value is constant during the entire duration of the current frame-group.

PLS2_DYN_SIZE_BIT: This 14-bit field indicates the size, in bits, of the PLS2-DYN for the current frame-group. This value is constant during the entire duration of the current frame-group.

PLS2_REP_FLAG: This 1-bit flag indicates whether the PLS2 repetition mode is used in the current frame-group. When this field is set to value '1', the PLS2 repetition mode is activated. When this field is set to value '0', the PLS2 repetition mode is deactivated.

PLS2_REP_SIZE_CELL: This 15-bit field indicates Ctotal_partial_block, the size (specified as the number of QAM cells) of the collection of partial coded blocks for PLS2 carried in every frame of the current frame-group, when PLS2 repetition is used. If repetition is not used, the value of this field is equal to 0. This value is constant during the entire duration of the current frame-group.

PLS2_NEXT_FEC_TYPE: This 2-bit field indicates the FEC type used for PLS2 that is carried in every frame of the next frame-group. The FEC type is signaled according to the table 10.

PLS2_NEXT_MOD: This 3-bit field indicates the modulation type used for PLS2 that is carried in every frame of the next frame-group. The modulation type is signaled according to the table 11.

PLS2_NEXT_REP_FLAG: This 1-bit flag indicates whether the PLS2 repetition mode is used in the next frame-group. When this field is set to value '1', the PLS2 repetition mode is activated. When this field is set to value '0', the PLS2 repetition mode is deactivated.

PLS2_NEXT_REP_SIZE_CELL: This 15-bit field indicates Ctotal_full_block, The size (specified as the number of QAM cells) of the collection of full coded blocks for PLS2 that is carried in every frame of the next frame-group, when PLS2 repetition is used. If repetition is not used in the next frame-group, the value of this field is equal to 0. This value is constant during the entire duration of the current frame-group.

PLS2_NEXT_REP_STAT_SIZE_BIT: This 14-bit field indicates the size, in bits, of the PLS2-STAT for the next frame-group. This value is constant in the current frame-group.

PLS2_NEXT_REP_DYN_SIZE_BIT: This 14-bit field indicates the size, in bits, of the PLS2-DYN for the next frame-group. This value is constant in the current frame-group.

PLS2_AP_MODE: This 2-bit field indicates whether additional parity is provided for PLS2 in the current frame-group. This value is constant during the entire duration of the current frame-group. The below table 12 gives the values of this field. When this field is set to '00', additional parity is not used for the PLS2 in the current frame-group.

TABLE 12

| Value | PLS2-AP mode |
| --- | --- |
| 00 | AP is not provided |
| 01 | AP1 mode |
| 10~11 | Reserved |

PLS2_AP_SIZE_CELL: This 15-bit field indicates the size (specified as the number of QAM cells) of the additional parity bits of the PLS2. This value is constant during the entire duration of the current frame-group.

PLS2_NEXT_AP_MODE: This 2-bit field indicates whether additional parity is provided for PLS2 signaling in every frame of next frame-group. This value is constant during the entire duration of the current frame-group. The table 12 defines the values of this field PLS2_NEXT_AP_SIZE_CELL: This 15-bit field indicates the size (specified as the number of QAM cells) of the additional parity bits of the PLS2 in every frame of the next frame-group. This value is constant during the entire duration of the current frame-group.

RESERVED: This 32-bit field is reserved for future use.

CRC_32: A 32-bit error detection code, which is applied to the entire PLS1 signaling.

FIG. 14 illustrates PLS2 data according to an embodiment of the present invention.

FIG. 14 illustrates PLS2-STAT data of the PLS2 data. The PLS2-STAT data are the same within a frame-group, while the PLS2-DYN data provide information that is specific for the current frame.

The details of fields of the PLS2-STAT data are as follows:

FIC_FLAG: This 1-bit field indicates whether the FIC is used in the current frame-group. If this field is set to '1', the FIC is provided in the current frame. If this field set to '0', the FIC is not carried in the current frame. This value is constant during the entire duration of the current frame-group.

AUX_FLAG: This 1-bit field indicates whether the auxiliary stream(s) is used in the current frame-group. If this field is set to '1', the auxiliary stream is provided in the current frame. If this field set to '0', the auxiliary stream is not carried in the current frame. This value is constant during the entire duration of current frame-group.

NUM_DP: This 6-bit field indicates the number of DPs carried within the current frame. The value of this field ranges from 1 to 64, and the number of DPs is NUM_DP+1.

DP_ID: This 6-bit field identifies uniquely a DP within a PHY profile.

DP_TYPE: This 3-bit field indicates the type of the DP. This is signaled according to the below table 13.

TABLE 13

| Value | DP Type |
| --- | --- |
| 000 | DP Type 1 |
| 001 | DP Type 2 |
| 010~111 | reserved |

DP_GROUP_ID: This 8-bit field identifies the DP group with which the current DP is associated. This can be used by a receiver to access the DPs of the service components associated with a particular service, which will have the same DP_GROUP_ID.

BASE_DP_ID: This 6-bit field indicates the DP carrying service signaling data (such as PSI/SI) used in the Management layer. The DP indicated by BASE_DP_ID may be either a normal DP carrying the service signaling data along with the service data or a dedicated DP carrying only the service signaling data DP_FEC_TYPE: This 2-bit field indicates the FEC type used by the associated DP. The FEC type is signaled according to the below table 14.

TABLE 14

| Value | FEC_TYPE |
| --- | --- |
| 00 | 16K LDPC |
| 01 | 64K LDPC |
| 10~11 | Reserved |

DP_COD: This 4-bit field indicates the code rate used by the associated DP. The code rate is signaled according to the below table 15.

TABLE 15

| Value | Code rate |
| --- | --- |
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001~1111 | Reserved |

DP_MOD: This 4-bit field indicates the modulation used by the associated DP. The modulation is signaled according to the below table 16.

TABLE 16

| Value | Modulation |
| --- | --- |
| 0000 | QPSK |
| 0001 | QAM-16 |
| 0010 | NUQ-64 |

TABLE 16-continued

| Value | Modulation |
|---|---|
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001~1111 | reserved |

DP_SSD_FLAG: This 1-bit field indicates whether the SSD mode is used in the associated DP. If this field is set to value '1', SSD is used. If this field is set to value '0', SSD is not used.

The following field appears only if PHY_PROFILE is equal to '010', which indicates the advanced profile:

DP_MIMO: This 3-bit field indicates which type of MIMO encoding process is applied to the associated DP. The type of MIMO encoding process is signaled according to the table 17.

TABLE 17

| Value | MIMO encoding |
|---|---|
| 0000 | FR-SM |
| 0001 | FRFD-SM |
| 010~111 | reserved |

DP_TI_TYPE: This 1-bit field indicates the type of time-interleaving. A value of '0' indicates that one TI group corresponds to one frame and contains one or more TI-blocks. A value of '1' indicates that one TI group is carried in more than one frame and contains only one TI-block.

DP_TI_LENGTH: The use of this 2-bit field (the allowed values are only 1, 2, 4, 8) is determined by the values set within the DP_TI_TYPE field as follows:

If the DP_TI_TYPE is set to the value '1', this field indicates PI, the number of the frames to which each TI group is mapped, and there is one TI-block per TI group (NTI=1). The allowed PI values with 2-bit field are defined in the below table 18.

If the DP_TI_TYPE is set to the value '0', this field indicates the number of TI-blocks NTI per TI group, and there is one TI group per frame (PI=1). The allowed PI values with 2-bit field are defined in the below table 18.

TABLE 18

| 2-bit field | $P_I$ | $N_{TI}$ |
|---|---|---|
| 00 | 1 | 1 |
| 01 | 2 | 2 |
| 10 | 4 | 3 |
| 11 | 8 | 4 |

DP_FRAME_INTERVAL: This 2-bit field indicates the frame interval (IJUMP) within the frame-group for the associated DP and the allowed values are 1, 2, 4, 8 (the corresponding 2-bit field is '00', '01', '10', or '11', respectively). For DPs that do not appear every frame of the frame-group, the value of this field is equal to the interval between successive frames. For example, if a DP appears on the frames 1, 5, 9, 13, etc., this field is set to '4'. For DPs that appear in every frame, this field is set to '1'.

DP_TI_BYPASS: This 1-bit field determines the availability of time interleaver 5050. If time interleaving is not used for a DP, it is set to '1'. Whereas if time interleaving is used it is set to '0'.

DP_FIRST_FRAME_IDX: This 5-bit field indicates the index of the first frame of the super-frame in which the current DP occurs. The value of DP_FIRST_FRAME_IDX ranges from 0 to 31

DP_NUM_BLOCK_MAX: This 10-bit field indicates the maximum value of DP_NUM_BLOCKS for this DP. The value of this field has the same range as DP_NUM_BLOCKS.

DP_PAYLOAD_TYPE: This 2-bit field indicates the type of the payload data carried by the given DP. DP_PAYLOAD_TYPE is signaled according to the below table 19.

TABLE 19

| Value | Payload Type |
|---|---|
| 00 | TS. |
| 01 | IP |
| 10 | GS |
| 11 | reserved |

DP_INBAND_MODE: This 2-bit field indicates whether the current DP carries in-band signaling information. The in-band signaling type is signaled according to the below table 20.

TABLE 20

| Value | In-band mode |
|---|---|
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates the protocol type of the payload carried by the given DP. It is signaled according to the below table 21 when input payload types are selected.

TABLE 21

| Value | If DP_PAYLOAD_TYPE Is TS | If DP_PAYLOAD_TYPE Is IP | If DP_PAYLOAD_TYPE Is GS |
|---|---|---|---|
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in the Input Formatting block. The CRC mode is signaled according to the below table 22.

TABLE 22

| Value | CRC mode |
|---|---|
| 00 | Not used |
| 01 | CRC-8 |
| 10 | CRC-16 |
| 11 | CRC-32 |

DNP_MODE: This 2-bit field indicates the null-packet deletion mode used by the associated DP when DP_PAYLOAD_TYPE is set to TS ('00'). DNP_MODE is signaled according to the below table 23. If DP_PAYLOAD_TYPE is not '00', DNP_MODE is set to the value '00'.

TABLE 23

| Value | Null-packet deletion mode |
|---|---|
| 00 | Not used |
| 01 | DNP-NORMAL |
| 10 | DNP-OFFSET |
| 11 | reserved |

ISSY_MODE: This 2-bit field indicates the ISSY mode used by the associated DP when DP_PAYLOAD_TYPE is set to TS ('00'). The ISSY_MODE is signaled according to the below table 24 If DP_PAYLOAD_TYPE is not TS ('00'), ISSY_MODE is set to the value '00'.

TABLE 24

| Value | ISSY mode |
|---|---|
| 00 | Not used |
| 01 | ISSY-UP |
| 10 | ISSY-BBF |
| 11 | reserved |

HC_MODE_TS: This 2-bit field indicates the TS header compression mode used by the associated DP when DP_PAYLOAD_TYPE is set to TS ('00'). The HC_MODE_TS is signaled according to the below table 25.

TABLE 25

| Value | Header compression mode |
|---|---|
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates the IP header compression mode when DP PAYLOAD TYPE is set to IP ('01'). The HC_MODE_IP is signaled according to the below table 26.

TABLE 26

| Value | Header compression mode |
|---|---|
| 00 | No compression |
| 01 | HC_MODE_IP 1 |
| 10~11 | reserved |

PID: This 13-bit field indicates the PID number for TS header compression when DP PAYLOAD TYPE is set to TS ('00') and HC MODE TS is set to '01' or '10'.

RESERVED: This 8-bit field is reserved for future use.

The following field appears only if FIC_FLAG is equal to '1':

FIC_VERSION: This 8-bit field indicates the version number of the FTC.

FIC_LENGTH_BYTE: This 13-bit field indicates the length, in bytes, of the FTC.

RESERVED: This 8-bit field is reserved for future use.

The following field appears only if AUX_FLAG is equal to '1':

NUM_AUX: This 4-bit field indicates the number of auxiliary streams. Zero means no auxiliary streams are used.

AUX_CONFIG_RFU: This 8-bit field is reserved for future use.

AUX_STREAM_TYPE: This 4-bit is reserved for future use for indicating the type of the current auxiliary stream.

AUX_PRIVATE_CONFIG: This 28-bit field is reserved for future use for signaling auxiliary streams.

FIG. 15 illustrates PLS2 data according to another embodiment of the present invention.

FIG. 15 illustrates PLS2-DYN data of the PLS2 data. The values of the PLS2-DYN data may change during the duration of one frame-group, while the size of fields remains constant.

The details of fields of the PLS2-DYN data are as follows:

FRAME_INDEX: This 5-bit field indicates the frame index of the current frame within the super-frame. The index of the first frame of the super-frame is set to '0'.

PLS_CHANGE_COUNTER: This 4-bit field indicates the number of super-frames ahead where the configuration will change. The next super-frame with changes in the configuration is indicated by the value signaled within this field. If this field is set to the value '0000', it means that no scheduled change is foreseen: e.g., value '1' indicates that there is a change in the next super-frame.

FIC_CHANGE_COUNTER: This 4-bit field indicates the number of super-frames ahead where the configuration (i.e., the contents of the FIC) will change. The next super-frame with changes in the configuration is indicated by the value signaled within this field. If this field is set to the value '0000', it means that no scheduled change is foreseen: e.g. value '0001' indicates that there is a change in the next super-frame.

RESERVED: This 16-bit field is reserved for future use.

The following fields appear in the loop over NUM_DP, which describe the parameters associated with the DP carried in the current frame.

DP_ID: This 6-bit field indicates uniquely the DP within a PHY profile.

DP_START: This 15-bit (or 13-bit) field indicates the start position of the first of the DPs using the DPU addressing scheme. The DP_START field has differing length according to the PHY profile and FFT size as shown in the below table 27.

TABLE 27

| | DP_START field size | |
|---|---|---|
| PHY profile | 64K | 16K |
| Base | 13 bit | 15 bit |
| Handheld | — | 13 bit |
| Advanced | 13 bit | 15 bit |

DP_NUM_BLOCK: This 10-bit field indicates the number of FEC blocks in the current TI group for the current DP. The value of DP_NUM_BLOCK ranges from 0 to 1023.

RESERVED: This 8-bit field is reserved for future use.

The following fields indicate the FIC parameters associated with the EAC.

EAC_FLAG: This 1-bit field indicates the existence of the EAC in the current frame. This bit is the same value as the EAC_FLAG in the preamble.

EAS_WAKE_UP_VERSION_NUM: This 8-bit field indicates the version number of a wake-up indication.

If the EAC_FLAG field is equal to '1', the following 12 bits are allocated for EAC LENGTH BYTE field. If the EAC_FLAG field is equal to '0', the following 12 bits are allocated for EAC_COUNTER.

EAC_LENGTH_BYTE: This 12-bit field indicates the length, in byte, of the EAC.

EAC_COUNTER: This 12-bit field indicates the number of the frames before the frame where the EAC arrives.

The following field appears only if the AUX_FLAG field is equal to '1':

AUX_PRIVATE_DYN: This 48-bit field is reserved for future use for signaling auxiliary streams. The meaning of this field depends on the value of AUX_STREAM_TYPE in the configurable PLS2-STAT.

CRC_32: A 32-bit error detection code, which is applied to the entire PLS2.

FIG. 16 illustrates a logical structure of a frame according to an embodiment of the present invention.

As above mentioned, the PLS, EAC, FIC, DPs, auxiliary streams and dummy cells are mapped into the active carriers of the OFDM symbols in the frame. The PLS1 and PLS2 are first mapped into one or more FSS(s). After that, EAC cells, if any, are mapped immediately following the PLS field, followed next by FIC cells, if any. The DPs are mapped next after the PLS or EAC, FIC, if any. Type 1 DPs follows first, and Type 2 DPs next. The details of a type of the DP will be described later. In some case, DPs may carry some special data for EAS or service signaling data. The auxiliary stream or streams, if any, follow the DPs, which in turn are followed by dummy cells. Mapping them all together in the above mentioned order, i.e. PLS, EAC, FIC, DPs, auxiliary streams and dummy data cells exactly fill the cell capacity in the frame.

FIG. 17 illustrates PLS mapping according to an embodiment of the present invention.

PLS cells are mapped to the active carriers of FSS(s). Depending on the number of cells occupied by PLS, one or more symbols are designated as FSS(s), and the number of FSS(s) NFSS is signaled by NUM_FSS in PLS1. The FSS is a special symbol for carrying PLS cells. Since robustness and latency are critical issues in the PLS, the FSS(s) has higher density of pilots allowing fast synchronization and frequency-only interpolation within the FSS.

PLS cells are mapped to active carriers of the NFSS FSS(s) in a top-down manner as shown in an example in FIG. 17. The PLS1 cells are mapped first from the first cell of the first FSS in an increasing order of the cell index. The PLS2 cells follow immediately after the last cell of the PLS1 and mapping continues downward until the last cell index of the first FSS. If the total number of required PLS cells exceeds the number of active carriers of one FSS, mapping proceeds to the next FSS and continues in exactly the same manner as the first FSS.

After PLS mapping is completed, DPs are carried next. If EAC, FIC or both are present in the current frame, they are placed between PLS and "normal" DPs.

FIG. 18 illustrates EAC mapping according to an embodiment of the present invention.

EAC is a dedicated channel for carrying EAS messages and links to the DPs for EAS. EAS support is provided but EAC itself may or may not be present in every frame. EAC, if any, is mapped immediately after the PLS2 cells. EAC is not preceded by any of the FIC, DPs, auxiliary streams or dummy cells other than the PLS cells. The procedure of mapping the EAC cells is exactly the same as that of the PLS.

The EAC cells are mapped from the next cell of the PLS2 in increasing order of the cell index as shown in the example in FIG. 18. Depending on the EAS message size, EAC cells may occupy a few symbols, as shown in FIG. 18.

EAC cells follow immediately after the last cell of the PLS2, and mapping continues downward until the last cell index of the last FSS. If the total number of required EAC cells exceeds the number of remaining active carriers of the last FSS mapping proceeds to the next symbol and continues in exactly the same manner as FSS(s). The next symbol for mapping in this case is the normal data symbol, which has more active carriers than a FSS.

After EAC mapping is completed, the FIC is carried next, if any exists. If FIC is not transmitted (as signaled in the PLS2 field), DPs follow immediately after the last cell of the EAC.

FIG. 19 illustrates FIC mapping according to an embodiment of the present invention.

shows an example mapping of FIC cell without EAC and (b) shows an example mapping of FIC cell with EAC.

FIC is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services, and BASE_DP_ID. For fast service acquisition, in addition to FIC, base DP can be decoded using BASE_DP_ID. Other than the content it carries, a base DP is encoded and mapped to a frame in exactly the same way as a normal DP. Therefore, no additional description is required for a base DP. The FIC data is generated and consumed in the Management Layer. The content of FIC data is as described in the Management Layer specification.

The FIC data is optional and the use of FIC is signaled by the FIC_FLAG parameter in the static part of the PLS2. If FIC is used, FIC_FLAG is set to '1' and the signaling field for FIC is defined in the static part of PLS2. Signaled in this field are FIC_VERSION, and FIC_LENGTH_BYTE. FIC uses the same modulation, coding and time interleaving parameters as PLS2. FIC shares the same signaling parameters such as PLS2_MOD and PLS2_FEC. FIC data, if any, is mapped immediately after PLS2 or EAC if any. FIC is not preceded by any normal DPs, auxiliary streams or dummy cells. The method of mapping FIC cells is exactly the same as that of EAC which is again the same as PLS.

Without EAC after PLS, FIC cells are mapped from the next cell of the PLS2 in an increasing order of the cell index as shown in an example in (a). Depending on the FIC data size, FIC cells may be mapped over a few symbols, as shown in (b).

FIC cells follow immediately after the last cell of the PLS2, and mapping continues downward until the last cell index of the last FSS. If the total number of required FIC cells exceeds the number of remaining active carriers of the last FSS, mapping proceeds to the next symbol and continues in exactly the same manner as FSS(s). The next symbol for mapping in this case is the normal data symbol which has more active carriers than a FSS.

If EAS messages are transmitted in the current frame, EAC precedes FIC, and FIC cells are mapped from the next cell of the EAC in an increasing order of the cell index as shown in (b).

After FIC mapping is completed, one or more DPs are mapped, followed by auxiliary streams, if any, and dummy cells.

FIG. 20 illustrates a type of DP according to an embodiment of the present invention.

shows type 1 DP and (b) shows type 2 DP.

After the preceding channels, i.e., PLS, EAC and FIC, are mapped, cells of the DPs are mapped. A DP is categorized into one of two types according to mapping method:

Type 1 DP: DP is mapped by TDM

Type 2 DP: DP is mapped by FDM

The type of DP is indicated by DP_TYPE field in the static part of PLS2. FIG. 20 illustrates the mapping orders of Type 1 DPs and Type 2 DPs. Type 1 DPs are first mapped in the increasing order of cell index, and then after reaching the last cell index, the symbol index is increased by one. Within the next symbol, the DP continues to be mapped in the increasing order of cell index starting from p=0. With a number of DPs mapped together in one frame, each of the Type 1 DPs are grouped in time, similar to TDM multiplexing of DPs.

Type 2 DPs are first mapped in the increasing order of symbol index, and then after reaching the last OFDM symbol of the frame, the cell index increases by one and the symbol index rolls back to the first available symbol and then increases from that symbol index. After mapping a number of DPs together in one frame, each of the Type 2 DPs are grouped in frequency together, similar to FDM multiplexing of DPs.

Type 1 DPs and Type 2 DPs can coexist in a frame if needed with one restriction; Type 1 DPs always precede Type 2 DPs. The total number of OFDM cells carrying Type 1 and Type 2 DPs cannot exceed the total number of OFDM cells available for transmission of DPs:

$$D_{DP1}+D_{DP2} \leq D_{DP}$$ [Math figure 2]

where DDP1 is the number of OFDM cells occupied by Type 1 DPs, DDP2 is the number of cells occupied by Type 2 DPs. Since PLS, EAC, FIC are all mapped in the same way as Type 1 DP, they all follow "Type 1 mapping rule". Hence, overall, Type 1 mapping always precedes Type 2 mapping.

FIG. 21 illustrates DP mapping according to an embodiment of the present invention.

shows an addressing of OFDM cells for mapping type 1 DPs and (b) shows an addressing of OFDM cells for mapping for type 2 DPs.

Addressing of OFDM cells for mapping Type 1 DPs (0, . . . , DDP1-1) is defined for the active data cells of Type 1 DPs. The addressing scheme defines the order in which the cells from the TIs for each of the Type 1 DPs are allocated to the active data cells. It is also used to signal the locations of the DPs in the dynamic part of the PLS2.

Without EAC and FIC, address 0 refers to the cell immediately following the last cell carrying PLS in the last FSS. If EAC is transmitted and FIC is not in the corresponding frame, address 0 refers to the cell immediately following the last cell carrying EAC. If FIC is transmitted in the corresponding frame, address 0 refers to the cell immediately following the last cell carrying FIC. Address 0 for Type 1 DPs can be calculated considering two different cases as shown in (a). In the example in (a), PLS, EAC and FIC are assumed to be all transmitted. Extension to the cases where either or both of EAC and FIC are omitted is straightforward. If there are remaining cells in the FSS after mapping all the cells up to FIC as shown on the left side of (a).

Addressing of OFDM cells for mapping Type 2 DPs (0, . . . , DDP2-1) is defined for the active data cells of Type 2 DPs. The addressing scheme defines the order in which the cells from the TIs for each of the Type 2 DPs are allocated to the active data cells. It is also used to signal the locations of the DPs in the dynamic part of the PLS2.

Three slightly different cases are possible as shown in (b). For the first case shown on the left side of (b), cells in the last FSS are available for Type 2 DP mapping. For the second case shown in the middle, FIC occupies cells of a normal symbol, but the number of FIC cells on that symbol is not larger than CFSS. The third case, shown on the right side in (b), is the same as the second case except that the number of FIC cells mapped on that symbol exceeds CFSS.

The extension to the case where Type 1 DP(s) precede Type 2 DP(s) is straightforward since PLS, EAC and FIC follow the same "Type 1 mapping rule" as the Type 1 DP(s).

A data pipe unit (DPU) is a basic unit for allocating data cells to a DP in a frame.

A DPU is defined as a signaling unit for locating DPs in a frame. A Cell Mapper 7010 may map the cells produced by the TIs for each of the DPs. A Time interleaver 5050 outputs a series of TI-blocks and each TI-block comprises a variable number of XFECBLOCKs which is in turn composed of a set of cells. The number of cells in an XFECBLOCK, Ncells, is dependent on the FECBLOCK size, Nldpc, and the number of transmitted bits per constellation symbol. A DPU is defined as the greatest common divisor of all possible values of the number of cells in a XFECBLOCK, Ncells, supported in a given PHY profile. The length of a DPU in cells is defined as LDPU. Since each PHY profile supports different combinations of FECBLOCK size and a different number of bits per constellation symbol, LDPU is defined on a PHY profile basis.

FIG. 22 illustrates an FEC structure according to an embodiment of the present invention.

FIG. 22 illustrates an FEC structure according to an embodiment of the present invention before bit interleaving. As above mentioned, Data FEC encoder may perform the FEC encoding on the input BBF to generate FECBLOCK procedure using outer coding (BCH), and inner coding (LDPC). The illustrated FEC structure corresponds to the FECBLOCK. Also, the FECBLOCK and the FEC structure have same value corresponding to a length of LDPC codeword.

The BCH encoding is applied to each BBF (Kbch bits), and then LDPC encoding is applied to BCH-encoded BBF (Kldpc bits=Nbch bits) as illustrated in FIG. 22.

The value of Nldpc is either 64800 bits (long FEC-BLOCK) or 16200 bits (short FECBLOCK).

The below table 28 and table 29 show FEC encoding parameters for a long FECBLOCK and a short FECBLOCK, respectively.

TABLE 28

| LDPC Rate | $N_{ldpc}$ | $K_{ldpc}$ | $K_{bch}$ | BCH error correction capability | $N_{bch} - K_{bch}$ |
|---|---|---|---|---|---|
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 29

| LDPC Rate | $N_{ldpc}$ | $K_{ldpc}$ | $K_{bch}$ | BCH error correction capability | $N_{bch} - K_{bch}$ |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |
| 11/15 | | 11880 | 11712 | | |

TABLE 29-continued

| LDPC Rate | $N_{ldpc}$ | $K_{ldpc}$ | $K_{bch}$ | BCH error correction capability | $N_{bch} - K_{bch}$ |
|---|---|---|---|---|---|
| 12/15 | | 12960 | 12792 | | |
| 13/15 | | 14040 | 13872 | | |

The details of operations of the BCH encoding and LDPC encoding are as follows:

A 12-error correcting BCH code is used for outer encoding of the BBF. The BCH generator polynomial for short FECBLOCK and long FECBLOCK are obtained by multiplying together all polynomials.

LDPC code is used to encode the output of the outer BCH encoding. To generate a completed Bldpc (FECBLOCK), Pldpc (parity bits) is encoded systematically from each Ildpc (BCH-encoded BBF), and appended to Ildpc. The completed Bldpc (FECBLOCK) are expressed as follow Math figure.

$$B_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}]$$ [Math figure 3]

The parameters for long FECBLOCK and short FECBLOCK are given in the above table 28 and 29, respectively.

The detailed procedure to calculate Nldpc–Kldpc parity bits for long FECBLOCK, is as follows:

1) Initialize the parity bits, $$p_0 = p_1 = p_2 = \ldots = p_{N_{ldpc}-K_{ldpc}-1} = 0$$ [Math figure 4]

2) Accumulate the first information bit-i0, at parity bit addresses specified in the first row of an addresses of parity check matrix. The details of addresses of parity check matrix will be described later. For example, for rate 13/15:

$$p_{983} = p_{983} \oplus i_0$$ [Math FIG. 5]
$$p_{2815} = p_{2815} \oplus i_0$$
$$p_{4837} = p_{4837} \oplus i_0$$
$$p_{4989} = p_{4989} \oplus i_0$$
$$p_{6138} = p_{6138} \oplus i_0$$
$$p_{6458} = p_{6458} \oplus i_0$$
$$p_{6921} = p_{6921} \oplus i_0$$
$$p_{6974} = p_{6974} \oplus i_0$$
$$p_{7572} = p_{7572} \oplus i_0$$
$$p_{8260} = p_{8260} \oplus i_0$$
$$p_{8496} = p_{8496} \oplus i_0$$

3) For the next 359 information bits, is, s=1, 2, ..., 359 accumulate is at parity bit addresses using following Math figure.

$$\{x + (s \bmod 360) \times Q_{ldpc}\} \bmod (N_{ldpc} - K_{ldpc})$$ [Math figure 6]

where x denotes the address of the parity bit accumulator corresponding to the first bit i0, and Qldpc is a code rate dependent constant specified in the addresses of parity check matrix. Continuing with the example, Qldpc=24 for rate 13/15, so for information bit i1, the following operations are performed:

$$p_{1007} = p_{1007} \oplus i_0$$ [Math FIG. 7]
$$p_{2839} = p_{2839} \oplus i_0$$
$$p_{4861} = p_{4861} \oplus i_0$$
$$p_{5013} = p_{5013} \oplus i_0$$
$$p_{6162} = p_{6162} \oplus i_0$$
$$p_{6482} = p_{6482} \oplus i_0$$
$$p_{6945} = p_{6945} \oplus i_0$$
$$p_{6998} = p_{6998} \oplus i_0$$
$$p_{7596} = p_{7596} \oplus i_0$$
$$p_{8284} = p_{8284} \oplus i_0$$
$$p_{8520} = p_{8520} \oplus i_0$$

4) For the 361st information bit i360, the addresses of the parity bit accumulators are given in the second row of the addresses of parity check matrix. In a similar manner the addresses of the parity bit accumulators for the following 359 information bits is, s=361, 362, ..., 719 are obtained using the Math FIG. 6, where x denotes the address of the parity bit accumulator corresponding to the information bit i360, i.e., the entries in the second row of the addresses of parity check matrix.

5) In a similar manner, for every group of 360 new information bits, a new row from addresses of parity check matrixes used to find the addresses of the parity bit accumulators.

After all of the information bits are exhausted, the final parity bits are obtained as follows:

6) Sequentially perform the following operations starting with i=1

$$p_i = p_i \oplus p_{i-1}, i=1, 2, \ldots, N_{ldpc} - K_{ldpc} - 1$$ [Math figure 8]

where final content of pi, i=0, 1, ... Nldpc–Kldpc–1 is equal to the parity bit pi.

TABLE 30

| Code Rate | $Q_{ldpc}$ |
|---|---|
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for a short FECBLOCK is in accordance with t LDPC encoding procedure for the long FECBLOCK, except replacing the table 30 with table 31, and replacing the addresses of parity check matrix for the long FECBLOCK with the addresses of parity check matrix for the short FECBLOCK.

TABLE 31

| Code Rate | $Q_{ldpc}$ |
|---|---|
| 5/15 | 30 |
| 6/15 | 27 |
| 7/15 | 24 |
| 8/15 | 21 |
| 9/15 | 18 |

TABLE 31-continued

| Code Rate | $Q_{ldpc}$ |
|---|---|
| 10/15 | 15 |
| 11/15 | 12 |
| 12/15 | 9 |
| 13/15 | 6 |

FIG. 23 illustrates a bit interleaving according to an embodiment of the present invention.

The outputs of the LDPC encoder are bit-interleaved, which consists of parity interleaving followed by Quasi-Cyclic Block (QCB) interleaving and inner-group interleaving.

shows Quasi-Cyclic Block (QCB) interleaving and (b) shows inner-group interleaving.

The FECBLOCK may be parity interleaved. At the output of the parity interleaving, the LDPC codeword consists of 180 adjacent QC blocks in a long FECBLOCK and 45 adjacent QC blocks in a short FECBLOCK. Each QC block in either a long or short FECBLOCK consists of 360 bits. The parity interleaved LDPC codeword is interleaved by QCB interleaving. The unit of QCB interleaving is a QC block. The QC blocks at the output of parity interleaving are permutated by QCB interleaving as illustrated in FIG. 23, where Ncells=64800/imod or 16200/imod according to the FECBLOCK length. The QCB interleaving pattern is unique to each combination of modulation type and LDPC code rate.

After QCB interleaving, inner-group interleaving is performed according to modulation type and order ($\eta_{mod}$) which is defined in the below table 32. The number of QC blocks for one inner-group, NQCB_IG, is also defined.

TABLE 32

| Modulation type | $\eta_{mod}$ | $N_{QCB\_IG}$ |
|---|---|---|
| QAM-16 | 4 | 2 |
| NUC-16 | 4 | 4 |
| NUQ-64 | 6 | 3 |
| NUC-64 | 6 | 6 |
| NUQ-256 | 8 | 4 |
| NUC-256 | 8 | 8 |
| NUQ-1024 | 10 | 5 |
| NUC-1024 | 10 | 10 |

The inner-group interleaving process is performed with NQCB_IG QC blocks of the QCB interleaving output. Inner-group interleaving has a process of writing and reading the bits of the inner-group using 360 columns and NQCB_IG rows. In the write operation, the bits from the QCB interleaving output are written row-wise. The read operation is performed column-wise to read out m bits from each row, where m is equal to 1 for NUC and 2 for NUQ.

FIG. 24 illustrates a cell-word demultiplexing according to an embodiment of the present invention.

FIG. 24 shows a cell-word demultiplexing for 8 and 12 bpcu MIMO and (b) shows a cell-word demultiplexing for 10 bpcu MIMO.

Each cell word (c0,1, c1,1, . . . , c$\eta$ mod−1,1) of the bit interleaving output is demultiplexed into (d1,0,m, d1,1, m . . . , d1, $\eta$ mod−1,m) and (d2,0,m, d2,$\eta$ m . . . , d2,$\eta$ mod−1,m) as shown in (a), which describes the cell-word demultiplexing process for one XFECBLOCK.

For the 10 bpcu MIMO case using different types of NUQ for MIMO encoding, the Bit Interleaver for NUQ-1024 is re-used. Each cell word (c0,1, c1,1, . . . , c9,1) of the Bit Interleaver output is demultiplexed into (d1,0,m, d1,1, m . . . , d1,3,m) and (d2,0,m, d2,1,m . . . , d2,5,m), as shown in (b).

FIG. 25 illustrates a time interleaving according to an embodiment of the present invention.

to (c) show examples of TI mode.

The time interleaver operates at the DP level. The parameters of time interleaving (TI) may be set differently for each DP.

The following parameters, which appear in part of the PLS2-STAT data, configure the TI:

DP_TI_TYPE (allowed values: 0 or 1): Represents the TI mode; '0' indicates the mode with multiple TI blocks (more than one TI block) per TI group. In this case, one TI group is directly mapped to one frame (no inter-frame interleaving). '1' indicates the mode with only one TI block per TI group. In this case, the TI block may be spread over more than one frame (inter-frame interleaving).

DP_TI_LENGTH: If DP_TI_TYPE='0', this parameter is the number of TI blocks NTI per TI group. For DP_TI_TYPE='1', this parameter is the number of frames PI spread from one TI group.

DP_NUM_BLOCK_MAX (allowed values: 0 to 1023): Represents the maximum number of XFECBLOCKs per TI group.

DP_FRAME_INTERVAL (allowed values: 1, 2, 4, 8): Represents the number of the frames IJUMP between two successive frames carrying the same DP of a given PHY profile.

DP_TI_BYPASS (allowed values: 0 or 1): If time interleaving is not used for a DP, this parameter is set to '1'. It is set to '0' if time interleaving is used.

Additionally, the parameter DP_NUM_BLOCK from the PLS2-DYN data is used to represent the number of XFEC-BLOCKs carried by one TI group of the DP.

When time interleaving is not used for a DP, the following TI group, time interleaving operation, and TI mode are not considered. However, the Delay Compensation block for the dynamic configuration information from the scheduler will still be required. In each DP, the XFECBLOCKs received from the SSD/MIMO encoding are grouped into TI groups. That is, each TI group is a set of an integer number of XFECBLOCKs and will contain a dynamically variable number of XFECBLOCKs. The number of XFECBLOCKs in the TI group of index n is denoted by NxBLOCK_Group (n) and is signaled as DP_NUM_BLOCK in the PLS2-DYN data. Note that NxBLOCK_Group(n) may vary from the minimum value of 0 to the maximum value NxBLOCK_Group_MAX (corresponding to DP_NUM_BLOCK_MAX) of which the largest value is 1023.

Each TI group is either mapped directly onto one frame or spread over PI frames. Each TI group is also divided into more than one TI blocks(NTI), where each TI block corresponds to one usage of time interleaver memory. The TI blocks within the TI group may contain slightly different numbers of XFECBLOCKs. If the TI group is divided into multiple TI blocks, it is directly mapped to only one frame. There are three options for time interleaving (except the extra option of skipping the time interleaving) as shown in the below table 33.

TABLE 33

| Modes | Descriptions |
|---|---|
| Option-1 | Each TI group contains one TI block and is mapped directly to one frame as shown in (a). This option is |

TABLE 33-continued

| Modes | Descriptions |
|---|---|
| | signaled in the PLS2-STAT by DP_TI_TYPE= '0' and DP_TI_LENGTH = '1' (NTI = 1). |
| Option-2 | Each TI group contains one TI block and is mapped to more than one frame, (b) shows an example, where one TI group is mapped to two frames, i.e., DP_TI_LENGTH = '2' (PI = 2) and DP_FRAME_INTERVAL (IJUMP = 2). This provides greater time diversity for low data-rate services. This option is signaled in the PLS2-STAT by DP_TI_TYPE = '1'. |
| Option-3 | Each TI group is divided into multiple TI blocks and is mapped directly to one frame as shown in (c). Each TI block may use full TI memory, so as to provide the maximum bit-rate for a DP. This option is signaled in the PLS2-STAT signaling by DP_TI_TYPE= '0' and DP_TI_LENGTH = NTI, while PI = 1. |

In each DP, the TI memory stores the input XFEC-BLOCKs (output XFECBLOCKs from the SSD/MIMO encoding block). Assume that input XFECBLOCKs are defined as $$(d_{n,s,0,0}, d_{n,s,0,1}, \ldots, d_{n,s,0,Ncells-1}, d_{n,s,1,Ncells-1}, \ldots,$$
$$d_{n,s,NxBLOCK\_TI(n,s)-1,0}, \ldots, d_{n,s,NxBLOCK\_TI(n,s)-1,Ncells-1}),$$

where $d_{n,s,r,q}$ the qth cell of the rth XFECBLOCK in the sth TI block of the nth TI group and represents the outputs of SSD and MIMO encodings as follows $$d_{n,s,r,q} = \begin{cases} f_{n,s,r,q}, & \text{the output of SSD}\ldots\text{encoding} \\ g_{n,s,r,q}, & \text{the output of MIMO encoding} \end{cases}.$$

In addition, assume that output XFECBLOCKs from the time interleaver 5050 are defined as $$(h_{n,s,0}, h_{n,s,1}, \ldots, h_{n,s,i}, \ldots, h_{n,s,NxBLOCK\_TI(n,s) \times Ncells-1}),$$

where $h_{n,s,i}$ is the ith output cell (for $i=0, \ldots, N_{xBLOCK\_TI}$ $(n, s) \times N_{cells}-1$ in the sth TI block of the nth TI group.

Typically, the time interleaver will also act as a buffer for DP data prior to the process of frame building. This is achieved by means of two memory banks for each DP. The first TI-block is written to the first bank. The second TI-block is written to the second bank while the first bank is being read from and so on.

The TI is a twisted row-column block interleaver. For the sth TI block of the nth TI group, the number of rows $N_r$ of a TI memory is equal to the number of cells $N_{cells}$, i.e., $N_r = N_{cells}$ while the number of columns $N_c$ is equal to the number $N_{xBLOCK\_TI}(n, s)$.

FIG. 26 illustrates the basic operation of a twisted row-column block interleaver according to an embodiment of the present invention.

FIG. 26(a) shows a writing operation in the time interleaver and FIG. 26(b) shows a reading operation in the time interleaver The first XFECBLOCK is written column-wise into the first column of the TI memory, and the second XFECBLOCK is written into the next column, and so on as shown in (a). Then, in the interleaving array, cells are read out diagonal-wise. During diagonal-wise reading from the first row (rightwards along the row beginning with the left-most column) to the last row, $N_r$ cells are read out as shown in (b). In detail, assuming $Z_{n,s,i}$ ($i=0, \ldots, N_rN_c$) as the TI memory cell position to be read sequentially, the reading process in such an interleaving array is performed by calculating the row index $R_{n,s,i}$, the column index $C_{n,s,i}$, and the associated twisting parameter $T_{n,s,i}$ as follows expression.

$$\text{GENERATE}(R_{n,s,i}, C_{n,s,i}) = \quad \text{[Math FIG. 9]}$$
$$\{$$
$$R_{n,s,i} = \mod(i, N_r),$$
$$T_{n,s,i} = \mod(S_{shift} \times S_{n,s,i}, S_c)$$
$$C_{n,s,i} = \mod\left(T_{n,s,i} + \left\lfloor \frac{i}{N_r} \right\rfloor, N_c\right)$$
$$\}$$

where $S_{shift}$ is a common shift value for the diagonal-wise reading process regardless of $N_{xBLOCK\_TI}(n, s)$, and it is determined by $N_{xBLOCK\_TI\_MAX}$ given in the PLS2-STAT as follows expression.

$$\text{for} \begin{cases} N'_{xBLOCK\_TI\_MAX} = N_{xBLOCK\_TI\_MAX} + 1, & \text{if } N_{xBLOCK\_TI\_MAX} \mod 2 = 0 \\ N'_{xBLOCK\_TI\_MAX} = N_{xBLOCK\_TI\_MAX}, & \text{if } N_{xBLOCK\_TI\_MAX} \mod 2 = 1 \end{cases}, \quad \text{[Math FIG. 10]}$$

$$S_{shift} = \frac{N'_{xBLOCK\_TI\_MAX} - 1}{2}$$

As a result, the cell positions to be read are calculated by a coordinate as $z_{n,s,i}=N_c C_{n,s,i}+R_{n,s,i}$.

FIG. 27 illustrates an operation of a twisted row-column block interleaver according to another embodiment of the present invention.

More specifically, FIG. 27 illustrates the interleaving array in the TI memory for each TI group, including virtual XFECBLOCKs when $N_{xBLOCK\_TI}(0,0)=3$, $N_{xBLOCK\_TI}(1, 0)= 6$, $N_{xBLOCK\_TI}(2,0)=5$.

The variable number $N_{xBLOCK\_TI}(n,s)=N_r$ will be less than or equal to $N'_{xBLOCK\_TI\_MAX}$. Thus, in order to achieve a single-memory deinterleaving at the receiver side, regardless of $N_{xBLOCK\_TI}(n,s)$ the interleaving array for use in a twisted row-column block interleaver is set to the size of $N_r \times N_c = N_{cells} \times N'_{xBLOCK\_TI\_MAX}$ by inserting the virtual XFECBLOCKs into the TI memory and the reading process is accomplished as follow expression.

$$p = 0; \quad \text{[Math FIG. 11]}$$
$$\text{for } i = 0; i < N_{cells} N'_{xBLOCK\_TI\_MAX}; i = i+1$$
$$\{\text{GENERATE}(R_{n,s,i}, C_{n,s,i});$$
$$V_i = N_r C_{n,s,j} + R_{n,s,i}$$
$$\text{if } V_i < N_{cells} N_{xBLOCK\_TI}(n, s)$$
$$\{$$

-continued $$Z_{n,s,p} = V_i; p = p + 1;$$

}

}

The number of TI groups is set to 3. The option of time interleaver is signaled in the PLS2-STAT data by DP_TI_TYPE='0', DP FRAME_INTERVAL=T, and DP_TI_LENGTH=T, i.e., NTI=1, IJUMP=1, and PI=1. The number of XFECBLOCKs, each of which has Ncells=30 cells, per TI group is signaled in the PLS2-DYN data by NxBLOCK_TI(0,0)=3, NxBLOCK_TI(1,0)=6, and NxBLOCK_TI(2,0)=5, respectively. The maximum number of XFECBLOCK is signaled in the PLS2-STAT data by NxBLOCK_Group_MAX, which leads to $$\lfloor N_{xBLOCK\_Group\_MAX}/N_{TI} \rfloor = N_{xBLOCK\_TI\_MAX} = 6.$$

FIG. 28 illustrates a diagonal-wise reading pattern of a twisted row-column block interleaver according to an embodiment of the present invention.

More specifically FIG. 28 shows a diagonal-wise reading pattern from each interleaving array with parameters of $N'_{xBLOCK\_TI\_MAX}=7$ and Sshift=(7−1)/2=3. Note that in the reading process shown as pseudocode above, if $V_i \geq N_{cells} N_{xBLOCK\_TI}(n, s)$, the value of Vi is skipped and the next calculated value of Vi is used.

Figure 29:
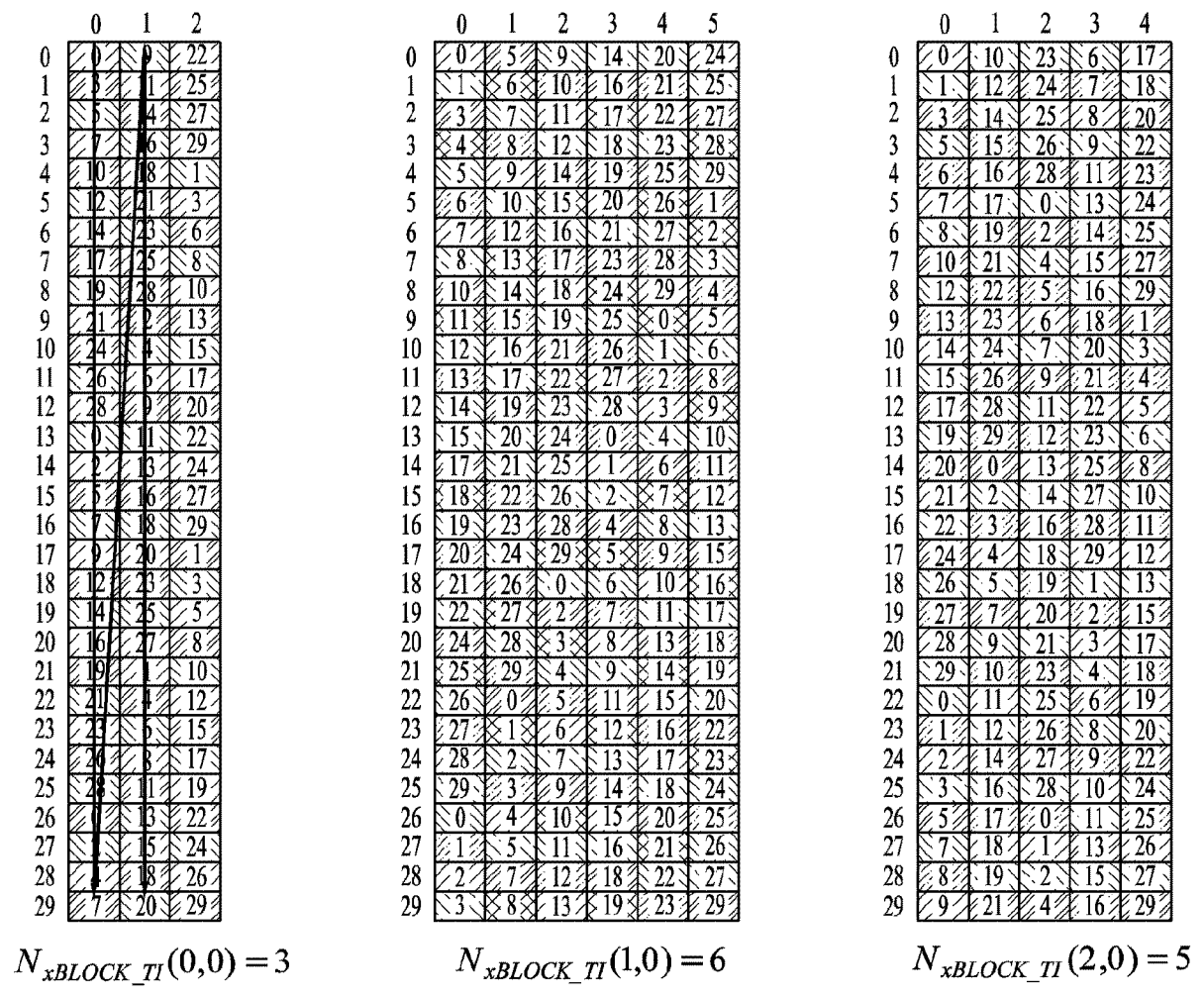

FIG. 29 illustrates interleaved XFECBLOCKs from each interleaving array according to an embodiment of the present invention.

FIG. 29 illustrates the interleaved XFECBLOCKs from each interleaving array with parameters of $N'_{xBLOCK\_TI\_MAX}=7$ and Sshift=3.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

FIG. 30 is a view of a protocol stack for supporting a broadcast service according to an embodiment of the present invention.

The broadcast service may provide adjunct services, for example, audio/video (A/V) data and HTML5 application, interactive service, ACR service, second screen service, and personalization service.

Such a broadcast service may be transmitted through a physical layer (i.e., broadcast signal) such as terrestrial wave and a cable satellite. Additionally, a broadcast service according to an embodiment of the present invention may be transmitted through an internet communication network (e.g., broadband).

When the broadcast service is transmitted through a physical layer, i.e., a broadcast signal such as terrestrial wave and a cable satellite, a broadcast reception device may extract an encapsulated MPEG-2 Transport Stream (TS) and an encapsulated IP datagram by demodulating the broadcast signal. The broadcast reception device may extract a user datagram protocol (UDP) datagram from the IP datagram. At this point, the signaling information may be in XML format. The broadcast reception device may extract signaling information from the UDP datagram. Additionally, the broadcast reception device may extract an Asynchronous Layered Coding/Layered Coding Transport (ALC/LCT) packet from the UDP datagram. The broadcast reception device may extract a File Delivery over Unidirectional Transport (FLUTE) packet from the ALC/LCT packet. At this point, the FLUTE packet may include real-time audio/video/closed caption data, Non-Real Time (NRT) data and Electronic Service Guide (ESG) data. Additionally, the broadcast reception device may extract a Real-time Transport Protocol (RTP) packet and an RTP Control Protocol (RTCP) packet from the UDP datagram. The broadcast reception device may extract A/V data and enhanced data from the RTP/RTCP packet. At this point, at least one of NRT data, A/V data, and enhanced data may be in ISO Base Media File Format (ISO BMFF). Additionally, the broadcast reception device may extract signaling information such as NRT data, A/V data, and PSI/PSIP from an MPEG-2 TS packet or an IP packet. At this point signaling information in XML or binary format.

When the broadcast service is transmitted through an internet communication network (e.g., broadband), the broadcast reception device may receive an IP packet from the internet communication network. The broadcast reception device may extract a TCP packet from the IP packet. The broadcast reception device may extract an HTTP packet from the TCP packet. The broadcast reception device may extract A/V data, enhanced data, and signaling information from the HTTP packet. At this point, at least one of A/V and enhanced data may be in ISO BMFF format. Additionally, the signaling information may in XML format.

A detailed transmission frame and transport packet transmitting broadcast service will be described with reference to FIGS. 31 to 34.

FIG. 31 is a view illustrating a broadcast transmission frame according to an embodiment of the present invention.

According to the embodiment of FIG. 31, the broadcast transmission frame includes a P1 part, an L1 part, a common PLP part, an interleaved PLP part (e.g., a scheduled & interleaved PLP's part), and an auxiliary data part.

According to the embodiment of FIG. 31, the broadcast transmission device transmits information on transport signal detection through the P1 part of the transmission frame. Additionally, the broadcast transmission device may transmit turning information on broadcast signal tuning through the P1 part.

According to the embodiment of FIG. 31, the broadcast transmission device transmits a configuration of the broadcast transmission frame and characteristics of each PLP through the L1 part. At this pint, the broadcast reception device 100 decodes the L1 part on the basis of the P1 part to obtain the configuration of the broadcast transmission frame and the characteristics of each PLP.

According to the embodiment of FIG. 31, the broadcast transmission device may transmit information commonly applied to PLPs through the common PLP part. According to a specific embodiment of the present invention, the broadcast transmission frame may not include the common PLP part.

According to the embodiment of FIG. 31, the broadcast transmission device transmits a plurality of components included in broadcast service through an interleaved PLP part. At this point, the interleaved PLP part includes a plurality of PLPs.

Moreover, according to the embodiment of FIG. 31, the broadcast transmission device may signal to which PLP components configuring each broadcast service are transmitted through an L1 part or a common PLP part. However, the broadcast reception device 100 decodes all of a plurality of PLPs of an interleaved PLP part in order to obtain specific broadcast service information on broadcast service scan.

Unlike the embodiment of FIG. 31, the broadcast transmission device may transmit a broadcast transmission frame including a broadcast service transmitted through a broadcast transmission frame and an additional part that includes information on a component included in the broadcast service. At this point, the broadcast reception device 100 may instantly obtain information on the broadcast service and the components therein through the additional part. This will be described with reference to FIG. 32.

FIG. 32 is a view of a broadcast transmission frame according to another embodiment of the present invention.

According to the embodiment of FIG. 32, the broadcast transmission frame includes a P1 part, an L1 part, a fast information channel (FIC) part, an interleaved PLP part (e.g., a scheduled & interleaved PLP's part), and an auxiliary data part.

Except the FIC part, other parts are identical to those of FIG. 31.

The broadcast transmission device transmits fast information through the FIC part. The fast information may include configuration information of a broadcast stream transmitted through a transmission frame, simple broadcast service information, and service signaling relating to a corresponding service/component. The broadcast reception device 100 may scan broadcast service on the basis of the FIC part. In more detail, the broadcast reception device 100 may extract information on broadcast service from the FIC part.

FIG. 33 is a view illustrating a structure of a transport packet transmitting a broadcast service according to an embodiment of the present invention.

In the embodiment of FIG. 33, a transport packet transmitting a broadcast service includes a Network Protocol field, an Error Indicator field, a Stuffing Indicator field, a Pointer field, a Stuffing bytes field, and payload data.

The Network Protocol field represents the type of a network protocol. According to a specific embodiment of the present invention, a value of the Network Protocol field may represent the IPv4 protocol or a frame packet type. In more detail, as shown in the embodiment of FIG. 34, when a value of the Network Protocol field is 000, it may represent the IPv4 protocol. In more detail, as shown in the embodiment of FIG. 34, when a value of the Network Protocol field is 111, it may represent a frame_packet_type protocol. At this point, framed_packet_type may be a protocol defined by ATSC A/153. In more detail, framed_packet_type may represent a network packet protocol not including a field representing information on the length. According to a specific embodiment of the present invention, the Network Protocol may be a 3-bit field.

The Error Indicator field represents that an error is detected from a corresponding transport packet. In more detail, if a value of the Error Indicator field is 0, it represents that no error is detected from a corresponding packet and if a value of the Error Indicator field is 1, it represents that an error is detected from a corresponding packet According to a specific embodiment of the present invention, the Error Indicator field may be a 1-bit field.

The Stuffing Indicator field represents whether stuffing bytes are included in a corresponding transport packet. At this point, the stuffing bytes represent data included in a payload to maintain the length of a fixed packet. According to a specific embodiment of the present invention, when a value of the Stuffing Indicator field is 1, a transport packet includes a stuffing byte and when a value of the Stuffing Indicator field is 0, a transport packet includes no stuffing byte According to a specific embodiment of the present invention, the Stuffing Indicator field may be a 1-bit field.

The Pointer field represents a start point of a new network packet in a payload part of a corresponding transport packet. According to a specific embodiment of the present invention, when a value of the Pointer field is 0x7FF, it may represent that there is no start point of a new network packet. Additionally, According to a specific embodiment of the present invention, when a value of the Pointer field is not 0x7FF, it may represent an offset value from the last part of a transport packet header to the start point of a new network packet. According to a specific embodiment of the present invention, the Pointer field may be an 11-bit field.

The Stuffing Bytes field represents a stuffing byte filling between the header and the payload data to maintain a fixed packet length.

A configuration of a broadcast reception device for receiving broadcast service will be described with reference to 34.

FIG. 35 is a view illustrating a configuration of a broadcast reception device according to an embodiment of the present invention.

The broadcast reception device 100 of FIG. 35 includes a broadcast reception unit 110, an internet protocol (IP) communication unit 130, and a control unit 150.

The broadcast reception unit 110 includes a channel synchronizer 111, a channel equalizer 113, and a channel decoder 115.

The channel synchronizer 111 synchronizes a symbol frequency with a timing in order for decoding in a baseband where a broadcast signal is received.

The channel equalizer 113 corrects the distortion of a synchronized broadcast signal. In more detail, the channel equalizer 113 corrects the distortion of a synchronized signal due to multipath and Doppler effects.

The channel decoder 115 decodes a distortion corrected broadcast signal. In more detail, the channel decoder 115 extracts a transmission frame from the distortion corrected broadcast signal. At this point, the channel decoder 115 may perform forward error correction (FEC).

The IP communication unit 130 receives and transmits data through internet network.

The control unit 150 includes a signaling decoder 151, a transport packet interface 153, a broadband packet interface 155, a baseband operation control unit 157, a common protocol stack 159, a service map database 161, a service signaling channel processing buffer and parser 163, an A/V processor 165, a broadcast service guide processor 167, an application processor 169, and a service guide database 171.

The signaling decoder 151 decodes signaling information of a broadcast signal.

The transport packet interface 153 extracts a transport packet from a broadcast signal. At this point, the transport packet interface 153 may extract data such as signaling information or IP datagram from the extracted transport packet.

The broadcast packet interface 155 extracts an IP packet from data received from internet network. At this point, the broadcast packet interface 155 may extract signaling data or IP datagram from the IP packet.

The baseband operation control unit 157 controls an operation relating to receiving broadcast information from a baseband.

The common protocol stack 159 extracts audio or video from a transport packet.

The A/V processor 547 processes audio or video.

The service signaling channel processing buffer and parser 163 parses and buffers signaling information that signals broadcast service. In more detail, the service signaling channel processing buffer and parser 163 parses and buffers signaling information that signals broadcast service from the IP datagram.

The service map database 165 stores a broadcast service list including information on broadcast services.

The service guide processor 167 processes terrestrial broadcast service guide data guiding programs of terrestrial broadcast service.

The application processor 169 extracts and processes application related information from a broadcast signal.

The serviced guide database 171 stores program information of a broadcast service.

FIG. 36 is a view illustrating a configuration of a broadcast reception device according to another embodiment of the present invention.

FIG. 36 is a view illustrating a configuration of a broadcast reception device according to another embodiment of the present invention.

In an embodiment of FIG. 36, the broadcast reception device 100 of FIG. 36 includes a broadcast reception unit 110, an internet protocol (IP) communication unit 130, and a control unit 150.

The broadcast reception unit 110 may include one or more processors, one or more circuits, and one or more hardware modules, which perform each of a plurality of functions that the broadcast reception unit 110 performs. In more detail, the broadcast reception unit 110 may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one. The broadcast reception unit 110 may include a physical layer module 119 and a physical layer IP frame module 117. The physical layer module 119 receives and processes a broadcast related signal through a broadcast channel of a broadcast network. The physical layer IP frame module 117 converts a data packet such as an IP datagram obtained from the physical layer module 119 into a specific frame. For example, the physical layer module 119 may convert an IP datagram into an RS Frame or GSE.

The IP communication unit 130 may include one or more processors, one or more circuits, and one or more hardware modules, which perform each of a plurality of functions that the IP communication unit 130 performs. In more detail, the IP communication unit 130 may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one. The IP communication unit 130 may include an internet access control module 131. The internet access control module 131 may control an operation of the broadcast reception device 100 to obtain at least one of service, content, and signaling data through an internet communication network (for example, broad band).

The control unit 150 may include one or more processors, one or more circuits, and one or more hardware modules, which perform each of a plurality of functions that the control unit 150 performs. In more detail, the control unit 150 may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one. The control unit 150 may include at least one of a signaling decoder 151, a service map database 161, a service signaling channel parser 163, an application signaling parser 166, an alert signaling parser 168, a targeting signaling parser 170, a targeting processor 173, an A/V processor 161, an alerting processor 162, an application processor 169, a scheduled streaming decoder 181, a file decoder 182, a user request streaming decoder 183, a file database 184, a component synchronization unit 185, a service/content acquisition control unit 187, a redistribution module 189, a device manager 193, and a data sharing unit 191.

The service/content acquisition control unit 187 controls operations of a receiver to obtain services or contents through a broadcast network or an internet communication network and signaling data relating to services or contents.

The signaling decoder 151 decodes signaling information.

The service signaling parser 163 parses service signaling information.

The application signaling parser 166 extracts and parses service related signaling information. At this point, the service related signaling information may be service scan related signaling information. Additionally, the service related signaling information may be signaling information relating to contents provided through a service.

The alert signaling parser 168 extracts and parses alerting related signaling information.

The target signaling parser 170 extracts and parses information for personalizing services or contents or information for signaling targeting information.

The targeting processor 173 processes information for personalizing services or contents.

The alerting processor 162 processes alerting related signaling information.

The application processor 169 controls application related information and the execution of an application. In more detail, the application processor 169 processes a state of a downloaded application and a display parameter.

The A/V processor 161 processes an A/V rendering related operation on the basis of decoded audio or video and application data.

The scheduled streaming decoder 181 decodes a scheduled streaming that is a content streamed according to a schedule defined by a contents provider such as broadcaster.

The file decoder 182 decodes a downloaded file. Especially, the file decoder 182 decodes a file downloaded through an internet communication network.

The user request streaming decoder 183 decodes a content (for example, On Demand Content) provided by a user request.

The file database 184 stores files. In more detail, the file database 184 may store a file downloaded through an internet communication network.

The component synchronization unit 185 synchronizes contents or services. In more detail, the component synchronization unit 185 synchronizes a presentation time of a content obtained through at least one of the scheduled streaming decoder 181, the file decoder 182, and the user request streaming decoder 183.

The service/content acquisition control unit 187 controls operations of a receiver to obtain services, contents or signaling information relating to services or contents.

When services or contents are not received through a broadcast network, the redistribution module 189 performs operations to support obtaining at least one of services, contents, service related information, and content related information. In more detail, the redistribution module 189 may request at least one of services, contents, service related information, and content related information from the external management device 300. At this point, the external management device 300 may be a content server.

The device manager 193 manages an interoperable external device. In more detail, the device manager 193 may perform at least one of the addition, deletion, and update of an external device. Additionally, an external device may perform connection and data exchange with the broadcast reception device 100.

The data sharing unit 191 performs a data transmission operation between the broadcast reception device 100 and an external device and processes exchange related information. In more detail, the data sharing unit 191 may transmit AV data or signaling information to an external device. Additionally, the data sharing unit 191 may receive AV data or signaling information from an external device.

FIG. 37 is a view that a broadcast service signaling table and broadcast service transmission path signaling information signal broadcast service and a broadcast service transmission path.

The broadcast service signaling table may signal broadcast service information. In more detail, the broadcast service signaling table may signal a media component that broadcast service includes. Additionally, the broadcast service signaling table may signal broadcast service and a transmission path of a media component that the broadcast service includes. For this, the broadcast service signaling table may include broadcast service transmission path signaling information. In the embodiment of FIG. 37, the broadcast service signaling table includes information on a plurality of broadcast services. At this point, the broadcast service signaling table includes media component signaling information signaling a plurality of media components respectively included in a plurality of broadcast services. Especially, the broadcast service signaling table includes broadcast service transmission path signaling information signaling transmission paths of a plurality of media components. For example, it is shown that the broadcast reception device 100 may transmit Video 1 in Service 0 through PLP 0 according to the signaling table. Additionally, it is shown that the broadcast reception device 100 may transmit Audio in Service N through internet network according to the signaling table. At this point, the PLP is a series of logical data delivery paths identifiable on a physical layer. The PLP may be also referred to as a data pipe.

A broadcast service signaling table will be described with reference to FIGS. 38 to 43.

FIG. 38 is a view illustrating a broadcast service signaling table according to an embodiment of the present invention.

The broadcast service signaling table may include at least one of broadcast service identification information, information representing the current state of a broadcast service, the name of a broadcast service, information representing whether a protection algorithm for broadcast service is applied, category information of a broadcast service, and media component signaling information signaling a media component that a broadcast service includes. The media component signaling information signaling a media component that the broadcast service includes may include information representing whether each media component is essential to a corresponding broadcast service. Additionally, the media component signaling information signaling a media component that the broadcast service includes may include information relating to each component.

In more detail, as shown in the embodiment of FIG. 38, the broadcast service signaling table may include at least one of a table_id field, section_syntax_indicator field, a private_indicator field, a section_length field, a table_id_extension field, a version_number field, a current_next_indicator field, a section_number field, a last_section_numberr field, a num_services field, a service_id field, a service_status field, an SP_indicator field, a short_service_name_length field, a short_service_name field, a channel_number field, a service_category field, a num_components field, an essential_component_indicator field, a num_component_level_descriptor field, a component_level_descriptor field, a num_service_level_descriptors field, and a service_level_descriptor field.

The table_id field represents an identifier of a broadcast service signaling information table. At this point, a value of the table_id field may be one of reserved id values defined in ATSC A/65. According to a specific embodiment of the present invention, the table_id field may be an 8-bit field.

The section syntax indicator field represents whether the broadcast service signaling information table is a private section table in a long format of MEPG-2 TS standard. According to a specific embodiment of the present invention, the section_syntax_indicator field may be a 1-bit field.

The private_indicator field represents whether a current table corresponds to a private section. According to a specific embodiment of the present invention, the private_indicator field may be a 1-bit field.

The section_length field represents the length of a section after the section_length field. According to a specific embodiment of the present invention, the section_length field may be a 12-bit field.

The table_id_extension field represents a value for identifying a broadcast service signaling information table in combination with the table_id field. Especially, the table_id field may include a SMT_protocol_version field representing a protocol version of a service signaling information table. According to a specific embodiment of the present invention, the SMT_protocol_version field may be an 8-bit field.

The version_number field represents a version of a service signaling table. The broadcast reception device 100 may determine the availability of a service signaling information table on the basis of a value of the vserion number field. In more detail, when a value of the version_number field is identical to a version of a previously received service signaling table, the information of the service signaling table may not be used. According to a specific embodiment of the present invention, the version_number field may be a 5-bit field.

The current_next_indicator field represents whether information of a broadcast service signaling table is currently available. In more detail, when a value of the current next indicator field is 1, it may represent that the information of the broadcast service signaling table is available. Moreover, when a value of the current_next indicator field is 1, it may represent that the information of the broadcast service signaling table is available next time. According to a specific embodiment of the present invention, the current_next_indicator field may be a 1-bit field.

The section_number field represents a current section number. According to a specific embodiment of the present invention, the section_number field may be an 8-bit field.

The last_section_number field represents the last section number. When the size of a broadcast service signaling table is large, it may be divided into a plurality of sections and then transmitted. At this point, the broadcast reception device 100 determines whether all sections necessary for a broadcast service signaling table are received on the basis of the section_number field and the last_section_number field. According to a specific embodiment of the present invention, the last_section_number field may be an 8-bit field.

The service_id field represents a service identifier for identifying a broadcast service. According to a specific embodiment of the present invention, the service_id field may be a 16-bit field.

The service_status field represents the current state of a broadcast service. In more detail, it may represent whether the broadcast service is available currently. According to a specific embodiment of the present invention, when a value of the service_status field is 1, it may represent that the broadcast service is available currently. According to a specific embodiment of the present invention, the broadcast reception device 100 may determine whether to display a corresponding broadcast service in a broadcast service list and a broadcast service guide on the basis of a value of the service_status field. For example, when a corresponding broadcast service is unavailable, the broadcast reception device 100 may not display the corresponding broadcast service in a broadcast service list and a broadcast service guide. According to another specific embodiment of the present invention, the broadcast reception device 100 may limit an access to a corresponding broadcast service on the basis of a value of the service_status field. For example, when a corresponding broadcast service is unavailable, the broadcast reception device 100 may limit an access to a corresponding broadcast service through a channel up/down key. According to a specific embodiment of the present invention, the service_status field may be a 2-bit field.

The SP_indicator field may represent whether service protection is applied to at least one component in a corresponding broadcast service. For example, when a value of SP_indicator is 1, it may represent that service protection is applied to at least one component in a corresponding broadcast service. According to a specific embodiment of the present invention, the SP_indicator field may be a 1-bit field.

The short_service_name_length field represents the size of the short_service_name field.

The short_service_name field represents the name of a broadcast service. In more detail, the short_service_name field may be displayed by summarizing the name of a broadcast service.

The channel_number field displays a virtual channel number of a corresponding broadcast service.

The service_category field represents a category of a broadcast service. In more detail, the service_category field may represent at least one of TV service, radio service, broadcast service guide, RI service, and emergency alerting. For example, as shown in the embodiment of FIG. 38, in the case that a value of the service category field is 0x01, it represents TV service. In the case that a value of the service category field is 0x02, it represents radio service. In the case that a value of the service_category field is 0x03, it represents RI service. In the case that a value of the service category field is 0x08, it represents service guide. In the case that a value of the service_category field is 0x09, it represents emergency alerting. According to a specific embodiment of the present invention, the service_category field may be a 6-bit field.

The num_component field represents the number of media components that a corresponding broadcast service includes. According to a specific embodiment of the present invention, the num_component field may be a 5-bit field.

The essential_component_indicator field represents whether a corresponding media component is an essential media component essential to a corresponding broadcast service presentation. According to a specific embodiment of the present invention, the essential_component_indicator field may be a 1-bit field.

The num_component_level_descriptor field represents the number of component_level_descrptor fields. According to a specific embodiment of the present invention, the num_component_level_descriptor field may be a 4-bit field.

The component_level_descriptor field includes an additional property for a corresponding component.

The num_service_level_descriptors field represents the number of service_level_descriptor fields. According to a specific embodiment of the present invention, the num_service_level_descriptors field may be a 4-bit field.

The service_level_descriptor field includes an additional property for a corresponding service.

The service signaling table may further include information on ensemble. When the same Forward Error Correction (FEC) is applied to at least one service and transmitted, the ensemble represents a collection of the at least one service. This will be described in more detail with reference to FIG. 49.

FIG. 40 is a view of a broadcast service signaling table according to another embodiment of the present invention.

In more detail, as shown in the embodiment of FIG. 40, the broadcast service signaling table may further include a num_ensemble_level_descriptors field and an ensemble_level_descriptor field.

The num_ensemble_level_descriptors field represents the number of ensemble_level_descriptor fields. According to a specific embodiment of the present invention, the num_ensemble_level_descriptors field may be a 4-bit field.

The ensemble_level_descriptor field includes an additional property for a corresponding ensemble.

Additionally, the service signaling table may further include stream identifier information for identifying a media component. This will be described in more detail with reference to FIG. 41.

FIG. 41 is a view of a stream identifier descriptor according to another embodiment of the present invention.

The stream identifier information includes at least one of a descriptor_tag field, a descriptor_length field, and a component_tag field.

The descriptor_tag field represents a descriptor including stream identifier information. According to a specific embodiment of the present invention, the descriptor_tag field may be an 8-bit field.

The descriptor_length field represents the length of stream identifier information after a corresponding field. According to a specific embodiment of the present invention, the descriptor_length field may be an 8-bit field.

The component_tag field represents a media component identifier for identifying a media component. At this point, the media component identifier may have a different unique value than a media component identifier of another media component on a corresponding signaling information table. According to a specific embodiment of the present invention, the component_tag field may be an 8-bit field.

An operation for transmitting/receiving a broadcast service signaling table will be described with reference to FIGS. 42 and 46.

The above broadcast service table is described as in a bitstream format but according to a specific embodiment of the present invention, a broadcast service table may be in an XML format.

FIG. 42 is a view illustrating an operation when a broadcast transmission device transmits a broadcast service signaling table according to an embodiment of the present invention.

The broadcast transmission device may include a transmission unit for transmitting a broadcast signals and a control unit for controlling operations of the broadcast transmission unit. A transmission unit may include one or more processors, one or more circuits, and one or more hardware modules, which perform each of a plurality of functions that the transmission unit performs. In more detail, the transmission unit may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one. The control unit may include one or more processors, one or more circuits, and one or more hardware modules, which perform each of a plurality of functions that the control unit performs. In more detail, the control unit may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one.

The broadcast transmission device obtains data to be contained in a transport packet and transmitted through the control unit in operation S101. The data that the broadcast transmission device transmits may be real-time content or metadata relating to real-time content. In more detail, real-time content may be a broadcast A/V content transmitted through a terrestrial broadcast network or enhancement data relating to broadcast AV content.

The broadcast transmission device determines whether data obtained through the control unit exceeds the size that a transport packet for data transmission contains in operation S103. In more detail, a transport packet that the broadcast transmission device is to use may be based on a protocol using a fixed packet length. At this point, when data to be transmitted exceeds the size that a packet covers, it is difficult to transmit data smoothly. Additionally, when data to be transmitted is very smaller than a packet, it is inefficient to transmit only a small size of one data in one packet. Accordingly, in order to overcome the inefficiency, the broadcast transmission device compares the sizes of a transport packet and data through the control unit.

If it is determined that a transport packet cannot contain the size of data that the broadcast transmission device is to transmit, the broadcast transmission device segments data to be transmitted through the control unit in operation S107. The segmented data may be divided in a plurality of transport packets and then transmitted. Then, the plurality of transport packets may additionally include information for identifying the segmented data. According to another embodiment, the information for identifying segmented data may be transmitted through additional datagram instead of a transport packet.

The broadcast transmission device packetizes data having a smaller size than segmented data or a transport packet through the control unit in operation S109. In more detail, the broadcast transmission device processes data to be in a delivery from. The processed broadcast packet may include a packet header and packet payload. Additionally, the packet payload may include data and the header of a payload. Herein, besides the packet header, the payload header is a field for signaling payload data in the packet payload.

Additionally, the packet payload including segmented data may include a segmented data header in addition to the header of a payload. Herein, besides the payload header, the segmented data header is a field for signaling payload data in the packet payload.

According to an embodiment, the broadcast transmission device may packetize one data in one packet. According to another embodiment, the broadcast transmission device may packetize a plurality of data in one packet. According to another embodiment, the broadcast transmission device may segment and packetize one data in a plurality of packets.

As mentioned above, according to the size of data or the length of a packet, a packetized transport packet may vary. Therefore, it is necessary for the broadcast transmission device to transmit different transport packets in distinguishable forms. According to an embodiment, the broadcast transmission device may packetize data by including information representing the form of a packet in the payload header of a transport packet through the control unit. According to another embodiment, when it is difficult to distinguish data to be transmitted only with information in the payload header, the control unit of the broadcast transmission device may packetize data by additionally including information for identifying the type of a transport packet.

The broadcast transmission device transmits the packetized broadcast packet through the transmission unit in operation S1111. According to an embodiment, a broadcast packet may be transmitted through a terrestrial broadcast network. According to another embodiment, a broadcast packet may be transmitted through an internet network.

FIG. 43 is a view illustrating an operation when a broadcast reception device receives a packetized broadcast packet according to an embodiment of the present invention.

The broadcast reception device 100 receives a packetized transport packet through the broadcast reception unit 110 in operation S201.

The broadcast reception device 100 extracts a payload header from the received transport packet through the control unit 150 in operation S203. The control unit 150 may obtain payload data including data and a payload header signaling the payload data from the payload of the transport packet. In more detail, the control unit 150 of the broadcast reception device 100 may extract additional information for providing at least one of a broadcast content in the packet payload and an enhancement content relating to the broadcast content, from the received transport packet.

According to an embodiment, the control unit 150 of the broadcast reception device 100 may extract at least one of payload error determination information, payload priority information, and payload type information from the payload header. In more detail, the payload error determination information represents whether there is an error in the payload in a broadcast packet or whether a corresponding payload includes a content violating a predetermined syntax.

Additionally, the priority information represents a priority of data in the payload. Additionally, the priority information represents property information of data in the payload. For example, in the case of a payload including signaling information of file format media data, the priority information of a corresponding packet is set to the highest priority.

Additionally, the payload type information represents the type of a packet payload including payload data. For example, the payload type information may represent whether the broadcast transmission device packetizes one data in one packet payload or divides and packetizes one data in a plurality of packet payloads.

The broadcast reception device 100 determines whether data in the payload is media data from information in the extracted payload header through the control unit 150 in operation S205. In more detail, the control unit 150 of the broadcast reception device 100 may determine the type of a payload in a corresponding packet on the basis of the packet header information. According to an embodiment, the type of a payload may be media data including broadcast content and an enhancement content relating to the broadcast content. According to another embodiment, the type of a payload may be metadata including additional information necessary for providing media data.

When it is determined that data in the payload is media data, the control unit 150 of the broadcast reception device 100 determines whether entire media data is included in one transport packet in operation S207. According to a specific embodiment, according to the length of a transport packet and the size of entire media data, the broadcast transmission device may packetize the entire media data in one transport packet. According to another embodiment, the broadcast transmission device may divide entire media data and packetize them in different transport packets. Accordingly, the control unit 150 of the broadcast reception device 100 may determine the type of a broadcast packet through the payload header so as to extract complete media data for content output.

On the other hand, according to an embodiment of the present invention, when the control unit 150 of the broadcast reception device 100 determines that data in the payload is not media data, this will be described in more detail with reference to FIG. 66.

When it is determined that entire media data is included in one transport packet, the control unit 150 extracts media data from one packet payload in operation S209. According to an embodiment, the control unit 150 of the broadcast reception device 100 may extract only one media data from one transport packet. According to another embodiment, the control unit 150 of the broadcast reception device 100 may extract a plurality of media data from one transport packet. On the other hand, when it is determined that entire media data is not included in a transport packet, the control unit 150 extracts media data from a plurality of packet payloads on the basis of a payload header and a segment data header in operation S211. In more detail, the control unit 150 may obtain information of divided and packetized media data from the payload header and the segment data header. Accordingly, the control unit 150 may identify divided media data according to the obtained information. That is, the control unit 150 may obtain the order of divided media data according to the obtained information. The control unit 150 may concatenate media data obtained from different transport packets on the basis of a corresponding order.

The broadcast reception device 100 provides content through the control unit 150 in operation S213. According to an embodiment, the control unit 150 may provide content on the basis of extracted media data. According to another embodiment, the control unit 150 may provide content on the basis of concatenated media data.

The control unit 150 may output A/V content. According to another embodiment, the broadcast reception device 100 may output enhancement data relating to A/V content.

FIG. 44 is a view illustrating a segment configuration according to an embodiment of the present invention.

On a packet based data transfer protocol, each packet is configured with a packet header and a packet payload as shown in FIG. 40 in general. The packet header may include information of a packet payload in a packet. The packet payload may include media data to be transmitted via a broadcast network or an internet network. Media data that the packet payload includes may be at least one of audio, video, enhancement service, and additional information.

FIG. 45 is a view illustrating a structure of a real-time transport protocol (RTP) packet for real-time content transmission according to an embodiment of the present invention.

An RTP packet may include an RTP Header and an RTP Payload. The RTP header include at least one of a Timestamp, a Synchronization source identifier, and a Contributing source identifier.

The RTP Header may include at least one of a V(version) field, a P(padding) field, an X(extension) field, a CC field, an M(Marker bit) field, a Payload Type field, a Sequence Number field, and a Timestamp field.

The V(version) field represents version information of a corresponding RTP. According to a specific embodiment of the present invention, the V(version) field may be a 2-bit field.

The P(padding) field represents whether there are padding bits in a payload. According to a specific embodiment of the present invention, the P(padding) field may be a 1-bit field.

The X(extension) field represents whether there is an extension field in the RTP Header. According to a specific embodiment of the present invention, the X(extension) field may be a 1-bit field.

The CC field represents the number of Contributing sources. According to a specific embodiment of the present invention, the CC field may be a 4-bit field.

The M(Marker bit) field may represent a different meaning according to the Payload type. For example, when a transport object is a file, the M(Marker bit) field may represent the end of the file. According to another embodiment, when a transport object is video or audio data, the M(Marker bit) field may represent the first or last object of related access units. According to a specific embodiment of the present invention, the M(Marker bit) field may be a 1-bit field.

The Payload Type field represents the type of an RTP Payload. According to a specific embodiment of the present invention, the Payload Type field may be a 7-bit field.

The Sequence Number field represents the sequence number of an RTP packet. According to a specific embodiment of the present invention, the Sequence Number field may be a 16-bit field.

The Timestamp field may represent time information relating to an RTP packet. The Timestamp field may be interpreted differently according to a value of the Payload Type field.

According to a specific embodiment of the present invention, the Timestamp field may be a 32-bit field.

RTP payload may be included in an audio/video access unit according to the payload type of RTP Header. For example, in the case of H.264, a network abstract layer (NAL) unit may be included.

FIG. 46 is a view illustrating a media file format based on an ISO base media file format (ISO BMFF) according to an embodiment of the present invention.

As shown in FIG. 46, the media file format may include one ftyp and at least one moov, moof, and mdat in general.

ftyp represents the type and suitability of a media file. Ftyp is located at the front in a media file if possible.

moov is a container for all media data. In more detail, moov is a container box for single track of presentation. Presentation may be configured with one or more tracks. Each track is separated from another track in presentation.

According to an embodiment, a track may contain media data and according to another embodiment, a track may contain information for packetized streaming protocol.

mdat is a container of media data and moof contains information on mdat.

FIG. 47 is a view illustrating a configuration of a payload header in a packet payload according to an embodiment of the present invention.

Currently, a real-time transport protocol is mostly transmitted based on an access unit of a media file. In more detail, an access unit refers to a minimum unit for transmitting a media file or data. Accordingly, there is insufficient consideration on a method of transmitting media file format based data in real-time.

According to an embodiment of the present invention, a broadcast transmission device may transmit one file format based media data through a payload included in one transport packet. In this case, the transport packet may be referred to as a single unit packet. According to an embodiment of the present invention, a broadcast transmission device may transmit a plurality of file format based media data through a payload included in one transport packet. In this case, the transport packet may be referred to as an aggregation packet. According to another embodiment of the present invention, a broadcast transmission device may divide one file format based media data into several transport packets and may then transmit them. In this case, the transport packet may be referred to as a fragmented packet. According to another embodiment of the present invention, a broadcast transmission device may transmit one or a plurality of metadata for media stream through the payload of one transport packet. According to another embodiment, the broadcast transmission device may transmit one metadata through the payloads of a plurality of transport packets.

Additionally, a broadcast transmission device according to an embodiment of the present invention may transmit media data through various protocols. The protocol may include at least one of a real-time transport protocol (RTP), an asynchronous layered coding(ALC), and a layered coding transport (LCT).

In more detail, a broadcast transmission device may insert a field representing information on a payload type in the header of a transport packet to represent that there is file format based media data in a payload through a corresponding field. For example, in the case of the RTP, the payload type field of a header may represent the data type of a payload and a specific value may be assigned to a corresponding field as a payload type value for file format based media data. Then, in this case, when data including the end of one media file is included in the payload of a packet, the M field of an RTP packet header may be set to 1.

In order to overcome the above issues, a payload header according to an embodiment of the present invention may include at least one of information representing whether there is an error or syntax error on data in a payload, information representing the priority of data, and information representing the type of data. In this case, information representing whether there is an error or syntax error on data in the payload of a payload header may be referred to as an F field. According to an embodiment, the information representing whether there is an error or syntax error on data in the payload of a payload header may be set to 1 as forbidden zero_bit when there is an error or syntax violation on data in a payload. In more detail, the information representing whether there is an error or syntax error on data in the payload of a payload header may be one bit.

Additionally, information representing the priority of data in a payload header may be referred to as an information Priority field. According to an embodiment, the information representing the priority of data is a field representing the priority of payload data. Then, the information representing the priority of data may represent whether payload data includes important metadata on a media file format.

For example, in ISO BMFF, in the case of payload data including ftyp and moov, information representing the priority of data may be set to the highest priority. According to an embodiment, information representing the priority of data may represent the highest priority highest (highest), a relatively lower priority than the highest priority (medium), and the lowest priority (low) through a control unit of a broadcast transmission device. In this case, information representing the priority of data may be set to 0x00 in the case of the highest priority, 0x01 in the case of a relatively lower priority than the highest priority, and 0x02 in the case of the lowest priority. The above setting value is just one exemplary and may be wet to another arbitrary value.

Additionally, in this case, information representing the type of data may be referred to as a type field. In more detail, through information representing the type of data, the control unit 150 of the broadcast reception device 100 may identify whether a transport packet is a packet transmitting one data by one packet, a packet transmitting a plurality of different data by one packet, or a packet transmitting data obtained by dividing one into a plurality of data.

Additionally, through information representing the type of data, the control unit 150 of the broadcast reception device 100 may identify whether a transport packet is a packet transmitting metadata including time information of content or a packet transmitting metadata including description information of content.

According to an embodiment, in the case of a packet transmitting one data by one packet, the broadcast reception device may set information representing the type of data to 0x00. Additionally, in the case of a packet transmitting a plurality of different data by one packet, the broadcast reception device may set information representing the type of data to 0x01. Additionally, in the case of a packet dividing one data and transmitting divided data, the broadcast reception device may set information representing the type of data to 0x02.

Additionally, the broadcast transmission device may packetize metadata including presentation or decoding time information of content instead of media data and may then transmit the packetized metadata. In the case the broadcast reception device may set information representing the type of data to 0x03. Moreover, the time information may be referred to as timeline data.

Additionally, the broadcast transmission device may packetize and transmit metadata including description information of content. In the case the broadcast reception device may set information representing the type of data to 0x04. Moreover, the time information may be referred to as labeling data.

However, the above setting values are just exemplary so that the present invention is not limited to the above values. According to a specific embodiment of the present invention, the type field may be a 5-bit field.

FIGS. 48 and 49 are views illustrating a payload configuration of a transport packet in which one media data is packetized in one packet.

As shown in FIG. 48, a packet in which one media data is included in one packet may be referred to as a single unit packet. The payload of a single unit packet may include a payload header and payload data. The payload data may include fragmented data including one file format based media data. According to an embodiment, when a transport protocol uses a transport packet of a fixed length, payload data may include padding bits in addition to fragmented data. Herein the padding bit refers to a bit for filling the remaining space after filling data in a transport packet.

FIG. 49 is a detailed view of a transport packet shown in FIG. 48. As shown in FIG. 49, a payload header may include at least one of information representing whether there is an error or syntax error in data in a payload, information representing the priority of data, and information representing the type of data.

As shown in FIG. 49, information representing whether there is an error or syntax error on data in a payload may include a value representing a content that there is no error and syntax violation. According to a specific embodiment of the present invention, a corresponding value may be 0.

Since a media file in payload data includes important data such as ftyp, Information representing the priority of data may have the highest priority. As mentioned above, in the case of ftyp, since ftyp includes information for signaling a media file, it may have the highest priority. According to a specific embodiment of the present invention, a value representing the highest priority may be 0x00.

Since one media file is all included in one packet payload, Information representing the type of data may represent a single unit packet. According to a specific embodiment, information representing the type of data may have a value of 0x00. Additionally, a padding bit may be selectively inserted into payload data according to the length and transport protocol of media file.

FIGS. 50 and 51 are views illustrating a configuration of a transport packet in which a plurality of media data are packetized in one packet. The above packet may be referred to as an aggregation packet. As shown in FIG. 50, when the payload of one transport packet includes a plurality of different file format based media data, payload data may include a plurality of aggregation units. Each aggregation unit may include another file format based media data. According to an embodiment, when a transport protocol uses a packet of a fixed length, payload data may include padding bits in addition to fragmented data.

According to an embodiment, one aggregation unit may include at least one of information representing the length of an aggregation unit and aggregation data. In this case, information representing the length of an aggregation unit may be referred to as an aggregation unit length field. According to a specific embodiment of the present invention, the aggregation unit may be 16 bits. Additionally, aggregation unit data represent data in one file.

FIG. 51 is a view illustrating a configuration of an aggregation unit according to another embodiment of the present invention. One aggregation unit may further include information representing the type of a file in an aggregation unit in addition to the embodiment of FIG. 50.

Information representing the type of aggregation may be referred to as an aggregation unit type field. According to a specific embodiment, the broadcast transmission device may set the aggregation type to 0x00.

According to another embodiment, the aggregation type may represent that a corresponding aggregation unit includes a file in Self-initializing Segment format on MPEG-Dynamic Adaptive Streaming over HTTP (DASH). Herein, a self-initializing segment is obtained by integrating an initializing segment and a media segment without an additional initializing segment. In more detail, the self-initializing segment may include a media segment and its media form. According to a specific embodiment, in this case, the broadcast transmission device may set the aggregation type to 0x01.

According to another embodiment, the aggregation type may represent that a corresponding aggregation unit includes a file in Initialization Segment format on MPEG-DASH. Herein, the initializing segment is a format following ISO BMFF. In more detail, the initializing segment needs to include ftyp and moov. But, it does not include moof. According to a specific embodiment, in this case, the broadcast transmission device may set the aggregation type to 0x02.

FIGS. 52 and 58 are views illustrating a payload configuration of a transport packet (hereinafter referred to as a fragmented packet) in which one media data is divided and packetized into a plurality of transport packets. FIG. 52 is a view illustrating the payload of a fragmented packet according to an embodiment of the present invention. As shown in FIG. 52, the payload of a fragmented packet may include a fragmentation unit. Additionally, when a transport protocol uses a packet of a fixed length, the payload of a fragmented packet may include padding bits.

According to an embodiment, a fragmentation unit FU may include at least one a Fragmentation unit header and Fragmentation unit data. The Fragmentation unit data may include part of one file format based media data. The Fragmentation unit header may include information of fragmentation unit data.

In more detail, the fragmentation unit header may include at least one of information representing whether fragmentation unit data includes the start part data among entire file media data, information representing whether fragmentation unit data includes the end part data among entire file media data, and information representing the type of a fragmentation unit.

According to an embodiment, the information representing whether fragmentation unit data includes the start part data among entire file media data may be referred to as a start bit field. In more detail, the start part data may be part of entire data including the first bit of entire media data.

For example, the fragmentation unit data of a corresponding payload includes start part data, the broadcast transmission device may set information representing whether fragmentation unit data includes the start part data among entire file media data to 1. In more detail, the information representing whether fragmentation unit data includes the start part data among entire file media data may be one bit.

According to an embodiment, the information representing whether fragmentation unit data includes the end part data among entire file media data may be referred to as an end bit field. In more detail, the end part data may be part of entire data including the end bit of entire media data.

For example, the fragmentation unit data of a corresponding payload includes end part data, the broadcast transmission device may set information representing whether fragmentation unit data includes the end part data among entire file media data to 1. In more detail, the information representing whether fragmentation unit data includes the end part data among entire file media data may be one bit.

According to an embodiment, information representing the type of a fragmentation unit may be referred to as a fragmentation unit type field.

According to an embodiment, a fragmentation unit type may represent that a corresponding packet indicates that a fragmentation unit includes a file format based basic file. In more detail, the file format based basic file may be a media file having a file format based on ISO BMFF. According to a specific embodiment, the broadcast transmission device may set the fragmentation unit type to 0x00.

According to another embodiment, the fragmentation unit type may represent that a corresponding fragmentation unit includes a file in Self-initializing Segment format on MPEG-DASH. According to a specific embodiment, in this case, the broadcast transmission device may set the fragmentation unit type to 0x01.

According to another embodiment, the fragmentation unit type may represent that a corresponding fragmentation unit includes a file in Initialization Segment format on MPEG-DASH. According to a specific embodiment, in this case, the broadcast transmission device may set the fragmentation unit to 0x02.

According to another embodiment, the fragmentation unit type may represent that a corresponding fragmentation unit includes a file in media Segment format on MPEG-DASH. According to a specific embodiment, in this case, the broadcast transmission device may set the fragmentation unit to 0x03.

In more detail, information representing a fragmentation unit type may be six bits.

FIG. 53 is a view illustrating a configuration of a payload in a fragmented packet according to another embodiment of the present invention. The embodiment of FIG. 53 may be applied to the case there is no information relating to the order of a transport packet in the header therein.

As shown in FIG. 53, the fragmentation unit header in a fragmentation unit FU may include at least one of information representing whether fragmentation unit data includes the start part data among entire file media data, information representing whether fragmentation unit data includes the end part data among entire file media data, information representing the type of a fragmentation unit, and information representing the order in entire data of a fragmentation unit. Among the information, the remaining information other than the information representing the order of a fragmentation unit is identical to that described with reference to FIG. 52.

The information representing the order of a fragmentation unit may be referred to as a fragmentation number field. In more detail, when file format based media data is divided into a plurality of fragmented packets, the broadcast transmission device may set a value to the information representing the order of a fragmentation unit to assign the order of a corresponding packet. According to a specific embodiment of the present invention, the Fragmentation number field may be an 8-bit field.

FIG. 54 is a view when a broadcast transmission device fragments an ISO BMFF based media file into a plurality of packets. As shown in FIG. 54, in ISO BMFF based media file may include ftyp and moov, and a plurality of moof and mdat.

The broadcast transmission device may divide an ISO BMFF based media file into a plurality of files and may then include them in different fragmentation unit data. Additionally, the broadcast transmission device may include related information in a payload header by dividing an ISO BMFF based media file.

FIG. 55 is a view illustrating first fragmentation unit data packetized by the broadcast transmission device of FIG. 54.

As shown in FIG. 55, according to an embodiment of the present invention, the broadcast transmission device determines that there is no error or syntax error in a corresponding packet and sets the F field to 0.

Additionally, the broadcast transmission device may set the Priority field to a value representing the highest priority. According to a specific embodiment of the present invention, a corresponding value may be 0x00.

Additionally, the broadcast transmission device may set the Type field to a value representing a packet for dividing one file format based media file into several payloads and transmitting them. According to a specific embodiment of the present invention, a corresponding value may be 0x02.

The payload data may include a fragmentation unit. Again, the fragmentation unit may include a Start bit field, an End bit field, a fragmentation unit type field, and a fragmentation unit data field.

The broadcast transmission device may set the Start bit field to a value representing a content that a corresponding packet includes the start data of a media file. In more detail, since a first fragmentation unit includes the start data of media data as shown in FIG. 54, the broadcast transmission device may set a value representing a corresponding content to the start bit field.

Moreover, the broadcast transmission device may set the End bit field of a first fragmentation unit shown in FIG. 55 to a value representing a content that the end data of a media file is not included. According to a specific embodiment, the broadcast transmission device may set the End bit field to 0 to represent a content that a corresponding packet does not include the end data of a media file.

Moreover, as shown in FIG. 55, the broadcast transmission device may set the fragmentation unit type field to a value representing a content that the first fragmentation unit includes a file format based basic form of file. In more detail, the file format based basic form may be file format data following ISO BMFF. According to a specific embodiment, the broadcast transmission device may set the fragmentation unit type field to 0x00 to represent corresponding content.

FIGS. 56 to 58 are views illustrating a fragmentation unit including remaining data except for the start data in the fragmentation unit data of FIG. 54 according to an embodiment of the present invention.

As shown in FIG. 56, according to an embodiment of the present invention, the broadcast transmission device may set the F field of a payload header to a value representing that there is no error or syntax error in a corresponding packet. According to a specific embodiment, the broadcast transmission device may set the F field to 0. Additionally, the broadcast transmission device sets the Priority field to a value representing the payload data shown in FIG. 56 has a relatively low priority.

According to a specific embodiment, data signaling entire media data may not be included from a second fragment unit.

Accordingly, since the second fragmentation unit has a relatively lower priority than the first fragmentation unit, the priority field may be set to a value having a relatively lower priority. For example, a corresponding value may be 0x01.

Additionally, the broadcast transmission device may set the Type field to 0x02 as a Fragmented packet that a corresponding packet represents a packet dividing one file format based media file into several payloads and transmitting them. FIG. 57 is a view illustrating a payload configuration when payload data does not include fragmentation unit data including start data and fragmentation unit data including end data.

According to an embodiment of the present invention, since the fragmentation unit data of FIG. 57 does not include start data and end data, the broadcast transmission device may set the start bit field and the end bit field to a value representing corresponding information. According to a specific embodiment, the broadcast transmission device may set the start bit and end bit fields to 0.

Additionally, the broadcast transmission device may set the content that a fragmentation unit type field includes a file format based basic form of file to a specific value of a fragmentation unit type field. In more detail, the file format based basic form may be file format data following ISO BMFF. According to a specific embodiment, the broadcast transmission device may set the fragmentation unit type field to 0x00 to represent corresponding content. File format based media data divided into packets may have a unique order from an entire file. The broadcast reception device 100 may identify that the fragmentation unit data divided through the control unit 150 includes the start part among entire data on the basis of the start bit field. Additionally, the fact that the fragmentation unit data includes the end part in entire data may be identified on the basis of the End bit field. However, there may be a case that cannot be identified only by the Start bit field and the End bit field.

When the fragmentation unit data does not include start data or end data in entire data, the broadcast reception device 100 may identify a corresponding packet through information representing the order of the fragmentation unit data included in a payload according to an embodiment. In more detail, information representing the order of fragmentation unit data may be a fragmentation number field. Additionally, a broadcast transmission device may set the order of corresponding fragmentation unit data to the above-mentioned presentation field.

However, according to another embodiment, a transport packet may not include order information of fragmentation unit data. In this case, according to an embodiment, a broadcast transmission device may insert information for identifying the order of fragmentation unit data into a packet header. The information for identifying the order of fragmentation unit data into a packet header may be referred to as a sequence number field. According to another embodiment, a broadcast transmission device may insert information for identifying the order of fragmentation unit data into offset information of an IP datagram.

FIG. 58 is a view illustrating a configuration of a payload including a fragmentation unit including the end data among divided entire media data. In more detail, FIG. 58 is a view illustrating a payload configuration when payload data does not include fragmentation unit data including start data but includes fragmentation unit data including end data.

According to an embodiment of the present invention, since the fragmentation unit data of FIG. 58 includes end data, the broadcast transmission device may set the start bit field and the end bit field to a value representing corresponding information. According to a specific embodiment, the broadcast transmission device may set the start field to 0. Then, the broadcast transmission device may set the end bit field to 1.

Additionally, a broadcast transmission device may set the fragmentation unit type field to represent the content that media data including a corresponding packet includes a basic form of file starting from ISO BMFF based ftyp. According to a specific embodiment, a broadcast transmission device may set the fragmentation unit type field to 0x00.

Data that a broadcast transmission device transmits through a transport packet may include metadata in addition to the above-mentioned media data.

The metadata represents additional information necessary for providing media data. Hereinafter, referring to FIGS. 59 to 66, suggested are a broadcast transmission device and an operating method thereof, and a broadcast reception device and an operating method thereof, in order for packetizing metadata in a transport packet and transmitting and receiving it.

Additionally, hereinafter, timeline information is mainly described as one example of metadata. The timeline information is a series of time information for media content. In more detail, the timeline information may be a series of time information for presentation or decoding.

Additionally, the timeline information may include base timeline information. The basic timeline means a reference timeline necessary for synchronizing media data transmitted through a plurality of different transmission networks. In more detail, when the timeline of media data transmitted through a second transmission network is mapped into the timeline of media data transmitted through a first transmission network, the timeline of the media data transmitted through the first transmission network becomes a basic timeline.

Moreover, the broadcast transmission device may express the metadata in XML format. Additionally, the broadcast transmission device may express the metadata in a descriptor format includable in a signaling table.

FIG. 59 is a view illustrating a timeline signaling table of metadata according to an embodiment of the present invention.

According to an embodiment of the present invention, the timeline signaling table may include information representing metadata relating to a timeline or information that corresponding metadata includes a timeline component access unit. The above information may be referred to as an identifier field. According to a specific embodiment of the present invention, the identifier field may be an 8-bit field.

Additionally, according to an embodiment of the present invention, the timeline signaling table may include information representing the length of timeline information of a timeline component access unit. The above information may be referred to as an AU_length field. According to a specific embodiment of the present invention, the AU_length field may be a 32-bit field.

Additionally, according to an embodiment of the present invention, the timeline signaling table may include information on whether including location information on services and content components relating to a timeline component access unit. The above information may be referred to as a location_flag field. According to a specific embodiment of the present invention, the location_flag field may be a 1-bit field.

Additionally, according to an embodiment of the present invention, the timeline signaling table may include version information of a timestamp in a timeline component access unit. The timestamp represents time information through which a corresponding access unit needs to be outputted in a continuous timeline. The above information may be referred to as a timestamp_version field. According to a specific embodiment of the present invention, the timestamp_version field may be a 1-bit field.

Additionally, according to an embodiment of the present invention, the timeline signaling table may include timestamp type information of a timeline component access unit. The above information may be referred to as a timestamp_type field.

According to an embodiment, the timestamp type information may be set to a value representing a decoding time of a service or content component relating to a timeline component access unit. In more detail, the decoding time of a content component may be referred to as a decoding timestamp. According to a specific embodiment, the broadcast transmission device may set timestamp type information to 0x00 when corresponding information represents a decoding time.

According to another embodiment, the timestamp type information may be set to a value representing the presentation time of a service or content component relating to a timeline component access unit. In more detail, the presentation time of a content component may be referred to as a presentation timestamp. According to a specific embodiment, the broadcast transmission device may set timestamp type information to 0x01 when corresponding information represents a presentation time.

Moreover, according to a specific embodiment of the present invention, the timestamp_type field may be a 1-bit field.

Additionally, according to an embodiment of the present invention, the timeline signaling table may include timestamp format information of a timeline component access unit. The above information may be referred to as a timestamp_format field.

According to an embodiment, the timestamp format information may represent that a timestamp in a timeline component access unit is a format of a media time. According to a specific embodiment, the broadcast transmission device may set the timestamp_format field to 0x00 to represent that the timestamp format of a corresponding access unit is a media time format.

According to another embodiment, the timestamp format information may represent that a timestamp in a timeline component access unit is a format of a Network time protocol (NTP). According to a specific embodiment, the broadcast transmission device may set the timestamp_format field to 0x01 to represent that the timestamp format of a corresponding access unit is an NTP format.

According to another embodiment, the timestamp format information may represent that a timestamp in a timeline component access unit is a format of a precision time protocol (PTP). According to a specific embodiment, the broadcast transmission device may set the timestamp_format field to 0x02 to represent that the timestamp format of a corresponding access unit is a PTP format.

According to another embodiment, the timestamp format information may represent that a timestamp in a timeline component access unit is a format of a timecode. According to a specific embodiment, the broadcast transmission device may set the timestamp_format field to 0x03 to represent that the timestamp format of a corresponding access unit is a timecode format. Moreover, according to a specific embodiment of the present invention, the timestamp_format field may be a 4-bit field.

Additionally, according to an embodiment of the present invention, the timeline signaling table may include location information on a component of service or content relating to information in a timestamp in a timeline component access unit. The above information may be referred to as a location field.

Additionally, according to an embodiment of the present invention, the timeline signaling table may include information representing the length of the location information. The information representing a location information length may be referred to as a location_length field. According to a specific embodiment of the present invention, the location_length field may be an 8-bit field.

Additionally, according to an embodiment of the present invention, the timeline signaling table may include timestamp format version information of a basic timestamp that is a matching reference. The above information may be referred to as an origin_timestamp_version field.

According to an embodiment, when the origin_timestamp_version field is set to 0, this represents that a timestamp format has a 32-bit format. According to another embodiment, when the origin_timestamp_version field is set to 1, this represents that a timestamp format has a 64-bit format.

Additionally, according to an embodiment of the present invention, the timeline signaling table may include timestamp type information of a basic timeline. The above information may be referred to as an origine_timestamp_type field.

According to an embodiment, the origine_timestamp_type field may be set to a value representing a decoding time of a service or content component relating to a basic timeline. In more detail, the decoding time of a content component may be referred to as a decoding timestamp. According to a specific embodiment, the broadcast transmission device may set the origine_timestamp_type field to 0x00 when corresponding information represents a decoding time.

According to another embodiment, the origine_timestamp_type field may be set to a value representing a presentation time of a service or content component relating to a basic timeline. In more detail, the presentation time of a content component may be referred to as a presentation timestamp. According to a specific embodiment, the broadcast transmission device may set the origine_timestamp_type field to 0x01 when corresponding information represents a presentation time.

Additionally, according to an embodiment of the present invention, the timeline signaling table may include information representing a timestamp format for a base timeline. The above information may be referred to as an origine_timestamp_format field.

According to an embodiment, the origin_timestamp_format field may represent that a timestamp of a basic timeline is a format of a media time. According to a specific embodiment, the broadcast transmission device may set the origin_timestamp_format field to 0x00 to represent that the timestamp format of a corresponding basic timeline is a media time format.

According to another embodiment, the origin_timestamp_ format field may represent that a timestamp of a basic timeline is a format of an NTP. According to a specific embodiment, the broadcast transmission device may set the origin_timestamp_format field to 0x01 to represent that the timestamp format of a corresponding basic timeline is an NTP format.

According to another embodiment, the origin_timestamp_ format field may represent that a timestamp of a basic timeline is a format of a precision time protocol (PTP). According to a specific embodiment, the broadcast transmission device may set the timestamp_format field to 0x02 to represent that the timestamp format of a corresponding basic timeline is a PTP format.

According to another embodiment, the origin_timestamp_ format field may represent that a timestamp of a basic timeline is a format of a timecode. According to a specific embodiment, the broadcast transmission device may set the origin_timestamp_format field to 0x03 to represent that the timestamp format of a corresponding basic timeline is a timecode format.

Additionally, according to an embodiment of the present invention, the timeline signaling table may include information on whether including location information on services and content components relating to a basic timeline that is a timeline mapping reference. The above information may be referred to as an origin_location_flag field. According to an embodiment, when the origin_location_flag field is set to a value other than 0, a timeline AU may include at least one of an origin_location_length field and an origin_location field.

Additionally, according to an embodiment of the present invention, the timeline signaling table may include location information on a service or content relating to a basic timeline. The above information may be referred to as an origin_location field. According to a specific embodiment, information in the origin_location field may be an IP address, a port number, or a URI form.

Additionally, according to an embodiment of the present invention, the timeline signaling table may include length information of position information on a service or content relating to a basic timeline. The above information may be referred to as an origin_location_length field. According to a specific embodiment of the present invention, the origin_location_length field may be an 8-bit field.

Additionally, according to an embodiment of the present invention, when a basic timeline that the reference of timeline mapping is a format of a media time, the timeline signaling table may include information of an available time scale. The above information may be referred to as an origin_timescale field. For example, in the case of MPEG-2 TS, the time scale may represent 9000 Hz. According to a specific embodiment of the present invention, the origin_timescale field may be a 32-bit field.

Additionally, according to an embodiment of the present invention, the timeline signaling table may include media time information on a basic timeline. The above information may be referred to as an origin_media_time field. Moreover, the origin_media_time field may mean differently according to origin_timestamp_type. For example, when origin_timestamp_type means PTS, the origin_media_time field may represent a presentation time. For example, when origin_timestamp_type means DTS, the origin_media_time field may represent a decoding time. According to a specific embodiment, the origin_media_time field may be 32 bits when the origin_timestamp_version field is set to 0 and may be 64 bits when the origin_timestamp_version field is set to 1.

Additionally, according to an embodiment of the present invention, the timeline signaling table may include timestamp type information of a basic timeline. The above information may be referred to as an origin_timestamp field. The basic timeline timestamp information may represent different formats of timestamps according to a value of the origin_timestamp_format field. Additionally, the basic timeline timestamp information may represent different meanings according to a value of the origin_timestamp_type field. For example, when origin_timestamp_type signals PTS, the basic timeline timestamp information may represent a presentation time.

For example, when the origin_timestamp_type field represents DTS and the origin_timestamp_format field is 0x01, the corresponding origin_timestamp field may represent a decoding time expressed in NTP. According to a specific embodiment, the origin_timestamp field may be 32 bits when the origin_timestamp_version field is set to 0 and may be 64 bits when the origin_timestamp_version field is set to 1.

According to an embodiment, when the origin_timestamp_format field represents reserved, a timeline AU may include at least one of a private_data_length field and a private_data_bytes( ) field.

The private_data_length field may represent the byte unit length of the private_data_bytes( ) field. According to a specific embodiment of the present invention, the private_data_length field may be a 16-bit field.

The private_data_bytes( ) field may define by the length that the private_data_length field represents or may include future expansion content.

FIG. 60 is a view illustrating a configuration of payload data in which one metadata is packetized in payload data of a transport packet. According to an embodiment, the payload data may include metadata and the metadata may include media stream related timeline data. Additionally, according to an embodiment, when a broadcasts transmission device uses a packet of a fixed length in a transport protocol, payload data may include a padding bit additionally.

FIG. 61 is a view when payload data of a transport packet includes metadata for a timeline according to an embodiment of the present invention.

As shown in FIG. 61, according to an embodiment, the payload header may include at least one of an F field, a Priority field, and a Type field.

According to an embodiment, a broadcast transmission device may set the F field to a value representing there is no error or syntax violation in a payload. In more detail, the broadcast transmission device may set the F field to 0. Additionally, the broadcast transmission device may set the Priority field to a value representing the highest priority as payload data includes all important data of a media file configuration. In more detail, the broadcast transmission device may set the Priority field to 0x00. Additionally, the broadcast transmission device may set the Type field to a value representing information including metadata of timeline information in a payload. In more detail, the broadcast transmission device may set the Type field to 0x03. Additionally, the metadata may include the syntax of FIG. 59.

FIG. 62 is a view when a plurality of metadata are packetized in one transport packet.

As shown in FIG. 62, the case that one transport packet includes a plurality of metadata may be referred to as an aggregation packet. According to an embodiment, the payload data may include a plurality of aggregation units.

According to an embodiment, the aggregation unit may include information representing the length of metadata. According to another embodiment, when there is a metadata header field additionally, the aggregation unit may include information on the sum of a metadata header field and a metadata field length. The above information may be referred to as a metadata length field.

FIG. 63 is a view when one transport packet includes several timeline information. In more detail, FIG. 63 illustrates the case that one transport packet includes a plurality of timeline information having different references in relation to one media stream. According to an embodiment, a transport packet may include a payload header and a content of the payload header is identical to that of FIG. 62.

Additionally, according to an embodiment, the payload data may include two aggregation units. However, the number of aggregation units in payload data may be two or more.

According to an embodiment, as shown in FIG. 62, each aggregation unit may include at least one of a metadata length field, a metadata header field, and a metadata field including timeline information.

However, the first aggregation unit shown in FIG. 63 may include a metadata field including a first timeline and the second aggregation unit may include a metadata field including a second timeline. According to a specific embodiment, each timeline may have data based on different references. For example, the first timeline may have data based on a media time and the second timeline may have data based on NTP.

FIG. 64 is a view illustrating a packet payload in which one metadata is divided and packetized in a plurality of transport packets.

According to an embodiment, when the length of one metadata is greater than the length of a transport packet, in this case, a broadcast transmission device may divide corresponding metadata in several transport packets and may then transmit them. As shown in FIG. 64, a transport packet may include at least one of a payload header, a metadata fragment header, and a metadata fragment. Additionally, when a transport protocol uses a packet of a fixed length, a transport packet may include padding bits.

As shown in FIG. 64, according to an embodiment, a metadata fragment header may include information representing whether a metadata fragment in payload data of a corresponding transport packet includes the start part of entire metadata. In more detail, the start part data may be part of entire data including the first bit of entire media data. The above information may be referred to as a start bit field. According to a specific embodiment of the present invention, the start bit field may be a 1-bit field. According to an embodiment, the broadcast transmission device may set start bit to 1 when a metadata fragment in a corresponding transport packet includes the start part of entire metadata.

According to another embodiment, a metadata fragment header may include information representing whether a metadata fragment in payload data of a corresponding transport packet includes the end part of entire metadata. In more detail, the end part data may be part of entire data including the end bit of entire media data. The above information may be referred to as an end bit field. According to a specific embodiment of the present invention, the end bit field may be a 1-bit field. According to an embodiment, the broadcast transmission device may set end bit to 1 when a metadata fragment in a corresponding transport packet includes the end part of entire metadata.

According to another embodiment, the metadata header may include information representing a metadata type. The above information may be referred to as a metadata type field. According to a specific embodiment, the metadata type may represent that a corresponding metadata fragment includes timeline information. In this case, the broadcast transmission device may set the metadata type field to 0x00. According to another embodiment, the metadata type may represent that a corresponding metadata fragment includes metadata relating to labeling. In this case, the broadcast transmission device may set the metadata type field to 0x01. According to a specific embodiment of the present invention, the metadata type field may be a 5-bit field.

FIG. 65 is a view illustrating a metadata fragment header according to another embodiment of the present invention. Hereinafter, description for the same content as that of FIG. 64 is omitted.

According to an embodiment of the present invention, a metadata fragment header may include information representing the order of a metadata fragment in a corresponding packet payload. The above information may be referred to as a Fragmentation number field. The broadcast reception device 100 may determine which number metadata is included in a corresponding packet on the basis of metadata fragment order information in a packet payload.

FIG. 66 is a view illustrating an operation when a broadcast reception device receives a broadcast packet according to an embodiment of the present invention.

When it is determined that the data in the payload is not the media data in operation S205 of FIG. 43, the control unit 150 of the broadcast reception device 100 determines whether entire metadata is included one transport packet in operation S301. In more detail, the control unit 150 may determine that data in a payload is not metadata instead of media data from payload header information. Then, the control unit 150 may determine whether corresponding entire metadata is included in one transport packet and transmitted. As mentioned above, one or more different metadata may be included in one transport packet. Or, one metadata is divided and included in a plurality of different transport packets.

According to an embodiment of the present invention, when the control unit 150 of the broadcast reception device 100 determines that entire metadata is included in one transport packet, the control unit 150 extracts metadata from one packet payload in operation S303. In more detail, the control unit 150 extracts a payload header and extracts metadata on the basis of the extracted payload header. According to an embodiment, the control unit 150 may extract one metadata from one packet payload. Moreover, according to another embodiment, the control unit 150 may extract a plurality of metadata from one packet payload. According to another embodiment of the present invention, the control unit 150 of the broadcast reception device 100 may determine that one metadata is divided and included in a plurality of transport packets. In this case, the control unit 150 extracts metadata from a plurality of packets payloads in operation S305. According to a specific embodiment, one metadata may be divided and packetized in a plurality of transport packets. The control unit 150 of the broadcast reception device 100 obtains metadata signaling data from a packet payload. Then, the control unit 150 may extract metadata from a plurality of packet payloads on the basis of the obtained signaling data.

The control unit 150 of the broadcast reception device 100 provides content on the basis of the extracted metadata in operation S307. According to a specific embodiment, the control unit 150 may obtain the presentation or decoding time information of a content from metadata. According to another embodiment, the control unit 150 may obtain content describing information from metadata.

FIG. 67 is a view when video stream is transmitted using RTP through broadcast network and video stream is transmitted using file format based media data through an internet network. In this case, after receiving an RTP packet or IP/UDP packet including timeline related metadata, the broadcast reception device 100 may allow decoding and presentation between related streams by matching an RTP protocol based video stream and a DASH based video stream.

As mentioned above, a conventional broadcast transmission device loads time information relating to the presentation of data (or object) included in a transport packet into a payload and transmits the payload. Or, the broadcast transmission device transmits additional signaling for transmitting time information. In the case of a conventional method, since time information is loaded into an additional transport packet or packet payload, the capacity of a packet header or the capacity of a transport become small relatively. However, in the case of a conventional method, since time information is transmitted through a packet separated from data to be transmitted, effectiveness may be reduced in terms of accurate and fast synchronization.

On the other hand, an embodiment of the present invention includes time information relating to the decoding or presentation of a corresponding packet in the packet header of a transport packet for supporting real time content. Accordingly, since time information of a corresponding packet is included in the header of a corresponding packet, compared to a conventional method, relatively accurate and fast synchronization is possible. Especially, according to an embodiment of the present invention, suggested is a content of packetizing a transport packet by setting the time information relating to decoding or presentation in the header extension in the packet header. Herein, the header extension may be part of the packet header including a selective header field that is not essential or has a changeable size. Or, a transport packet may be generated based on an object and accordingly, the object may be a target to be transmitted through a transport packet. The object may be included in a session and transmitted.

FIG. 68 is a view illustrating a configuration of a transport packet according to an embodiment of the present invention. The transport packet shown in FIG. 68 may use a transport protocol for supporting reliable data transmission. According to a specific embodiment, a reliable data transmission protocol may be Asynchronous Layered Coding (ALC). According to another embodiment, a reliable data transmission protocol may be Layered Coding Transport (LCT).

A packet header according to an embodiment of the present invention may include version information of a packet. In more detail, the packet header may include version information of a transport packet using a corresponding transport protocol. According to a specific embodiment, the information may be a V field. Additionally, the V field may be a 4-bit field.

Additionally, a packet header according to an embodiment of the present invention may include information relating to the length of information for congestion control. In more detail, the packet header may include multiple information relating to the multiplication of the length of information for congestion control and a base unit thereof. According to a specific embodiment, the information may be a C field. According to an embodiment, the C field may be set to 0x00 and in this case, represents that the length of information for congestion control is 32 bits. According to another embodiment, the C field may be set to 0x01 and in this case, represents that the length of information for congestion control is 64 bits. According to another embodiment, the C field may be set to 0x02 and in this case, represents that the length of information for congestion control is 96 bits. According to another embodiment, the C field may be set to 0x03 and in this case, represents that the length of information for congestion control is 128 bits. The C field may be a 2 bit field.

Additionally, a packet header according to an embodiment of the present invention may include information specified for protocol. According to a specific embodiment, the information may be a PSI field. Additionally, the PSI field may be a 2-bit field.

Additionally, a packet header according to an embodiment of the present invention may include information relating to the length of a field representing identification information of a transport session. In more detail, the packet header may include multiple information of a field representing identification information of a transport session. The above information may be referred to as an S field. The S field may be a 1 bit field.

Additionally, a packet header according to an embodiment of the present invention may include information relating to the length of a field representing identification information of a transport object. In more detail, the packet header may include multiple information multiplied to the base length of a field representing identification information of a transport object. The above information may be referred to as an 0 field. The 0 field may be a 2 bit field.

Additionally, a packet header according to an embodiment of the present invention may include additional information relating to the length of a field representing identification information of a transport session. Then, the packet header may include additional information relating to the length of a field representing identification information of a transport object. The additional information may be information on whether to add half-word. Since a field representing identification information of a transport packet and a field representing identification information of a transport object should exist, the S field and the H field, or the 0 field and the H field cannot represent zero at the same time.

Additionally, a packet header according to an embodiment of the present invention may include information representing that a session is terminated or the end is imminent. The above information may be referred to as an A field. According to a specific embodiment, when the A field represents session termination or imminent end, it may be set to 1. Accordingly, in typical cases, the A field may be set to 0. When a broadcast transmission device set the A field to 1, it represents that the last packet is transmitted through a session. When the A field is set to 1, the broadcast transmission device may need to maintain the A field as 1 until all packets following a corresponding packet are transmitted completely. Additionally, when the A field is set to 1, a broadcast reception device may recognize that the broadcast transmission device stops packet transmission through a session immediately. That is, when the A field is set to 1, the broadcast reception device may recognize that there is no more packet transmission through a session. According to an embodiment, the A field may be a 1-bit field.

Additionally, a packet header according to an embodiment of the present invention may include information representing that object transmission is terminated or the end is imminent. The above information may be referred to as a B field. According to a specific embodiment, when object transmission termination is imminent, a broadcast transmission device may set the B field to 1. Accordingly, in typical cases, the B field may be set to 0. When information for identifying a transport object is not in a transport packet, the B field may be set to 1. Then, it may represent that object transmission termination in a session identified by out-of-band information is imminent. Or, when the last packet for an object is transmitted, the B field may be set to 1. Or, when the last packet for an object is transmitted, the B field may be set to 1. When the B field of a packet for a specific object is set to 1, the broadcast transmission device may need to set the B field to 1 until the transmission of packets following a corresponding packet is terminated. Additionally, when the B field is set to 1, a broadcast reception device 100 may recognize that the broadcast transmission device is to stop the transmission of a packet for object. That is, the broadcast reception device 100 may recognize that there is no more object transmission through a session from the B field set to 1. According to an embodiment, the B field may be a 1-bit field.

Additionally, a packet header according to an embodiment of the present invention may include information representing the total length of a header. The above information may be referred to as an HDR_LEN field. The HDR_LEN field may be a 32 multiple bit field. According to a specific embodiment, when HDR_LEN field is set to 5, the total length of a packet header may be 160 bits that are five multiples of 32. Additionally, the HDR_LEN field may be an 8-bit field.

Additionally, a packet header according to an embodiment of the present invention may include information relating to encoding or decoding of a payload included in a corresponding packet. The above information may be referred to as a Codepoint field. According to an embodiment, the Codepoint field may be an 8-bit field.

Additionally, a packet header according to an embodiment of the present invention may include information for congestion control. The above information may be referred to as a Congestion Control Information (CCI) field. According to a specific embodiment, the CCI field may include at least one of a Current time slot index (CTSI) field, a channel number field, and a packet sequence number field.

Additionally, a packet header according to an embodiment of the present invention may include information for identifying a transport session. The above information may be a Transport Session Identifier (TSI). Additionally, a field in a packet header including TSI information may be referred to as a TSI field.

Additionally, a packet header according to an embodiment of the present invention may include information for identifying an object transmitted through a transport session. The above information may be a Transport Object Identifier (TOI). Additionally, a field in a packet header including TOI information may be referred to as a TOI field.

Additionally, a packet header according to an embodiment of the present invention may include information for transmitting additional information. The above information may be referred to as a Header Extension field. According to an embodiment, the additional information may be time information relating to the presentation of a transport object. According to another embodiment, the additional information may be time information relating to the decoding of a transport object.

Additionally, a packet header according to an embodiment of the present invention may include payload identification information. According to an embodiment, the identification information may be payload identification information relating to a Forward Error Correction (FEC) scheme. Herein, the FEC may be one type of payload format defined in RFC 5109. The FEC may be used in RTP or SRTP. The above information may be referred to as an FEC Payload ID field.

According to an embodiment, the FEC Payload ID field may include information for identifying a source block of an object. The above information may be referred to as a Source block number field. For example, when the Source block number field is set to N, source blocks in an object may be numbered with 0 to N−1.

According to another embodiment, the FEC Payload ID field may include information for identifying a specific encoding symbol. The above information may be referred to as an Encoding symbol ID field.

Additionally, a transport packet according to an embodiment of the present invention may include data in a payload. The field including data may be referred to as an Encoding symbol(s) field. According to an embodiment, the broadcast reception device 100 may reconfigure an object by extracting the Encoding symbol(s) field. In more detail, data in the Encoding symbol(s) field may be generated from a source block transmitted through a packet payload.

FIG. 69 is a view illustrating a configuration of a packet header according to an embodiment of the present invention.

In order to support the transmission of real time content, it is effective that a transport packet received by the broadcast reception device 100 includes property information of a packet and timing information relating to decoding or presentation. Accordingly, in order to solve the above issue, as shown in FIG. 69, a packet header may be configured.

The packet header of FIG. 69 has a configuration mostly similar to that of the packet header of FIG. 68. Therefore, description of the same parts will be omitted.

A packet header according to an embodiment of the present invention may include information representing the type of an object for transmission. The above information may be referred to as a type field. The type field may be a 2 bit field.

According to a specific embodiment, the type field may represent that the type of an object for transmission is a regular file. Herein, the regular file may be an ISO BMFF based media file. In more detail, the regular file may be obtained by encapsulating a media file in ISO BMFF format. In this case, the type field may be set to 01(2). According to another embodiment, the type field may represent that the type of an object for transmission is an HTTP entity type. In this case, the type field may be set to 10(2). According to another embodiment, the type field may represent that the type of an object for transmission is an audio access unit or a video access unit. Additionally, the type field may represent that an object type is a network abstract layer (NAL) unit. In this case, the type field may be set to 11(2).

Additionally, a packet header according to an embodiment of the present invention may represent that a corresponding transport packet includes the first part or end part of a transport object. Information representing that a transport packet includes the first part or end part of a transport object may be a marker bit. According to a specific embodiment, the marker bit may be an M field. In more detail, the M field may be interpreted differently according to a value of the type field. For example, when the type of an object for transmission is a file, it may represent that a corresponding transport packet includes the end part of a file. Herein, the end part is part including the last bit of a file. For another example, when the type of an object for transmission is Audio or Video (AV) data, it may represent that a corresponding transport packet includes the first or last bit of an access unit.

FIGS. 70 and 71 are views illustrating a configuration of a header extension including time information. The header extension shown in FIGS. 70 and 71 may included in the header extension field shown in FIG. 69.

As shown in FIG. 70, a header extension according to an embodiment of the present invention may include type information of a header extension. The above information may be referred to as a Header Extension Type (HET) field.

Additionally, a header extension according to an embodiment of the present invention may include the length information of the header extension. The above information may be referred to as a Header Extension length (HEL) field.

Additionally, a header extension according to an embodiment of the present invention may represent the current time of a broadcast transmission device. That is, the header extension may include corresponding packet transmission time information of a broadcast transmission device. For example, the broadcast transmission device may be a server.

According to a specific embodiment, information representing the current time of a broadcast transmission device may be a Sender Current Time (SCT) field.

Additionally, a header extension according to an embodiment of the present invention may represent whether the SCT field is a 64 bit field. In more detail, the header extension may represent whether the SCT field is included in a header extension configured with 64 bits. According to a specific embodiment, information representing whether the SCT field is 64 bits may be an SCT Hi field.

Additionally, a header extension according to an embodiment of the present invention may represent whether the SCT field is a 32 bit field. In more detail, the header extension may represent whether the SCT field is included in a header extension configured with 32 bits. According to a specific embodiment, information representing whether the SCT field is 32 bits may be an SCT Low field.

Additionally, a header extension according to an embodiment of the present invention may include expected residual time information of an object for transmission. The above information may be an Expected Residual Time (ERT) field.

Additionally, a header extension according to an embodiment of the present invention may represent whether the ERT field exits in a corresponding packet. Corresponding information may be an ERT flag field.

Additionally, a header extension according to an embodiment of the present invention may include information on a time at which a session is changed lastly. The above information may be an SLC field.

Additionally, a header extension according to an embodiment of the present invention may represent whether the SLC field exits in a corresponding packet. Corresponding information may be an SLC flag field.

Additionally, a header extension according to an embodiment of the present invention may include a field extended and used according to a transport protocol that a broadcast transmission device uses. Corresponding information may be a PI-specific Use field.

FIG. 71 is a view illustrating a header extension having an added configuration according to another embodiment of the present invention.

A header extension according to another embodiment of the present invention may include timing information of data included in a packet payload. The above information may be a Timestamp field. For example, the Timestamp field may include information on a time point at which the first byte of data included in a packet payload is decoded. For another example, the Timestamp field may include information on a presentation time point of data. Furthermore, the Timestamp field may include timescale information or timescale based timing information. Herein, the timescale information may be a unit representing a time for a decoding or presentation time point of a transport object. In the case of timescale based timing information, the broadcast reception device may obtain information a decoding or presentation time point by multiplying a value of the Timestamp field and a timescale.

A header extension according to another embodiment of the present invention may include format information of a Timestamp field. The above information may be a TS format field. According to a specific embodiment, the TS format field may represent that timing information included in a transport packet is in the format of media time. The media time is a media presentation time according to an arbitrary media timeline. In this case, the TS format field may be set to 0x01. Additionally, the TS format field may represent that timing information included in a transport packet is in the format of Network Time Protocol (NTP). In this case, the TS format field may be set to 0x02. Additionally, the TS format field may represent that timing information included in a transport packet is in the format of normal playing time. The format of normal playing time may be a playing time expressed relative from a presentation start time point and may be expressed in hour, minute, second, or second decimal point unit. In this case, the TS format field may be set to 0x03. Additionally, the TS format field may represent that timing information included in a transport packet is in the format of SMPTE time code. Society of Motion Picture and Television Engineers (SMPTE) time code is time code defined in SMPTE. In more detail, the SMPTE time code may be a time information format defined for individual frame labeling of video in SMPTE. In this case, the TS format field may be set to 0x04. Additionally, the TS format field may represent that timing information included in a transport packet is 90 KHz timing information. In this case, the TS format field may be set to 0x05.

A header extension according to another embodiment of the present invention may represent a configuration of a timestamp field. Information representing a configuration of timing information may be referred to as a TS version field. For example, the TS version field may represent that the timestamp field is a 32 bit field. In this case, the TS version field may be set to 0. For another example, the TS version field may represent that the timestamp field is a 64 bit field. In this case, the TS version field may be set to 1.

FIGS. 72 to 75 are views illustrating a configuration of a header extension according to another embodiment of the present invention. In more detail, the header extension structure shown in FIGS. 72 to 75 may include at least one of object type information and timing information for transmission. Additionally, a corresponding header extension structure may be included in a header extension field (header extension). Additionally, it may be used as part of a packet header transmitting content.

As shown in FIG. 72, a structure (EXT_OBJ_INFO) of a header extension according to another embodiment of the present invention may include type information of header extension part. The above type information may be referred to as an HET field. Additionally, the header extension structure may include length information of header extension part. The above length information may be referred to as an HEL field. Additionally, the header extension structure may include type information of a transport object. The above object type information may be referred to as an Object type field.

In a specific embodiment, the Object type field may represent that a transport object is the type of a regular file. Herein, the regular file may be an ISO BMFF based media file. In more detail, the regular file may be obtained by encapsulating a media file in ISO BMFF format. In this case, the Object type field may be set to 0x01. According to another embodiment, the Object type field may represent that a transport object is the type of an HTTP entity type. In this case, the Object type field may be set to 0x02. According to another embodiment, the Object type field may represent that a transport object is an audio data type. The Object type field may represent that a transport object is an AAC based audio data type. At this point, the AAC based audio data type may be audio data encoded through AAC. In this case, the Object type field may be set to 0x03. According to another embodiment, the Object type field may represent that a transport object is an audio data type. In more detail, the Object type field may represent that a transport object is an H.264 type. In this case, the Object type field may be set to 0x04. According to another embodiment, the Object type field may represent that a transport object is an HEVC based video data type. At this point, the HEVC based video data type may be encoded video data encoded through HEVC. In this case, the Object type field may be set to 0x05. According to another embodiment, the Object type field may represent that a transport object is an ISO BMFF based file type. In this case, the Object type field may be set to 0x06. According to another embodiment, the Object type field may represent that a transport object is metadata. In this case, the Object type field may be set to 0x07.

Additionally, a structure (EXT_OBJ_INFO) of a header extension according to another embodiment of the present invention may represent that a corresponding transport packet includes the first part or end part of a transport object. Information representing that a transport packet includes the first part or end part of a transport object may be a marker bit. According to a specific embodiment, the marker bit may be an M field. The M field may be interpreted differently according to a value of the Object type field. For example, when the type of an object for transmission is a file, it may represent that a corresponding transport packet includes the end part of a file. Herein, the end part is part including the last bit of a file. For another example, when the type of an object for transmission is Audio or Video (AV) data, it may represent that a corresponding transport packet includes the first or last bit of an access unit.

Additionally, a structure (EXT_OBJ_INFO) of a header extension according to another embodiment of the present invention may include timing information of data included in a packet payload. The above information may be a Timestamp field. For example, the Timestamp field may include information on a time at which the first byte of data included in a packet payload is decoded. For another example, the Timestamp field may include information on a presentation time of data. Furthermore, the Timestamp field may include timescale information or timescale based timing information. Herein, the timescale information may be a unit representing a time for a decoding or presentation time point of a transport object. In the case of the timescale based timing information, a broadcast reception device may obtain information on a decoding or presentation time point by multiplying the value of the Timestamp field by a timescale.

FIG. 73 is a view illustrating some configurations added to the header extension structure of FIG. 72 according to another embodiment of the present invention.

As shown in FIG. 73, the header extension structure may represent whether a timestamp field exists in a corresponding header structure. Information representing whether the Timestamp field exists may be referred to as a TS flag field. In a specific embodiment, when the TS flag field is set to 1, it may represent that the timestamp field exists in a corresponding header structure.

Additionally, a structure of a header extension according to another embodiment of the present invention may include format information of a Timestamp field. The above information may be a TS format field. According to a specific embodiment, the TS format field may represent that timing information included in a transport packet is in the format of media time. The media time may be a media presentation time according to an arbitrary media timeline. In this case, the TS format field may be set to 0x01. Additionally, the TS format field may represent that timing information included in a transport packet is in the format of Network Time Protocol (NTP). In this case, the TS format field may be set to 0x02. Additionally, the TS format field may represent that timing information included in a transport packet is in the format of a normal playing time. The format of a normal playing time may be a presentation time expressed relative from a presentation start time point and may be expressed in hour, minute, second, or second decimal point unit In this case, the TS format field may be set to 0x03. Additionally, the TS format field may represent that timing information included in a transport packet is in the format of SMPTE time code. The SMPTE time code is time code defined in Society of motion picture and television engineers (SMPTE). In this case, the TS format field may be set to 0x04. Additionally, the TS format field may represent that timing information included in a transport packet is 90 KHz timing information. In this case, the TS format field may be set to 0x05.

Additionally, a structure of a header extension according to another embodiment of the present invention may represent a configuration of a timestamp field. In more detail, a structure of a header extension may represent a configuration of timing information relating to object presentation or decoding included in the timestamp field. The above information may be referred to as a TS version field. For example, the TS version field may represent that the timestamp field is a 32 bit field. In this case, the TS version field may be set to 0. For another example, the TS version field may represent that the timestamp field is a 64 bit field. In this case, the TS version field may be set to 1.

FIG. 74 is a view illustrating some configurations added to the header extension structure of FIG. 72 according to another embodiment of the present invention.

As shown in FIG. 74, a structure of a header extension according to another embodiment of the present invention may include additional information relating to a transport object. According to a specific embodiment, a structure of a header extension may include location information of an object. For example, the location information of an object may represent URL information of an ISO BMFF based segment. In more detail, the location information of an object may represent URL information through which ISO BMFF based segments are downloaded. In this case, additional information relating to a transport object may be referred to as an Extension field.

Additionally, a structure of a header extension according to another embodiment of the present invention may represent whether an Extension field exists in a corresponding header extension structure. In this case, Information representing whether the Extension field exists may be referred to as an Ext Flag field.

FIG. 75 is a view when a new header extension structure is used as part of a packet header according to an embodiment of the present invention. As shown in FIG. 75, the part of the packet header may include timing information of a transport object. The part of the packet header including timing information of a transport object may be an EXT_MEDIA_TIME field.

The EXT_MEDIA_TIME field may include timing information of data included in a packet payload. The above information may be a Timestamp field. For example, the Timestamp field may include information on a time at which the first byte of data included in a packet payload is decoded. For another example, the Timestamp field may include information on a presentation time of data. Furthermore, the Timestamp field may include timescale information or timescale based timing information. Herein, the timescale information may be a unit representing a time for a decoding or presentation time point of a transport object. In the case of the timescale based timing information, a broadcast reception device may obtain information on a decoding or presentation time point by multiplying the value of the Timestamp field by a timescale.

Additionally, the EXT_MEDIA_TIME field may include format information of a Timestamp field. The above information may be a TS format field. According to a specific embodiment, the TS format field may represent that timing information included in a transport packet is in the format of media time. In this case, the TS format field may be set to 0x01. Additionally, the TS format field may represent that timing information included in a transport packet is in the format of Network Time Protocol (NTP). In this case, the TS format field may be set to 0x02. Additionally, the TS format field may represent that timing information included in a transport packet is in the format of normal playing time. In this case, the TS format field may be set to 0x03. Additionally, the TS format field may represent that timing information included in a transport packet is in the format of SMPTE time code. The SMPTE time code is time code defined in Society of motion picture and television engineers (SMPTE). In this case, the TS format field may be set to 0x04. Additionally, the TS format field may represent that timing information included in a transport packet is 90 KHz timing information. In this case, the TS format field may be set to 0x05. Additionally, the TS format field may represent that timing information included in a transport packet is in a GPS time format. In this case, the TS format field may be set to 0x06.

Additionally, the EXT_MEDIA_TIME field may represent a configuration of a Timestamp field. A structure of a header extension may represent a configuration of timing information relating to object presentation or decoding included in the timestamp field. The above information may be referred to as a TS version field. For example, the TS version field may represent that the timestamp field is a 32 bit field. In this case, the TS version field may be set to 0. For another example, the TS version field may represent that the timestamp field is a 64 bit field. In this case, the TS version field may be set to 1.

Additionally, the EXT_MEDIA_TIME field may include additional information relating to timing information. For example, data information relating to timing information to be mapped may be included. The additional information relating to timing information may be referred to as an Extension field.

Additionally, the EXT_MEDIA_TIME field may include information on a configuration of the Extension field. In more detail, various information may be included in the Extension field and flags may form a set in various information. In this case, a set of flags may be referred to as an Ext Flags field.

A transport object that the broadcast reception device 100 receives through a broadcast reception unit may need to synchronize with timing information having a different format or reference time. In more detail, the broadcast reception device 100 may need to synchronize timing information of a transport object with a base timeline that is the reference for synchronization having a different format or reference time than timing information of a transport object. According to an embodiment, timing information for synchronization may be a presentation timing of a transport object. Timing information for synchronization according to another embodiment may be a decoding timing of a transport object. In this case, a broadcast transmission device may need to transmit information on a mapping relationship between different timing information and timing information of a transport object to the broadcast reception device 100. According to an embodiment of the present invention to solve the above issue, metadata including the above-mentioned timeline component_AU may be transmitted as one transport object.

According to an embodiment of the present invention to solve the above issue, the above-mentioned header extension may include additional mapping information different from timing information of a transport object. In more detail, a header extension (EXT_TIME_MAP) may include information for mapping a timestamp of a transport object into another timeline. For example, the broadcast reception device 100 may map a presentation time of a packet payload into a GPS time by using the above information through the control unit 150. In this case, the GPS time may be a base timeline.

FIG. 76 is a view illustrating a structure of a header extension for supporting mapping with another timing information according to an embodiment of the present invention.

As shown in FIG. 76, the header extension may include format information of a Timestamp field. The above information may be a TS format field. According to a specific embodiment, the TS format field may represent that a timestamp included in a transport packet is in the format of media time. In this case, the TS format field may be set to 0x01. Additionally, the TS format field may represent that a timestamp included in a transport packet is in the format of Network Time Protocol (NTP). In this case, the TS format field may be set to 0x02. Additionally, the TS format field may represent that a timestamp included in a transport packet is in the format of normal playing time. In this case, the TS format field may be set to 0x03. Additionally, the TS format field may represent that a timestamp included in a transport packet is in the format of SMPTE time code. The SMPTE time code is time code defined in Society of motion picture and television engineers (SMPTE). In this case, the TS format field may be set to 0x04. Additionally, the TS format field may represent that a timestamp included in a transport packet is a 90 KHz based timestamp. In this case, the TS format field may be set to 0x05. Additionally, the TS format field may represent that a timestamp included in a transport packet is in a GPS time format. In this case, the TS format field may be set to 0x06.

Additionally, the header extension may represent the version or configuration of a timestamp field. A structure of a header extension may represent a configuration of timing information relating to object presentation or decoding included in the timestamp field. The above information may be referred to as a TS version field. For example, the TS version field may represent that the timestamp field is a 32 bit field. In this case, the TS version field may be set to 0. For another example, the TS version field may represent that the timestamp field is a 64 bit field. In this case, the TS version field may be set to 1.

Additionally, the header extension may represent whether timing information of a time line into which a timestamp of a transport object is mapped exists. In this case, information representing the presence may be referred to as an OTS flag field. In a specific embodiment, when the OTS flag field is set to 1, it may represent that timing information of a timeline into which a timestamp of a transport object is mapped exists.

Additionally, a header extension may represent a timestamp format of a time line into which a timestamp of a transport object is mapped. In more detail, a timestamp of a transport object may be at least one of a presentation time and a decoding time of an object. Additionally, a timeline in which a transport object is mapped into a timestamp may be a base timeline. Herein, the base timeline is a reference timeline for synchronization between a plurality of different timelines.

The above information may be an OTS format field. According to a specific embodiment, the OTS format field may represent that a timestamp mapped into a timestamp of a transport object included in a transport packet is in the format of a media time. In this case, the OTS format field may be set to 0x01. Additionally, the OTS format field may represent that timing information included in a transport packet is in the format of Network Time Protocol (NTP). In this case, the OTS format field may be set to 0x02. Additionally, the OTS format field may represent that a timestamp mapped into a timestamp of a transport object included in a transport packet is in the format of normal playing time. In this case, the OTS format field may be set to 0x03. Additionally, the OTS format field may represent that a timestamp mapped into a timestamp of a transport object included in a transport packet is in the format of SMPTE time code. The SMPTE time code is time code defined in Society of motion picture and television engineers (SMPTE). In this case, the OTS format field may be set to 0x04. Additionally, the OTS format field may represent that a timestamp mapped into a timestamp of a transport object included in a transport packet is 90 KHz based timing information. In this case, the OTS format field may be set to 0x05. Additionally, the OTS format field may represent that a timestamp mapped into a timestamp of a transport object included in a transport packet is in a GPS time format. In this case, the OTS format field may be set to 0x06.

Additionally, a header extension may represent a version or configuration of a timestamp of a timeline mapped into a timestamp of an object and a timestamp of a transport object. In more detail, a timestamp of a transport object may be at least one of a presentation time and a decoding time of an object. Additionally, a timeline in which a transport object is mapped into a timestamp may be a base timeline. Herein, the base timeline is a reference timeline for synchronization between a plurality of different timelines.

In this case, information representing a configuration or version of a timestamp mapped into a timestamp of a transport object may be referred to as an OTS version field. For example, the OTS version field may represent that a time stamp mapped into a timestamp of a transport object is 32 bits. In this case, the OTS version field may be set to 0. For another example, the OTS version field may represent that a time stamp mapped into a timestamp of a transport object is 64 bits. In this case, the OTS version field may be set to 1.

Additionally, the header extension may represent whether location information is included. In this case, information representing whether location information is included may be a Location flag field. For example, when the Location flag field is set to 1, it may represent that location information is included in a corresponding header extension.

Additionally, the header extension may include a timestamp of a transport object and timing information of a timeline mapped into the timestamp of the transport object. The above information may be referred to as a timestamp field.

Additionally, the header extension may include a timestamp of a corresponding header extension and timing information relating to a transport object mapped into a timestamp of a transport object. The above information may be an Origin time stamp field.

Additionally, the header extension may include location information of data relating to a timeline mapped into a timestamp of an object. The above information may be referred to as a location field. In an embodiment, when mapping with a timeline of a specific ISO BMFF based data segment is required, the Location field may include the URL of a corresponding data segment.

FIG. 77 is a view illustrating a method of operating a broadcast transmission device according to an embodiment of the present invention.

The broadcast transmission device obtains an object for transmission through a control unit in operation S401. According to an embodiment, the object may be AV content. According to another embodiment, an object may be AV content related enhancement data.

The broadcast transmission device may obtain time information and format information of an object through a control unit in operation S403. According to an embodiment, the time information may be a timestamp of a transport object. According to another embodiment, the time information may be timing information of a timeline to be mapped into a timestamp of a transport object. According to another embodiment, the time information may be a timestamp of a header extension structure. According to another embodiment, the time information may be timing information of a transport object to be mapped into a timestamp of a header extension structure. Additionally, the format information may be at least one of a regular file, an HTTP entity, and an audio/video access unit.

In more detail, a timestamp of a transport object may be at least one of a presentation time and a decoding time of an object. Additionally, a timeline in which a transport object is mapped into a timestamp may be a base timeline. Herein, the base timeline is a reference timeline for synchronization between a plurality of different timelines. For example, the base timeline may be GPS time and information for synchronizing a transport object with the GPS time may be included in the above header extension.

The broadcast transmission device sets the time information and format information obtained through the control unit in a packet header and packetizes a transport packet in operation S405. In more detail, a control unit of a broadcast transmission device packetizes a packet header including the obtained time information and a packet payload including data according to a transport protocol. According to another embodiment, the broadcast transmission device may set time information and format information in a header extension that is selectively included in a packet header through the control unit.

In more detail, the time information may be information relating to a presentation time of an object. The information relating to a presentation time may be at least one of a presentation time point (timing information) and a decoding time point (timing information) of a transport object. According to another embodiment, the additional information may be type information of a transport object. The broadcast transmission device may set at least one of whether a header extension exists in a packet header, the length of a header extension, and type information of a header extension, in a normal packet header.

The broadcast transmission device transmits the packetized transport packet through a transmission unit in operation S407. The transmission unit may transmit a transport packet through at least one of a terrestrial broadcast network and an internet network.

FIG. 78 is a view illustrating a method of operating a broadcast reception device according to an embodiment of the present invention.

The broadcast reception device 100 receives a transport packet through the broadcast reception unit 110 in operation S411. As described with reference to FIG. 77, a transport packet may include a packet header and a packet payload and the packet header may include a header extension selectively.

The control unit 150 of the broadcast reception device 100 extracts a packet header and a header extension from the received transmission packet in operation S412. According to a specific embodiment, the control unit 150 may extract a packet header included in a transport packet. Additionally, a header extension that is selectively included in a packet header may be extracted from a packet header.

The control unit 150 of the broadcast reception device 100 obtains at least one of time information relating to a transport object and format information of a transport object on the basis of a packet header in operation S413. According to another embodiment, the control unit 150 may obtain at least one of the time information and the format information from a header extension that is selectively included in a packet header. According to a specific embodiment, the control unit 150 may obtain a timestamp of a transport object on the basis of a header extension. Additionally, the control unit 150 may obtain format information of a transport object. The format information of the transport object may represent at least one of a regular file, an HTTP entity, and an audio/video access unit. Herein, the regular file may be an ISO BMFF based media file.

The control unit 150 of the broadcast reception device 100 determines whether information for mapping into another time information is obtained from a packet header in operation S414. In more detail, the control unit 150 determines whether another time information mapping into time information for a corresponding transport object exists in a packet header. According to another embodiment, the control unit 150 may determine the other time information on the basis of specific information extracted from a header extension that is selectively included in a packet header.

According to an embodiment, when the control unit 150 determines that information for mapping into another time information from a packet header, it obtains information for mapping from the packet header in operation S415. Herein, the other time information may be the above mentioned timing information of the base timeline. Additionally, the timing information may include at least one of presentation timing information and decoding timing information of a transport object. According to a specific embodiment, the control unit 150 may obtain timing information of a timeline mapped into a transport object on the basis of a packet header. According to another embodiment, the control unit 150 may obtain timing information of a transport object mapped into a timestamp of a corresponding packet header on the basis of a packet header. Additionally, the control unit 150 may obtain location information of data mapped into a transport object on the basis of a packet header. According to another embodiment, the control unit 150 may obtain information for mapping from a header extension that is selectively included in a packet header.

The control unit 150 of the broadcast reception device 100 obtains a transport object on the basis of the obtained time information in operation S416. According to an embodiment, when the control unit 150 does not obtain another time information and mapping information, it outputs an object on the basis of a timestamp of a corresponding transport object. According to another embodiment, when the control unit 150 obtains the other time information and the mapping information, it outputs an object on the basis of corresponding mapping information and a timestamp of an object.

FIG. 79 is a view illustrating a structure of a packet header including information on a configuration of a transport packet.

A packet header according to an embodiment of the present invention may represent that the first or end part data in an entire transport object is included in a packet payload. In this case, Information representing that the first or end part data is included may be a marker bit. According to a specific embodiment, the marker bit may be an M field. The M field may be a 1 bit field.

Additionally, a packet header according to an embodiment of the present invention may include information on a configuration of a corresponding transport packet. In this case, the information on the configuration of the transport packet may be a type field. The type field may be a 2 bit field.

In another case, the information on the configuration of the transport packet may be included in a codepoint field. The Codepoint field may be an 8 bit field.

According to a specific embodiment, the Type field may represent that a corresponding transport object has a regular packet structure. In more detail, it represents that a corresponding packet uses an existing transport packet structure shown in FIG. 68 as it is. In this case, the transport packet may include at least one of a packet header, a header extension, a packet payload, an identifier, and data. Additionally, the broadcast transmission device may set the Type field to 0x00.

Additionally, according to a specific embodiment, the Type field may represent that a corresponding transport packet does not include a payload. In more detail, it represents that a corresponding transport packet includes only a packet header and a header extension. In this case, the broadcast transmission device may set the type field to 0x01.

Additionally, according to a specific embodiment, the Type field may represent that a corresponding transport packet includes offset information for an entire transport object. Herein, the offset information is offset information of data including an encoding symbol field of a corresponding transport packet. That is, the offset information represents offset information of data of a corresponding transport packet in an entire transport object. At this point, according to an embodiment, a corresponding transport packet may have a structure and configuration identical to those of a regular transport packet but the payload identifier field may be replaced with a data offset field. In this case, the broadcast transmission device may set the type field to 0x02.

Additionally, according to a specific embodiment, the Type field may represent that a corresponding transport packet includes a different configuration than a structure of an existing regular transport packet. In this case, the broadcast transmission device may set the type field to 0x03. According to a specific embodiment, the Type field may represent that a corresponding transport object does not include a payload identifier field. In this case, the broadcast transmission device may set the type field to 0x04.

FIG. 80 is a view illustrating a configuration of the transport packet described with reference to FIG. 79. As shown in FIG. 80, the Type field may represent a structure of a transport packet. However, the present invention is not limited to the transport packet shown in FIG. 80 and also is not limited to the set value in FIG. 80.

FIG. 81 is a view illustrating a method of operating a broadcast transmission device according to an embodiment of the present invention.

The broadcast transmission device obtains structure information of a transport packet through a control unit in operation S421. According to an embodiment, a structure of a transport packet may be an existing regular packet structure. According to another embodiment, a structure of a transport packet may have a structure configured with only a packet header and a header extension. According to another embodiment, a structure of a transport packet may be a structure including a configuration that replaces an existing payload identifier. According to another embodiment, a structure of a transport packet may be a structure not including a payload identifier.

The broadcast transmission device packetizes a transport packet by setting a value that represents information of a corresponding structure in a packet header on the basis of a structure of the transport packet obtained through the control unit in operation S423. In more detail, the control unit may set information of a corresponding structure in the Type field.

The broadcast transmission device transmits the packetized transport packet through a transmission unit in operation S425. According to an embodiment, the transmission unit may transmit the packetized transport packet through a terrestrial broadcast network. According to another embodiment, the transmission unit may transmit the packetized transport packet through an internet network.

FIG. 82 is a view illustrating a method of operating a broadcast reception device according to an embodiment of the present invention.

The broadcast reception device 100 receives a transport packet through the broadcast reception unit 110 in operation S431. According to an embodiment, the broadcast reception unit 110 may receive a transport packet through a terrestrial broadcast network. According to another embodiment, an IP communication unit 130 may receive a transport packet through an internet network.

The broadcast reception device 100 extracts a packet header from the received transport packet through the control unit 150 in operation S433. In more detail, the transport packet may include at least one of a packet header and a packet payload. Accordingly, the control unit 150 may extract a packet header signaling a packet payload from a transport packet.

The broadcast reception device 100 obtains configuration information of a transport packet from the extracted packet header in operation S435. In more detail, the packet header may include information representing a structure of a transport packet. Accordingly, the broadcast reception device 100 obtains information representing a structure of a transport packet from a packet header through the control unit 150. According to an embodiment, a structure of a transport packet may be an existing regular transport packet structure. According to another embodiment, a structure of a transport packet may be a structure including only a packet header and a header extension. According to another embodiment, a structure of a transport packet may be a structure including offset information that replaces a packet payload identifier. According to another embodiment, a structure of a transport packet may be a structure not including a packet payload identifier.

The present invention is not limited to the features, structures, and effects described in the above embodiments. Furthermore, the features, structures, and effects in each embodiment may be combined or modified by those skilled in the art. Accordingly, it should be interpreted that contents relating to such combinations and modifications are included in the scope of the present invention.

While this invention has been particularly shown and described with reference to preferred embodiments thereof, it will be understood by those skilled in the art that various changes in form and details may be made therein without departing from the spirit and scope of the invention as defined by the appended claims. For example, each component in an embodiment is modified and implemented. Accordingly, it should be interpreted that differences relating to such modifications and applications are included in the scope of the appended claims.

What is claimed is:

1. A digital broadcast receiver for receiving a broadcast signal, the digital broadcast receiver comprising:
   a tuner configured to receive the broadcast signal carrying a transport packet, wherein the transport packet consists of at least one packet payload and at least one packet header;
   a frequency deinterleaver configured to frequency deinterleave symbols of a signal frame in the broadcast signal based on addresses generated by checking a range of addresses of a deinterleaving sequence that is generated based on a main sequence and a symbol offset,
   wherein the signal frame includes a first symbol for signaling data and a second symbol for service data; and
   a processor configured to extract the at least one packet header,
   wherein a first extension header is included in the at least one packet header, further the first extension header includes timestamp information having a 64-bit format depending on a specific value also included in the first extension header,
   wherein the at least one packet header includes a second extension header when the first extension header is included in the at least one packet header, and
   wherein the second extension header includes first information for sender current time of a broadcast sender and second information for expected residual time.

2. The digital broadcast receiver of claim 1, wherein the first extension header is different from the second extension header.

3. The digital broadcast receiver of claim 2, wherein the processor obtains information about a structure type of the transport packet from the at least one packet header.

4. The digital broadcast receiver of claim 3, wherein the structure type of the transport packet comprises a first structure type including a packet header, a header extension, a payload identifier, and object data, a second structure type only including a packet header and a header extension, and a third structure type only including a packet header, a header extension, and object data.

5. The digital broadcast receiver of claim 4, wherein the first structure type further comprises offset information of object data.

6. A method for receiving a broadcast signal in a digital broadcast receiver, the method comprising:
   receiving the broadcast signal carrying a transport packet, wherein the transport packet consists of at least one packet payload and at least one packet header;
   frequency deinterleaving symbols of a signal frame in the broadcast signal based on addresses generated by checking a range of addresses of a deinterleaving sequence that is generated based on a main sequence and a symbol offset, wherein the signal frame includes a first symbol for signaling data and a second symbol for service data; and extracting the at least one packet header, wherein a first extension header is included in the at least one packet header, further the first extension header includes timestamp information having a 64-bit format depending on a specific value also included in the first extension header, wherein the at least one packet header includes a second extension header when the first extension header is included in the at least one packet header, and wherein the second extension header includes first information for sender current time of a broadcast sender and second information for expected residual time.

7. The method of claim 6, wherein the first extension header is different from the second extension header.

8. The method of claim 7, further comprising:
obtaining information about a structure type of the transport packet from the at least one packet header.

9. The method of claim 8, wherein the structure type of the transport packet comprises a first structure type including a packet header, a header extension, a payload identifier, and object data, a second structure type only including a packet header and a header extension, and a third structure type only including a packet header, a header extension, and object data.

10. The method of claim 9, wherein the first structure type further comprises offset information of object data.

11. A method for transmitting a broadcast signal in a digital broadcast transmitter, the method comprising:
generating a transport packet,
wherein the transport packet consists of at least one packet payload and at least one packet header,
wherein a first extension header is included in the at least one packet header, further the first extension header includes timestamp information having a 64-bit format depending on a specific value also included in the first extension header,
wherein a second extension header is inserted into the at least one packet header when the first extension header is included in the at least one packet header, and
wherein the second extension header includes first information for sender current time of a broadcast sender and second information for expected residual time; and
transmitting the broadcast signal carrying the transport packet.

12. The method of claim 11, further comprising:
frequency interleaving symbols of a signal frame, wherein the signal frame includes a first symbol for signaling data and a second symbol for service data.

13. The method of claim 12, wherein the first extension header is different from the second extension header.

14. The method of claim 13, wherein a structure type of the transport packet comprises a first structure type including a packet header, a header extension, a payload identifier, and object data, a second structure type only including a packet header and a header extension, and a third structure type only including a packet header, a header extension, and object data.

15. The method of claim 14, wherein the first structure type further comprises offset information of object data.

16. A digital broadcast transmitter for transmitting a broadcast signal, the digital broadcast transmitter comprising:
a processor configured to generate a transport packet,
wherein the transport packet consists of at least one packet payload and at least one packet header,
wherein a first extension header is included in the at least one packet header, further the first extension header includes timestamp information having a 64-bit format depending on a specific value also included in the first extension header,
wherein a second extension header is inserted into the at least one packet header when the first extension header is included in the at least one packet header, and
wherein the second extension header includes first information for sender current time of a broadcast sender and second information for expected residual time; and
a transmitting antenna configured to transmit the broadcast signal carrying the transport packet.

17. The digital broadcast transmitter claim 16, wherein the transmitting antenna is further configured to frequency interleave symbols of a signal frame, wherein the signal frame includes a first symbol for signaling data and a second symbol for service data.

18. The digital broadcast transmitter of claim 17, wherein the first extension header is different from the second extension header.

19. The digital broadcast transmitter of claim 18, wherein a structure type of the transport packet comprises a first structure type including a packet header, a header extension, a payload identifier, and object data, a second structure type only including a packet header and a header extension, and a third structure type only including a packet header, a header extension, and object data.

20. The digital broadcast transmitter of claim 19, wherein the first structure type further comprises offset information of object data.

\* \* \* \* \*